United States Patent
Pontet

(10) Patent No.: US 10,815,930 B2
(45) Date of Patent: Oct. 27, 2020

(54) INTERNAL COMBUSTION ENGINE AND A METHOD FOR ENHANCING THE YIELD OF AN INTERNAL COMBUSTION ENGINE

(71) Applicants: KYRDYN, Gif-sur-Yvette (FR); Maguelone Pontet, Lardy (FR); Silvere Pontet, Orsay (FR); Leonard Pontet, Massy (FR); Denis Lesire, Bourg la Reine (FR)

(72) Inventor: Bernard Pontet, Saint-Cyr-la-Riviere (FR)

(73) Assignees: KYRDYN, Gif sur Yvette (FR); Maguelone Pontet, Lardy (FR); Silvere Pontet, Orsay (FR); Leonard Pontet, Massy (FR); Denis Lesire, Bourg la Reine (FR)

( * ) Notice: Subject to any disclaimer, the term of this patent is extended or adjusted under 35 U.S.C. 154(b) by 0 days.

(21) Appl. No.: 16/302,019

(22) PCT Filed: May 18, 2016

(86) PCT No.: PCT/FR2016/051169
§ 371 (c)(1),
(2) Date: Nov. 15, 2018

(87) PCT Pub. No.: WO2017/198911
PCT Pub. Date: Nov. 23, 2017

(65) Prior Publication Data
US 2019/0285027 A1    Sep. 19, 2019

(51) Int. Cl.
*F02G 5/02*        (2006.01)
*F02M 26/05*     (2016.01)
(Continued)

(52) U.S. Cl.
CPC ............... *F02G 5/02* (2013.01); *F02M 26/05* (2016.02); *F02M 31/083* (2013.01);
(Continued)

(58) Field of Classification Search
CPC ........ F02G 5/02; F02M 26/05; F02M 31/083; F02M 31/087; F02B 29/0406;
(Continued)

(56) References Cited

U.S. PATENT DOCUMENTS

| 4,077,219 A | 3/1978 | Melchior et al. |
| 4,520,628 A | 6/1985 | Carlqvist |

(Continued)

FOREIGN PATENT DOCUMENTS

| DE | 102007005246 A1 | 11/2007 |
| DE | 202013006352 U1 | 8/2013 |

(Continued)

OTHER PUBLICATIONS

International Search Report dated Jan. 24, 2017 for PCT/FR2016/051169.

*Primary Examiner* — Thai Ba Trieu
(74) *Attorney, Agent, or Firm* — Greer, Burns & Crain, Ltd.

(57) ABSTRACT

In an internal combustion engine, for the operation at part-load, a heat exchanger collects heat from the exhaust gas and re-injects the collected heat into the intake gas being at an intermediate stage ($p_{3c}$) of the compression. The exhaust gases are cooled down from point $Q_{81c}$ to point $Q_{61c}$. The intake gases are heated up from point $Q_{33c}$ to point $Q_{43c}$. The average combustion temperature is higher while the exhaust gas temperature is lowered, wherefore the yield is definitely increased.

32 Claims, 13 Drawing Sheets

(51) Int. Cl.
*F02M 31/083* (2006.01)
*F02M 31/087* (2006.01)
*F02B 29/04* (2006.01)

(52) U.S. Cl.
CPC ....... *F02M 31/087* (2013.01); *F02B 29/0406* (2013.01); *Y02T 10/126* (2013.01); *Y02T 10/166* (2013.01)

(58) Field of Classification Search
CPC ...... F02B 29/04; F02B 37/013; Y02T 10/126; Y02T 10/166
USPC ........... 60/602, 611, 612, 618, 320; 123/562
See application file for complete search history.

(56) References Cited

U.S. PATENT DOCUMENTS

| | | | |
|---|---|---|---|
| 4,700,542 A | 10/1987 | Wang | |
| 8,037,872 B2 | 10/2011 | Holler et al. | |
| 8,042,335 B2 | 10/2011 | Pursifull et al. | |
| 8,365,527 B2 * | 2/2013 | Raab | F02B 29/0443 60/605.2 |
| 8,468,822 B1 | 6/2013 | Evans | |
| 2009/0314005 A1 | 12/2009 | Messmer | |
| 2015/0027116 A1 | 1/2015 | Fischer | |
| 2017/0370265 A1 * | 12/2017 | Ford | F01N 5/02 |
| 2019/0048749 A1 * | 2/2019 | Scholz | F02G 5/02 |
| 2019/0323457 A1 * | 10/2019 | Rohrssen | F02M 26/05 |

FOREIGN PATENT DOCUMENTS

| | | |
|---|---|---|
| FR | 2876418 A | 4/2006 |
| FR | 3000140 A1 | 6/2014 |
| JP | 2004270625 A | 9/2004 |
| JP | 2011047376 A | 3/2011 |

* cited by examiner

INTERNAL COMBUSTION ENGINE AND A METHOD FOR ENHANCING THE YIELD OF AN INTERNAL COMBUSTION ENGINE

BACKGROUND

This invention relates to an internal combustion engine with a high efficiency yield.

This invention also relates to a method for enhancing the efficiency yield of an internal combustion engine by decreasing the temperature of the gas which is brought into thermal relationship with the cold source and/or by increasing the temperature of the gas which is brought into thermal relationship with the hot source.

Internal combustion engines which use positive displacement mechanisms, typically of the cylinder and piston type, are known. The engines in which the ignition is controlled, especially by ignition plug (so called «gasoline engines» or «Otto engines») as well as the compression ignited engines (called «diesel»), well known, pertain to this category. The positive displacement mechanism defines a working chamber having a variable volume for a working gas. In the working chamber the gas especially undergoes at least the final part of a compression step, then a combustion step and then at least the initial part of a detent step. The highest temperature reached during or at the end of the combustion, can be very high without damaging the engine because the temperature of the surfaces exposed to contact with the working gas stabilizes at a lower average value which is furthermore decreased by a natural heat removal and/or by a cooling system.

Thanks to the high peak temperature undergone by the gas, the above-cited engines have a relatively good yield. Typically, the volume of the working chamber at the end of the expansion-depressurization of the gas is the same as at the beginning of the compression. At the end of its expansion in the chamber, the gas is at a temperature and a pressure much higher than at the beginning of the compression in the chamber. Consequently, a considerable energy has to be got rid of in order to permit the following cycle to be identical to the one just completed.

It is possible to extend the expansion beyond the volume corresponding to the beginning of the compression. This possibility is however rarely used because it requires a considerable increase in the maximum size of the working chamber (the so-called "displacement" of a piston and cylinder mechanism). Such an increase involves a whole series of drawbacks (weight, space requirement, costs, frictional losses, thermal losses, etc.) which are generally deemed prohibitive in view of the low possible benefit. Because even if the gas is expanded down to its pressure of the beginning of the compression, its temperature at the end of the expansion is much higher than at the beginning of the compression in the chamber and the energy losses are far from being cancelled.

The tendency during the recent years has been, by contrast, to reduce the displacement by means of a supercharging, in particular by way of a turbocharger. The gas exiting from its initial expansion step undergoes a complementary expansion in the turbine of the supercharger. The compressor of the turbocharger, driven by the turbine, pre-compresses the working gas before the admission thereof in the working chamber.

The pre-compressed gas, thus heated by the pre-compression, often travels through an intercooler where the gas is cooled down before entering the working chamber. This aims at increasing the gas mass processed in the working chamber at each cycle.

More recently the tendency of "downsizing" appeared in the field of the road transportation, consisting in realizing highly supercharged engines having high power and torque as compared to the displacement. Such engines are lightweight and perform well, while their frictional and thermal losses are reduced. They also have the advantage of operating as classical low displacement engines when under reduced load, this allowing to exhibit official values which are favorable, though difficult practically to obtain, in terms of fuel consumption and CO2 emissions.

In fact, in a supercharged engine the pressure differential between the beginning of the compression and the end of the expansion in the working chamber is greater than in an atmospheric engine. There is thus an additional loss which is far from being completely recovered in the supercharger. Current superchargers are classically equipped with a by-pass allowing part of the gas to by-pass the turbine of the turbocharger. Failing this, each cycle would begin at a higher pressure than the preceding one.

According to the first principle of thermodynamics, the mechanical energy W theoretically produced by the cycle is equal to the difference between the heat QH supplied to the gas by the hot source and the heat QB restituted by the gas to the cold source. Thus, W=(QH−QB). The theoretical yield Et is equal to the ratio of the mechanical energy produced by the machine, to the thermal energy which the machine received to that effect. Thus, Et=W/QH=(QH−QB)/QH. This yield is qualified as "theoretical" because it neglects the losses due to friction in the engine and to imperfections of the actual cycle by comparison with the theoretical cycle. Such losses appear as additional heat evacuated by the exhaust of the engine and by cooling and lubrication fluids. The current internal combustion engines of the diesel type offer a theoretical yield around 0.65. The theoretical yield of the gasoline engines is still lower. This figure evidences the limits of the progress which can be expected from improvements in the details of the current engine designs, and the high industrial interest there would be in a decisive improvement of the theoretical thermodynamic cycle in view of improving its theoretical yield so that this improvement induces a corresponding improvement of the actual yield of a machine designed to implement as well as possible the improved theoretical cycle. In a Carnot cycle, which is the theoretical cycle having the best yield, a yield of 0.65 corresponds to a hot source at about 900K. The much higher temperature reached in the internal combustion engines would correspond to a theoretical yield of 0.80-0.90 in a Carnot cycle. Despite the unfeasible character of the Carnot cycle, the above statement confirms the potential of progress residing in the internal combustion engines by way of an improvement in their theoretical cycle without having to use more extreme temperatures than those used nowadays.

The theoretical yield can be increased by increasing QH without increasing or without so much increasing QB, or by decreasing QB without decreasing or without so much decreasing QH, or by increasing QH while decreasing QB.

According to the second principle of thermodynamics as applied to an internal combustion engine, this is possible by increasing the general level of combustion temperature without increasing or so much increasing the temperature of the gas exhaust of the engine, or by decreasing the temperature of the gas exhaust of the engine without decreasing or so much decreasing the general level of temperature of the combustion, or by increasing the general level of temperature of the combustion while decreasing the temperature of the gas exhaust.

Be it noted by the way that these considerations give an explanation about the loss of theoretical yield of the classical turbocharged engines: since the volume ratio of their positive displacement mechanism is often lower than that of an atmospheric engine, their combustion begins at a lower temperature if an intercooler is provided or their temperature at the end of expansion is increased if no intercooler is provided.

Engines have been proposed along the previous considerations, based on the two first principles of thermodynamics.

Document JP 2004 270625 A proposes an engine having an external hot source, the hot source of which is the exhaust of an internal combustion engine, and the cold source of which is the intake of the same internal combustion engine. The intake accordingly receives heat rejected by the engine having an external hot source.

Such a structure is very complicated to manufacture, expensive and requires a lot of space. Furthermore, this structure results in a considerable increase of the general level of temperature in the internal combustion engine, and in the hot side of the heat exchanger forming the hot source of the external hot source engine. Still further, the exhaust gases of the internal combustion engine are still very hot after having yielded heat as a hot source of the external hot source engine.

U.S. Pat. No. 4,520,628 proposes a Stirling engine the hot source of which is provided by the exhaust, at a very high temperature (1100° C., i. e. 1375K) of an internal combustion engine. Furthermore, the exhaust of the internal combustion engine is at a very high pressure thereby to enhance the heat exchange with the hot source of the Stirling. The device aims at advantaging the Stirling engine, so much that in an extreme case the internal combustion engine becomes a mere heating source producing no mechanical energy.

This device is complicated and causes the internal combustion engine to operate at an extremely high general temperature level. The gases are expelled by the system at 200° C. (475 K). This value may seem rather favorable, i. e. corresponding to a relatively low heat quantity yielded back to the cold source, in fact however the working gas of the Stirling also yields back heat to its own cold source. As a whole the increase in the theoretical yield is moderate by comparison with a diesel or other classical internal combustion engine operating alone.

Generally speaking, the known devices essentially aim at improving the yield when the engine operates near the full load condition, with very hot exhaust gases at the outlet of the positive displacement machine. Practically, the interest is limited: in a major part of the implementations, especially for road transportation, the engines operate most of the time at a relatively low load.

On the other hand, engines are known aiming at limiting the emissions of nitrogen oxides (NOx) by use of specific combustion processes beginning at a relatively high temperature in a low-oxygen working gas obtained by mixing air with recirculated exhaust gas (EGR="Exhaust Gas Recirculation"). While classical EGR is provided with a cooler for avoiding to heat the intake gas, such engines use a non-cooled EGR sometimes combined with a temperature conditioning of the intake air, or with a heating of the working gas in the working chamber by injection of hotter air in the working chamber or by injection and combustion of fuel in the working chamber before the top dead center (TDC) of the piston.

All these techniques directed to cleansing rather tend to adversely affect the theoretical yield due to lowering of the combustion temperature and lead to an increase of the exhaust temperature due to a spreading of the combustion process during the expansion stroke.

According to other, more classical technologies, the intake air is selectively heated especially when the engine operates in a cold condition. According to U.S. Pat. No. 8,042,335 B2, the air at the atmospheric pressure is selectively heated by partly travelling in contact with the exhaust manifold. The whole thermodynamic cycle is consequently displaced towards higher temperatures, without any benefit in terms of theoretical yield. According to U.S. Pat. No. 8,037,872 B2, the air compressed by the compressor travels through two successive intercoolers. The second intercooler, however, can become a heat exchanger with the coolant liquid, which itself can in certain circumstances be heated beforehand by a heater. Again, during operation while the intake air is heated, the whole cycle is displaced towards higher temperatures.

The present invention aims at proposing an internal combustion engine offering an enhanced yield by use of relatively simple means.

A more specific objective consists in enhancing the yield of an internal combustion engine operating under low or moderate load.

SUMMARY

According to a first aspect of the invention, the internal combustion engine comprising:
an power shaft;
means for pre-compression and volume reduction or compressor system for effecting pre-compression and volume reduction of a working gas, thereby to obtain a pre-compressed working gas at a first pressure;
a positive displacement mechanism or an engine block positive displacement mechanism having a working chamber partly defined by a movable member or piston coupled to the power shaft, and in which the pre-compressed working gas is successively subjected to
a heating by combustion near a top dead center of the movable member or piston, at which the volume of the working chamber is minimal;
at least an initial part of an expansion-depressurization, while the movable member moves towards a bottom dead center;
a discharge;
heat transfer means or a heat exchanger which, during warm engine operation, withdraws heat from the discharged working gas travelling downstream of the positive displacement mechanism at a second pressure lower than the first pressure, and yielding the heat to the pre-compressed working gas, thereby to cause the temperature of the pre-compressed working gas to be higher at the outlet of the heat transfer means than at the outlet of the pre-compression means or compressor system;
is characterized in that the pre-compressed working gas, heated in the heat transfer means or heat exchanger at a first temperature at a hot outlet of the heat transfer means or heat exchanger, is subjected, at least in part in the working chamber, to an additional compression with reduction of its specific volume and increase of its temperature before the combustion.

The expressions "top dead center", and "bottom dead center", or "TDC" and "BDC" respectively, designate two positions of the movable member or piston for which the volume of the working chamber has its extreme values, lowest and highest respectively, without this implying a high position and a low position of the movable member in the topographic meaning of these terms.

An idea on which this invention is based consists in amplifying a heat input into the pre-compressed gas and shifting that input towards the high temperatures. For such a revalorization of the thermal input the pre-compressed working gas having undergone the thermal input is subjected to an additional compression in the chamber of the positive displacement mechanism. In this way, even a relatively small heat input at a relatively low temperature is remarkably efficient and beneficial to the engine yield.

If for example subsequent to a thermal input amounting to 200 K the gas having reached the chamber of the positive displacement mechanism is subjected to an additional compression which doubles its temperature, the temperature at the end of this additional compression will be increased by 2×200=400 K by comparison with a compression having the same ratio which would have been made without a previous thermal input. During a compression where the temperature is doubled, the pressure is multiplied by about 11.3. Thus, thanks to the invention, a moderate heat input, performed at low temperature and pressure levels, will in the previous example equally enhance the temperature conditions in view of the second principle of thermodynamics as if a double input had been made under a double temperature and a 11.3 times higher pressure. According to the invention, an exchanger being simple because operating under moderate temperature and pressure and furthermore having to produce a relatively moderate temperature increase, produces the same beneficial effect as an exchanger which would have been much more expensive or even hardly feasible.

Furthermore, according to the invention, the working gas enters the positive displacement mechanism or engine block positive displacement mechanism at a moderate temperature and pressure, this greatly promoting an easing construction of the engine.

The heat transfer according to the invention only requires moderately hot calories available at the discharge of the positive displacement mechanism. This allows to improve the yield even for a very partial load. The enhancement of the yield is a result of the increase of the general level of the combustion temperature and/or of the decrease of the temperature of the burnt gases once cooled down in the heat transfer means. When the heat transfer raises the general temperature level in the positive displacement mechanism at part load, the discharge is generally hotter upstream of the heat transfer means or heat exchanger, whereby the heat transfer is furthermore facilitated in the engine according to the invention operating at part-load.

The invention allows for example to contemplate an engine, e. g. for a road vehicle, where the full-load operation is that of a conventional engine, and where the heat transfer according to the invention only takes place when the engine operates at part-load.

In this manner, the peak temperature and pressure levels for which the engine has been calculated are kept unchanged, and only the operating conditions at part load are improved, which prevail during 90% of the time. Preferably, the improved part-load conditions are such as to generate temperatures and pressures in the working chamber which are at most equal to those of full-load. The invention is accordingly adapted to be implemented with a positive displacement mechanism designed for maximum stresses which do not exceed those of a conventional engine.

Thanks to the heat transfer at a relatively low temperature according to the invention, it is possible to perform a very complete expansion-depressurization before entry of the burnt gases into the heat exchange means. The burnt gases may for example be caused to travel through at least one turbocharger turbine, or through several successive turbines of several turbochargers, before entering the heat transfer means. This or these turbochargers each comprise a compressor performing the pre-compression of the intake air before entry thereof into the heat transfer means.

It has appeared that in the engine according to the invention the energy required for pre-compression could be rendered equal to the mechanical energy still contained in the working gas discharged by the positive displacement mechanism before travel of the gas through the heat transfer means. The invention accordingly allows the entirety of the residual mechanical energy to be used for pre-compressing the intake gas, without having, as in the current engines, to let part of that mechanical energy escape through the exhaust or to dissipate it by creating head losses in the intake of the engine.

At the outlet of the heat transfer means, the burnt gases are at a particularly low temperature, when compared to that of the exhaust gases of a conventional engine.

The residual energy of the burnt gas as discharged by the positive displacement mechanism consists in the pressure of a gas being at a certain temperature. This energy contained in a given mass of gas allows to pre-compress the same mass of gas up to a higher pressure (called herein above "first pressure") because the intake gas to be pre-compressed starts from a much lower temperature. In this meaning, the engine according to the invention also adds value to the pressure energy of the working gas discharged by the positive displacement mechanism.

The heat transfer means have, or the heat exchanger has the effect of a "thermal telescope" which decouples from each other a cold part (contact with the cold source and pre-compression) of the thermodynamic cycle and a hot part (additional compression, combustion and expansion-depressurization) of the cycle. It is theoretically possible to expand the telescope at will, so that the hot part be as hot as desired with respect to the cold part. Practically speaking, one has to cope with the physical limits of the materials and gases, with the prescriptions in terms of pollution, and with the cooling requirements which adversely affect the actual yield.

In the following text, for explanation purposes and without any limiting effect on the invention, the following terms will be used:

"engine operation point": each operating condition of the engine, which will be considered here as essentially defined by the load level, itself considered as defined by the quantity of fuel burnt per thermodynamic cycle, the cycle being often considered as using 1 kg of working gas. Concretely, the engine operation point is additionally defined by numerous other more or less important parameters such as rotating speed of the engine shaft, ancillary controls applied by the operator or an external automatism, environmental parameters (ambient temperature and pressure etc.) parameters characterizing the condition of the engine, i. a. measurements provided by various sensors equipping the engine, etc. Each operation point essentially results in a cycle made of individual points of the (p, v) diagram, i. e. pressure (p) as a function of specific volume (v), or sometimes of the (p, V) diagram, i. e. pressure (p) in the working chamber as a function of the volume (V) of the working chamber. It is possible to specifically refer to a target operation point corresponding to a requirement applied to the engine, e. g. by the driver of the machine or vehicle equipped with the engine, and an actual operating point which describes at each time point the actual operating condition of the engine. "engine cartography": all the cycles foreseen to correspond to respective possible engine operation points, herein considered as mainly depending on the load level. The cartography can also define the processes (successive transient operation points) between an actual operation point and the target operation point. Parameters other than the load level will sometimes be mentioned as also being taken into account.

"engine control means": or control unit, the means, generally at least one electronic card, which receive the data (input controls, measurements, etc.) allowing to know the actual operation point, to define the target operation point and which apply to the engine the controls or target values corresponding to implementing the engine cartography.

Typically, in the engine according to the invention, only the positive displacement mechanism applies an engine torque to the power shaft. In such an embodiment, the engine distinguishes over certain known above-discussed engines wherein a machine with an external hot source contributes to the engine torque additionally to the positive displacement mechanism.

In an embodiment, in a condition of operation of part load and warm engine, the pre-compressed working gas is at a temperature of at least 450 K, preferably at least 550 K at the hot outlet of the heat transfer means.

Preferably, the additional compression is essentially adiabatic up to the beginning of the heating by combustion. The adiabatic compression increases the temperature at start of the combustion, this being favorable to yield and to quality of inflammation.

In some embodiments, the discharged working gas travels through at least one depollution apparatus or depollution system between the discharge of the positive displacement mechanism and a hot inlet of the heat transfer means. Especially at part load, depollution is rendered easier by the relatively high temperature prevailing at this location, by comparison with a conventional engine operating with the same load level.

In an embodiment, with the exception of the at least one depollution apparatus if provided, the working gas is in essentially adiabatic conditions between the discharge of the positive displacement mechanism and a hot inlet of the heat transfer means. There is neither a need to provide any supplemental heat, nor to evacuate any excess heat.

Preferably, in an operational condition of warm engine at part load, the discharged working gas leaves the heat transfer means substantially at a temperature exceeding by some tens of Kelvin the temperature at which the pre-compressed working gas reaches the heat transfer means.

In this way, the discharge working gas heats up as much as possible the pre-compressed working gas, the difference of some tens of Kelvin being necessary for allowing the heat transfer to take place.

In the same or another embodiment, at least in an operating condition of warm engine at part load, the whole quantity of working gas discharged by the positive displacement mechanism, except as the case may be a fraction of the working gas derived into a recirculation path, and the whole quantity of the pre-compressed working gas, are involved in the heat exchange in the heat transfer means. At each time point, the mass flow rate of pre-compressed gas and the mass flow rate of discharged gas which is not diverted into a recirculation path (EGR) are substantially equal. They are accordingly perfectly adapted to cause the whole quantity of discharged gas travelling towards the exhaust to be cooled down almost to the temperature of end of pre-compression and to cause the pre-compressed working gas to be heated up almost to the temperature of the discharged gas reaching the heat transfer means.

In an embodiment, there is provided an additional heating means capable of heating up the working gas in its path between the hot outlet of the heat transfer means and the intake of the positive displacement mechanism, and by means for activating the additional heating means during an initial phase of cold start.

When the engine is cold, the burnt gas discharged by the positive displacement mechanism may be not hot enough for sufficiently heating the intake gas in the heat transfer means. The additional heating means is activated to heat up the intake gas in place of or in addition to the heat transfer means. This raises the general temperature level in the positive displacement mechanism, and consequently the gas temperature discharged by the positive displacement mechanism, which gas is then very quickly able to sufficiently heat up the pre-compressed working gas. It is then possible to cancel, possibly with some progressivity, the power of the additional heating means.

In an embodiment, in a condition of warm engine at part load, the pre-compressed working gas is in essentially adiabatic conditions from the hot outlet of the heat transfer means and up to the beginning of the combustion, except as the case may be for a mixture of the pre-compressed working gas with recirculation working gas.

In an advantageous embodiment, the engine comprises for part of the working gas discharged by the positive displacement mechanism at least one hot recirculation path ("EGR": "Exhaust Gas Recycling") extending from a derivation location located between the discharge of the positive displacement mechanism and the hot inlet of the heat transfer means, up to a mixture location located between the hot outlet of the heat transfer means and the intake of the positive displacement mechanism. The above-mentioned derivation and mixture locations are subjected to temperatures close to each other, so that the EGR gas produced thereby can be thermally favorable in the meaning of this invention.

In an embodiment, when an external recirculation path is provided, in a warm engine condition, the working gas is in essentially adiabatic conditions between the mixture location and the beginning of the heating by combustion, except as the case may be for the mixture with working gas trapped within the working chamber at the end of the discharge phase. The trapped working gas considered here may be gas unavoidably trapped within the "dead volume" (the volume of the working chamber when the movable member is at its TDC) at the end of the discharge phase. It can also be foreseen to early close the discharge orifice thereby to increase the trapped quantity and accordingly create a so-called "internal" recirculation, which will be again discussed herein below. This is possible in addition to or in replacement of the external recirculation.

Preferably, at least in a lower range of the load levels, the recirculation gas may be not cooled down. Its thermal input into the working gas reaching the intake can be taken into account in the definition of the engine operation point, generally by means of an increase of the pre-compression pressure. The increase of heat restituted to the cold source is only apparent since it concerns part only of the mass of gas having travelled through the working chamber.

In an embodiment of the engine having an external recirculation path, the recirculation path comprises a compressor, preferably with an adjustable flow rate. The compressor raises the pressure of the recirculation gas from the pressure of discharge out of the positive displacement mechanism up to the first pressure. The result is a further increase of the recirculation gas temperature, which can be taken into account in the operation point as mentioned herein above. The adjustment of the flow rate of the compressor allows to meter the recirculation gas rate ("EGR rate") in the working gas at the intake of the positive displacement mechanism.

At least in a warm engine condition at part load, between the mixture location and the intake into the positive displacement mechanism the temperature of the working gas may exceed the temperature of the pre-compressed working gas exiting the heat transfer means. Such a difference is generated by the heating due to the mixture with the hotter recirculation gas.

Means may however be provided for reducing the general temperature level of recirculation, active at least for a high load level. This aims at avoiding excessive temperatures when the engine operates under high load levels.

As mentioned above, in some embodiments, the positive displacement mechanism is capable of terminating a discharge phase of the working gas before the top dead center of the movable member, thereby to subject to an internal recirculation the part of the working gas trapped within the working chamber at the end of the discharge phase. Such a recirculation is especially advantageous in view of its simplicity. Moreover, in a conventional positive displacement mechanism having valves which open inwardly of the chamber, the internal recirculation allows to maintain the valves closed or only slightly open when the movable member such as a piston is at the top dead center. This makes the realization of a positive displacement mechanism having a high compression ratio easier.

In an advantageous embodiment, the engine comprises real-time controlled means for adjustably distributing the recirculation flow between at least two recirculation paths selected among an internal recirculation path by trapping of the working gas in the working chamber at the end of the discharge phase, a cooled external recirculation path, a non-cooled external recirculation path and a selectively cooled external recirculation path. It is possible to consider a non-controlled internal recirculation path and a control only concerning the additional recirculation in the form of an external recirculation with an adjustable flow rate, and possibly the temperature of this additional recirculation.

Preferably, an effective compression between the hot outlet of the heat transfer means and the top dead center in the positive displacement mechanism is smaller than a volume ratio of the expansion in the positive displacement mechanism starting from the top dead center. The "effective compression ratio" should be understood here as the ratio between the specific volume of the gas ready to enter the positive displacement mechanism and the specific volume at the end of the additional compression. In other words, there is meant the really additional compression, without counting therein a recompression possibly necessary in certain embodiments as will be discussed later.

In an advantageous embodiment, the positive displacement mechanism is of the four stroke type comprising a volume increase stroke during which the working gas at the first pressure enters the working chamber and then expands in the working chamber until reaching at the end of the volume increase stroke a third pressure smaller than the first pressure.

In some embodiments a point of closure, with respect to the top dead center and the bottom dead center, of an intake orifice for intake of the working gas into the working chamber is controlled in real time as a function of at least one operational parameter of the engine.

More generally, in some embodiments, an effective volume ratio of the additional compression in the positive displacement mechanism is real-time controlled as a function of at least one operation parameter of the engine. For example, arrangements can be provided for causing the effective volume ratio of the additional compression between the hot outlet of the heat transfer means and the end of the additional compression to vary in a direction contrary to that of the load level. This is of advantage especially if the pre-compression pressure increases with the load level.

The at least one operation parameter of the engine is for example: the engine load, evaluated e. g. from the injected fuel amount; the pressure at the outlet of the positive displacement mechanism; the temperature at the hot side or the cold side of the heat transfer means; the temperature at the inlet of the positive displacement mechanism; the temperature at the outlet of the positive displacement mechanism etc., and more generally any parameter describing the engine target operation point or actual operation point. The variation of the closure point of the intake orifice allows to define the mass of working gas entering the positive displacement mechanism at each cycle, knowing the pressure and temperature of the gas ready to enter the working chamber.

Advantageously, in an engine according to the invention, the effective volume ratio of the additional compression can be caused to vary in a direction contrary to that of the load level of the engine.

Nevertheless, a cartography of the engine wherein this effective volume ratio remains substantially constant appeared to be feasible.

Especially in this case, the closure point, with respect to the top dead center and the bottom dead center, of an intake orifice of the positive displacement mechanism may be invariable.

In a preferred embodiment, the heat transfer means comprise a heat exchanger in which the working gas discharged by the positive displacement mechanism and the pre-compressed working gas flow in essentially opposed directions. In this manner the pre-compressed working gas travelling through the heat exchanger exits therefrom at a temperature almost equal to that at which the discharged gas enters therein. The pre-compressed working gas mass flow rate is similar to the discharged working gas mass flow rate. Accordingly, if the entirety of the pre-compressed working gas travels through the heat exchanger, the gas lowers the discharged working gas temperature almost down to the temperature of end of pre-compression. This minimizes the temperature and the amount of the heat restituted to the cold source.

Preferably, the engine adjustments, in particular the engine cartography, for different load levels of the engine are such that, in operation while the engine is warm, the temperature of the hot inlet of the heat transfer means does not vary a lot, typically by less than 100K, whatever the load level of the engine, at least in a usual range of load levels. This enables the engine to easily perform the transitions between different load levels, without coping with heating or cooling time lags of the hot part of the heat transfer means. This is allowed by the engine according to the invention thanks to the control flexibility of the "thermal telescope", as will be seen in the exemplary embodiments. Furthermore, this control choice is consistent with the one consisting in causing the engine to operate close to its physical limits for all load levels.

According to one embodiment, the adjustments, in particular the engine cartography, are such that the expansion curves in a diagram of the working gas pressure as a function of its specific volume for different load levels are substantially superposed at least in their portion corresponding to the low pressures.

The exhaust system of the engine according to the invention is preferably capable of operating in a free exhaust mode. Since the invention allows to extract the entirety of the residual pressure of the working gas discharged by the positive displacement mechanism, the exhaust gas having traveled through turbines, heat transfer means and depollution systems has no more than a very attenuated acoustic energy.

In an advantageous embodiment, at least in a range of the load levels, the pre-compression pressure increases as the load level increases. This allows to transfer a greater quantity of the discharged working gas heat to the pre-compressed working gas while avoiding that the maximum stress point of the cycle reaches prohibitive temperature and pressure levels under high load.

In a preferred embodiment, the pre-compression pressure increases only up to a top value and then remains below or substantially equal to the top value when the load exceeds the level for which the top value has been reached. In this embodiment the intake pressure is limited. This renders the realization of the engine easier. As a counterpart, a less enhanced yield is accepted, by comparison with a conventional engine.

In a preferred embodiment, the pre-compression is at least in part operated by the compressor of a turbocharger having a turbine part disposed in the path of the working gas discharged by the positive displacement mechanism, the turbine part having a power which spontaneously increases with the load level. Such a power increase with the load is typical of most of the turbochargers. To promote this, the engine cartography may be such that the energy available at the outlet of the positive displacement mechanism increases with the load. It is also possible to increase the pre-compression ratio by appropriately controlling the power of the pre-compression apparatus (adjustable turbocharger vanes, adjustable driven supercharger, etc.).

When the pre-compression is at least in part operated by the compressor of a turbocharger, the turbine thereof is preferably disposed in the path of the discharged working gas upstream of the heat transfer means.

The use of a turbocharger allows to limit the displacement of the positive displacement mechanism, as in a conventional engine. But with the invention an additional advantage is obtained. The discharged gas is hotter when exiting the positive displacement mechanism than in a conventional engine, and thus contains more available energy for generating more pre-compression pressure, this allowing an advantageous increase of the difference between the first and the second pressure.

In an advantageous embodiment, the turbocharger is deprived of power-limitation means, especially deprived of a by-pass. It is possible to recover the entirety of the energy available at the discharge for generating a maximum pre-compression power, and then regulate by another means the working gas quantity admitted into the working chamber at each cycle. This other means can be for example an intake phase occurring over part only, possibly an adjustable part, of a volume-increase stroke of the working chamber. This avoids the energy dissipations (gas throttle valve, exhaust by-pass, etc.) of the conventional engines and at the same time the difference between the first and the second pressure is maximized.

In an embodiment of the invention, the pre-compression means or the compressor system includes at least two pre-compression stages, and means for selectively deactivating at least one pre-compression stage. More particularly, the de-activation can occur when the load level is in a lower range of the load levels, thereby to cause, as explained herein above, the pre-compression pressure to be higher when the load is high, at least in a usual range of the load levels.

In an equally preferred embodiment, the pre-compression means comprise or the compression system includes at least two pre-compression stages and the engine comprises control means of the compression ratio of at least one of the pre-compression stages as a function of the current operation point. For example, there can be provided one compression stage pertaining to a turbocharger continuously operating at its maximum power permitted by the energy contained in the discharged working gas, and a controlled stage which adjusts the pre-compression pressure by means of an additional pressure which varies as a function of the operation point. In an embodiment, for certain operation points the additional pressure may be zero, in particular under a low load only needing a relatively low pre-compression and\or under a high load thereby to cause the engine to operate somewhat like a conventional engine.

Generally speaking, a preferred embodiment of an engine according to the invention comprises control means which cause the pre-compression pressure to vary as a function of the current operation point.

According to an optional feature of the invention, the engine according to the invention comprises thermal adjustment means for moderating the temperature of the pre-compressed working gas reaching the positive displacement mechanism by comparison with the temperature of the discharged working gas available upstream of the heat transfer means when the load level is in an upper range.

Thanks to the moderation, the optimal pressure for the pre-compression is also moderated without causing the maximum stress point of the thermodynamic cycle to correspond to prohibitive temperature and/or pressure values and/or without causing the displacement of the engine to be too large for a given engine torque. With this feature of the invention, the thermodynamic cycle of the engine can become closer and closer to that of a conventional engine for higher and higher load levels.

In one embodiment, thermal adjustment means are provided for all the more moderating the temperature of the pre-compressed working gas reaching the positive displacement mechanism, by comparison with the temperature of the discharge working gas available upstream of the heat transfer means, as the load level is higher In particular, but without this being a limitation, at and above a certain load level, the thermal adjustment means cool down the pre-compressed working gas travelling to the positive displacement mechanism, by comparison with the temperature at the end of the pre-compression. Under such load levels, the thermodynamic cycle becomes closer to that of an intercooled supercharged engine, possibly improved by certain features described herein above or below.

The thermal adjustment means may be means for causing all or part of the discharged working gas to by-pass the heat transfer means, thereby to decrease or cancel the thermal power available to heat up the pre-compressed working gas, or means allowing, as will be discussed later, the pre-compressed working gas to by-pass the heat transfer means.

In one embodiment the pre-compression means comprise or the compressor system includes two stages with an intercooler there-between, and when the load level is in a higher range of the load levels, the thermal adjustment means allow the pre-compressed working gas selectively to go to intake of the positive displacement mechanism substantially in its thermodynamic condition of its exit from the intercooler through a by-pass-branch by-passing the thermal transfer means. In this embodiment, the same intercooler is used to moderate the temperature of the intake gas under high load and save energy in the second pre-compression stage for the lower load levels.

In a version of this embodiment, in an intermediate range of the load levels the working gas exiting the intercooler travels through the upper pre-compression stage and then for one part through the heat transfer means and for another part through the by-pass branch.

For the higher load level, the upper pre-compression stage is inactive, i, e. for example de-activated and/or by-passed by the working gas exiting from intercooler.

This embodiment is furthermore remarkable in that the transition between the intermediate range wherein the upper pre-compression stage is active, and the higher range wherein the stage is inactive can be remarkably simple: the upper pre-compression stage is progressively de-activated by progressively reducing its power. Conversely at the transition between the higher range and the intermediate range the upper pre-compression stage is progressively activated. This does not affect the thermodynamic cycle a lot if the effective volume ratio of the additional compression is jointly adjusted in an opposite direction thereby to cause the pressure to have the desired value at the end of the additional compression.

Not only in the just described embodiments with an intercooler, but also in other advantageous embodiments, the engine comprises means, such as an intercooler, for cooling down the working gas during the pre-compression. The energy needed for performing the pre-compression is thereby reduced, in particular that part of the pre-compression which occurs downstream of the above-mentioned cooling. The cooling down means may in particular be an intercooler.

In an embodiment, in the intercooler, the working gas between the two pre-compression stages is cooled down by working gas coming from the cold outlet of the heat transfer means and then expanded in an apparatus for the energization of at least one of the pre-compression stages. Such an intercooler is advantageous because it obviates the need of an external air flow.

In a compact embodiment, the engine comprises at least one inlet turbocharger having:
 a turbine through which the working gas travels downstream of the cold outlet of the heat transfer means, and
 a compressor belonging to the pre-compression means.

In a preferred embodiment the pre-compression means comprise a so-called "autonomous" compressor driven independently from the discharged gas. The autonomous compressor can be a compressor coupled to the engine shaft or driven by an energy source external to the engine, or still further an energy indirectly issuing from the engine, such as electrical or hydraulic energy partly or totally generated by a machine driven by the engine, etc.

This embodiment allows an optimization of the engine in terms of weight, actual yield and/or control efficiency.

According to an improvement, the autonomous compressor has an adjustable power, in particular an adjustable flow rate as a function of an engine cartography.

In a particularly appreciated embodiment, the autonomous compressor is mounted in series with a compressor of a turbocharger, preferably downstream of the turbocharger compressor.

In an embodiment, the pre-compression means comprise at least two stages and the engine comprises means selectively to de-activate at least one of the pre-compression stages.

More specifically, the at least one stage may be controlled to de-activation when the load is in a lower range thereby to cause, as mentioned herein above, the pressure at the end of pre-compression to be higher when the load is higher.

The expression "engine of the specified type" will designate herein after an internal combustion engine comprising a positive displacement mechanism in which after an intake phase into a working chamber the pre-compressed working gas is successively subjected in the working chamber to:
 at least part of a compression called "additional compression",
 a heating by a combustion at or near a top dead center of the positive displacement mechanism,
 at least an initial part of an expansion and pressure decrease.

A second aspect of this invention relates to an engine of the specified type comprising means for modifying the working gas temperature upstream of the inlet into the positive displacement mechanism during the operation while the engine is warm, the modification taking place substantially without any pressure modification. "Substantially without any pressure modification" means that for example a slight pressure drop is possible due to the head loss undergone by the gas due to its flow. The engine according to the second aspect can be in accordance with that of the first aspect and possibly with one or more of its improvements. When the engine complies with the first aspect, the means for modifying the temperature comprise the heat transfer means according to the first aspect.

According to the second aspect, the engine is characterized in that the gas path upstream of the inlet into the positive displacement mechanism comprises at least two operatively parallel branches, one of which extends through the temperature modifying means and at least another of which by-passes the temperature modifying means, and the engine furthermore comprises adjustable distribution means or valves for distributing the flow rate between the two branches thereby to cause the gas to be hotter at the inlet into the positive displacement mechanism for an operation under a lower load than for an operation under a higher load when the engine is warm.

The other branch can be a substantially adiabatic branch or a branch which modifies the temperature in a way which is different from the first branch, as will be discussed later.

The second aspect relies upon the idea explained herein above with respect to the first aspect, namely that there is an interest in heating up or at least less cooling down the working gas before its entry into the working chamber for a part-load operation. Many current engines comprise an intercooler which cools down the working gas after its pre-compression. This is useful at full load or high load, but is detrimental for the yield at part-load. The second aspect of the invention makes it possible to contemplate an engine in which the working gas travels through the intercooler at full or high load, and by-passes the intercooler under low or moderate load.

The second aspect of the invention also allows to adapt the working gas temperature as a function of the external temperature and/or of the engine temperature, more specifically the coolant fluid temperature, for improving the "cold" operation of the engine, that is to say the operation phase from starting until the coolant fluid has reached its normal temperature, generally about 212° F. (=375 K). Thanks to the second aspect of the invention it is possible to more heat up or less cool down the working gas before entry thereof into the positive displacement mechanism when the external temperature is lower and/or when the engine is "cold". The cold start phase can thus be shortened, made less polluting, less energy-consuming and less detrimental to the engine.

When the engine according to the second aspect also complies with the first aspect and possibly with one or more of its improvements, it is characterized in that it comprises thermal adjustment means which include, for the travel of the working gas between the outlet of the pre-compression and the inlet into the positive displacement mechanism, at least two operatively parallel branches comprising a heating branch provided with the heat transfer means, and at least one by-pass branch which by-passes the heat transfer means, and in that the engine comprises adjustable distribution means in order selectively to distribute the flow rate between the branches, the heating branch receiving at least part of the flow rate during operation under a low load.

In this way, an engine is realized which fully enjoys the technical effects and advantages of the engine according to the first aspect when operating under a moderate load, but which can operate differently under a high load, especially for avoiding excessively high temperatures at the end of the combustion in the working chamber under a high load.

The second aspect of the invention also allows to facilitate implementation of the first aspect of the invention, especially for medium or higher loads with the counterpart of a slight decrease of the theoretical yield under such load level. As discussed herein above, the first aspect of the invention generally results in the selection of a high pre-compression pressure when the load level is high. This is especially true when the temperature of the working gas entering the positive displacement mechanism has been made equal to that of the discharged working gas available for the heat transfer. With the second aspect of the invention, the working gas entering the positive displacement mechanism can under certain conditions, especially under a high load, have a lower temperature than the discharged gas available for the heat transfer. In such situations the pre-compression pressure which is then optimal for implementation of the first aspect of the invention is consequently lower. There is thus provided an engine having an excellent yield under low or moderate load without needing pre-compression means able to generate high pre-compression pressures. This is of great advantage for engines most frequently operating under a moderate load, like the road vehicle engines.

By causing the entirety, part or nothing of the working gas to travel through the heat transfer means before its entry into the working chamber, the working gas temperature is regulated without having to divert the burnt gases, the entirety of which (except a fraction, if any, which is diverted into a recirculation path) can continue to travel through the heat transfer means even when at least part of the working gas flowing to intake does no longer travel through the heat transfer means. The temperature of the hot side of the heat transfer means thus does not vary a lot. This cancels the risk of a detrimental transition time lag if the engine is suddenly required to recover an operation point for which the working gas flowing to the intake needs be heated up in the heat transfer means.

In an embodiment, at least for certain load levels, the distribution means supply working gas simultaneously to two different branches thereby to cause the working gas directed to the positive displacement mechanism to have a temperature intermediate between those of the outlets of the two branches. This allows finely to adjust the temperature of the working gas sent to the positive displacement mechanism.

Generally speaking, for the implementation of the second aspect of the invention in an engine comprising a pre-compression, or for the joint implementation of the first and the second aspect, there is an advantage if the at least one other branch comprises a cooled down branch, especially comprising an intercooler. This realized provides an engine capable of operating like a conventional intercooled supercharged, e. g. turbocharged engine under full load, and having an increased yield in other situations, especially under low load, thanks to a higher combustion temperature and/or a lower temperature of the exhaust gas.

Preferably, the at least one by-pass branch comprises a substantially adiabatic branch, that is to say neither heated up nor actively cooled down.

In an improved, but non-limiting embodiment, there are provided three branches, i. e. the heating branch, the substantially adiabatic branch and the cooled-down branch, and depending on the current operation point the distribution means distribute the working gas between the three branches thereby to obtain at the intake of the engine a working gas having the desired temperature.

In all these embodiments the distribution means and/or more generally the temperature adjustment means are typically controlled in real time by control means which comply with an engine cartography.

According to an embodiment, the heating branch receives the entirety of the pre-compressed working gas when the load level is in a lower range of the load levels. This optimizes the engine yield for the lowest load levels, which can include those most often used, e. g. in a vehicle.

Preferably, in this embodiment and when the first aspect is moreover implemented:

- for a load level pertaining to a lower range, the pre-compressed working gas only travels through the heating branch;
- for a load level pertaining to a mid-range, the pre-compressed working gas only travels through the essentially adiabatic branch; and
- for a load level pertaining to an upper range, the pre-compressed working gas only travels through the intercooled branch.

Even more advantageously:

- for a load level pertaining to a lower intermediate range located between the lower range and the mid-range, the pre-compressed working gas travels in part through the heating branch and in part through the essentially adiabatic branch;
- for a load level pertaining to an upper intermediate range, the pre-compressed working gas travels in part through the essentially adiabatic branch and in part through the intercooled branch.

The same cartography can be obtained with merely a heated branch and a cooled down by-pass branch and by mixing for example 0 to 100% of pre-compressed working gas traveling through the cooled down branch with, respectively, 100 to 0% of working gas travelling through the heated branch. The interest of the adiabatic branch resides in a reduction of the head loss and in a limitation of the required cooling, more particularly the required cooling air.

In the embodiment and the improvement which have just been described, as well as everywhere else in this application where load level ranges are discussed, the limits between ranges may fluctuate depending on operation parameters other than the load level. For example, if the ambient temperature is low, the limits between ranges can be raised.

In an advantageous embodiment of the engine complying with one or more aspects of the invention, the heating by combustion is operated by fuel injection into the working gas being in the positive displacement mechanism at a temperature above the self-ignition point of the fuel. This heating mode is favorable as it is compatible with high temperatures when the combustion starts. The combustion occurs in good conditions, the use of "pilot" injections may be reduced or dispensed with. If needed, a relatively high EGR rate and/or a spreading of the injection over time enables to limit the peak temperatures and the accompanying drawbacks.

The invention is compatible with a positive displacement mechanism of the Otto type (with spark plug ignition). At part load, the heat transfer means according to the invention raise the intake gas temperature thereby to cause the air-fuel mixture temperature at the time-point of effective start of the combustion to be substantially at the same level as under high load, i. e. just below the limit value beyond which a detrimental self-ignition is liable to occur.

In another advantageous embodiment of the engine according to one or more of the aspects of the invention, the heating is operated by homogenous combustion of a pre-constituted mixture of air, fuel and recirculation gas.

The so-called "homogenous" combustion mode generally needs a relatively high temperature in the beginning of the combustion in combination with a relatively high rate of hot EGR, up to 70%. The thermal conditioning resulting from the first or the second aspect of the invention with respect to the working gas entering the positive displacement mechanism allows this without requiring an additional heat input which would adversely affect the yield.

Generally speaking, the working gas exiting an engine according to the first or the second aspect of the invention may be at an absolute pressure less than around 200 kPa and a temperature less than around 375 K.

In a typical embodiment, an engine according to one or more aspects of the invention comprises control means which substantially jointly adjust the fuel quantity and the working gas volume, the volume measured just upstream of the intake orifice of the positive displacement mechanism, which are introduced in the positive displacement mechanism for each cycle, as a function of the current operation point. Such adjustments may more specifically be selected thereby to cause the temperature and the pressure of the discharged gases to be such that the pre-compression pressure and the temperature at the inlet of the positive displacement mechanism will be those desired for implementation of the first aspect of the invention. If the second aspect of the invention is moreover implemented, an additional adjustment consists in distributing the working gas flow between the various branches of the path.

According to a third aspect of the invention, the method for enhancing the yield of an internal combustion engine, the engine operating combustion in a working gas, wherein during a warm-engine operation the working gas subjected to a first pressure in a pre-compression condition upstream of an intake into a positive displacement mechanism is pre-heated with heat collected from the working gas subjected to a second pressure lower than the first pressure, downstream of a discharge from the positive displacement mechanism in which the working gas undergoes a combustion and an at least partial expansion-depressurization, characterized in that the working gas is subjected to an additional compression in the positive displacement mechanism before the beginning of the combustion.

Other features and advantages of the invention will become apparent from the following description, relating to non-limiting examples.

DETAILED DESCRIPTION

Figure 1:
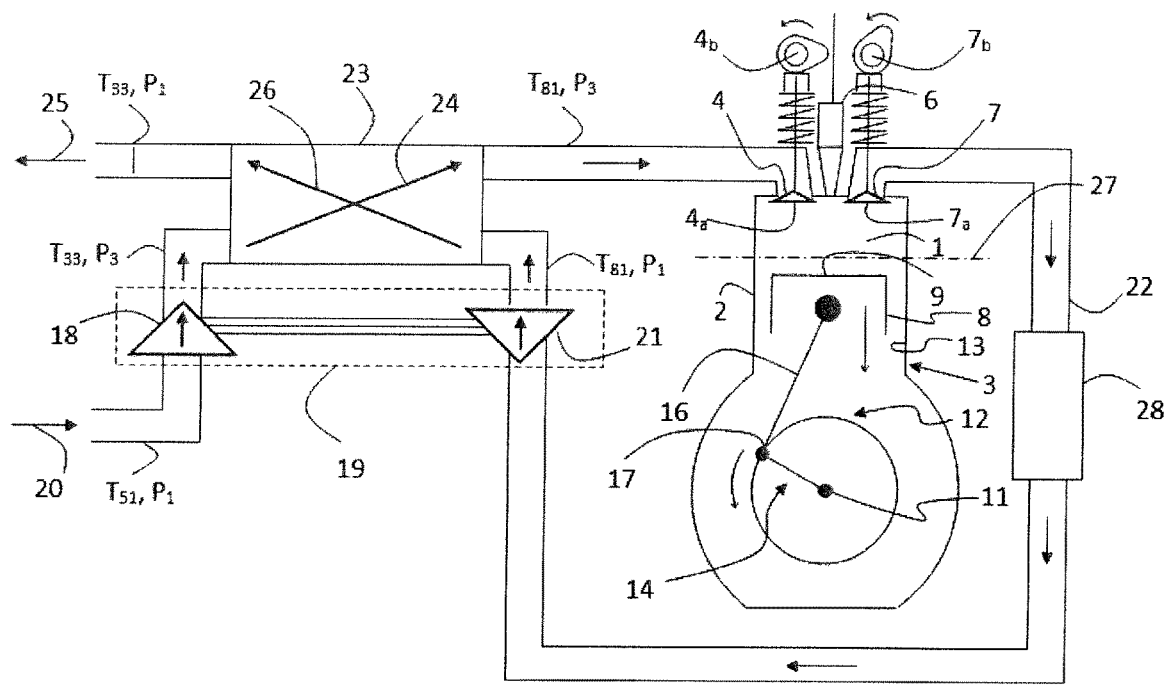
FIG. 1 is a sketch showing the basic concept of a first embodiment of an engine according to the invention.

The diagrams of thermodynamic cycles of FIGS. 7, 7A, 8-10, 12, 15, 18, 22, 24, 25 and 27 are merely illustrative and more particularly are dimensionally distorted for a better readability, the real parameter values corresponding to the different particular points of the represented cycles being when needed given in the following description.

It should be understood that every described feature is liable to contribute to define the invention, such a feature being taken in its described form or in any other more or less generalized form, in combination or not with all or part of the features described in the same paragraph or in the same sentence or elsewhere in this description, if it appears that such feature, as described and/or possibly generalized or combined, is able to distinguish the invention over the prior art.

In the embodiment of FIGS. 1-6, the positive displacement mechanism 3 comprises a working chamber 1 defined in an engine block 2. The engine block 2 comprises an intake orifice 4 for introducing a working gas in the working chamber 1 during an intake stroke, combustion means or ignition device 6 for starting a combustion within the working gas in the working chamber, and a discharge orifice 7 for allowing at least part of the "burnt" working gas to exit the working chamber 1 during a discharge stroke. The intake and discharge orifices can be selectively opened and closed. In the example the orifices 4 and 7 each comprise therefor at least one valve 4a and 7a respectively, controlled by a cam 4b and 7b. The term "discharge" is used herein rather than "exhaust" because, as will be seen in detail later, before escaping to the atmosphere or more generally to the ambient medium, the working gas undergoes further phases of the thermodynamic process following its travel through the discharge orifice 7 associated with the working chamber 1.

The positive displacement mechanism 3 furthermore comprises a piston 8 having a working face 9 contributing to bounding the working chamber 1 and causing the volume of the working chamber to vary. The piston 8 is connected to a power shaft 11 through a motion transformer 12. Thanks to the motion transformer 12 a continuous rotation of the power shaft 11 is concomitant with a cyclic motion of the piston 8. During its cyclic motion the piston 8 travels through a so-called "top dead center" (or "TDC") position in the usual terminology, wherein the working chamber 1 volume is at a minimum, and through a so-called "bottom dead center" (or "BDC"), in the same terminology, wherein the working chamber 1 volume is at a maximum. Means not shown but well-known in their principle synchronize, possibly in a variable manner, the cams 7a, 7b and the combustion means 6 with the angular position of the power shaft 11.

In the represented example, the piston 8 is of the type sliding in a cylindrical bore, commonly called "cylinder", 13 formed in the engine block 2. Sealing means, not shown, leak-tightly close the annular contact between the piston 8 and the cylinder 13. The motion transformer 12 is here of the connecting rod and crankshaft type. It comprises a crankshaft 14 fast with the power shaft 11, and a connecting rod 16 having an end (connecting rod eye) pivoted to the piston 8 and another end (connecting rod big end) pivoted to a crankpin 17 of the crankshaft 14.

The engine collects combustive working gas at an inlet 20 and expels at least partly "burnt" working gas at an exhaust 25. The combustive working gas is typically air from the atmosphere.

According to the invention, the engine comprises means for pre-compression of the working gas before its entry into the working chamber.

In the illustrated example, the pre-compression means comprise a compressor 18 mounted in the working gas path upstream of the inlet into the working chamber 1. The compressor 18 raises the pressure of the working gas up to a pressure $p_3$ higher than the reference pressure $p_1$ which usually is the atmospheric pressure (the selection of the indexes appended to the various parameters for designating particular values of those parameters will be explained later)

Due to the essentially adiabatic compression in the compressor 18, the working gas temperature varies from a temperature $T_{51}$ at its inlet into the compressor 18 to a temperature $T_{33}>T_{51}$ at its exit from the compressor 18.

Typically, the compressor 18 is part of a turbocharger 19 furthermore comprising a turbine 21 actuated by the working gas discharged from the working chamber 1 when the discharge valve 7a is open. The turbine 21 drives the compressor 18 while depressurizing the burnt gas in an essentially adiabatic manner.

At the outlet of the turbine 21, the burnt gas is at a temperature $T_{81}$ higher than the temperature $T_{33}$ of the pre-compressed gas exiting the compressor 18, and at a pressure which is preferably lower than the pressure $p_3$ of the pre-compressed gas exiting the compressor 18, and which is even more preferably substantially equal to the reference pressure $p_1$.

According to the invention, the pre-compressed working gas exiting the compressor 18 is directed to the working chamber 1 through the heat-receiving path 24 of a heat exchanger 23. At the outlet of the turbine 21, the discharged gas travels through the heat-yielding path 26 of the heat exchanger 23. The heat-receiving path 24 extends from a cold inlet to a hot outlet of the heat exchanger 23. The heat-yielding path extends from a hot inlet to a cold outlet of the heat exchanger 23. Downstream of the heat-yielding path, the discharged gas escapes to the atmosphere through exhaust 25.

Preferably the heat exchanger is of the counter-flow type, whereby the discharged gas exits the heat exchanger 23 substantially at the temperature $T_{33}$ at which the pre-compressed gas enters the heat exchanger, and the pre-compressed gas exits the heat exchanger 23 substantially at the temperature $T_{81}$ at which the discharged gas enters the heat exchanger 23. Practically, the discharged working gas is hotter when entering and when exiting the heat exchanger, by some tens of Kelvin, than the pre-compressed working gas exiting and entering, respectively, the heat exchanger 23, because of the imperfect nature of a real heat exchanger, but unless contrarily stated this difference will be neglected herein. Each gas keeps a substantially unchanged pressure within the heat exchanger (except for the head loss due to flow, which will be neglected herein).

Figures 2, 3, 4, 5, 6:
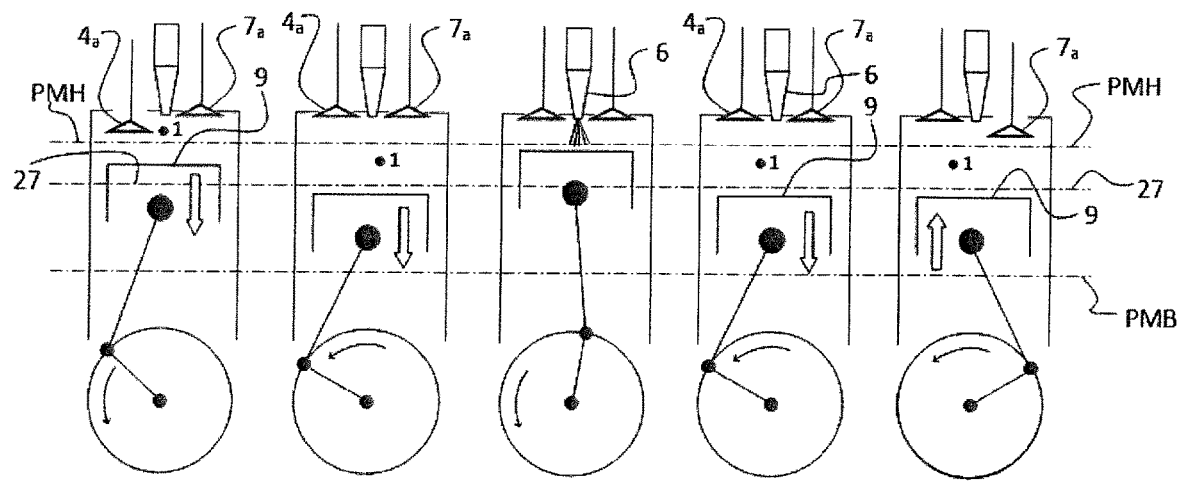
FIGS. 2-6 are partial views of the positive displacement mechanism of the engine of FIG. 1 at various successive steps of the cycle.

As shown in FIG. 2, the pre-compressed gas raised at the temperature $T_{81}$ and pressure $p_3$, is received within the working chamber 1 during an intake stroke during which the intake valve 4a is open while the piston 8 travels from its TDC down to an intermediate position indicated by a dash-dotted line 27. Practically, like in a conventional engine, the intake valve 4a can begin to open before arrival of the piston 8 at TDC. Furthermore, valve 4a can be only partly open when piston 8a is at TDC, this allowing TDC to lie higher in the cylinder 3 than illustrated in FIG. 2 without risking an interference of the piston 8 with the intake valve 4a.

When the piston 8 reaches its intermediate position 27, the intake valve 4a closes while the exhaust valve 7a remains closed (FIG. 3). The piston 8 continues its travel towards BDC while the working gas present in the working chamber is now captive therein.

This causes an adiabatic expansion-depressurization of the working gas. The piston 8 reaches its BDC and then performs an adiabatic compression stroke of the working gas from BDC to TDC (FIG. 4). This adiabatic compression comprises a re-compression phase from BDC to intermediate position 27, at which the working gas recovers the conditions $p_3$, $T_{81}$ of the pre-compressed working gas. Then, from the intermediate position 27 up to TDC, the adiabatic compression comprises an additional compression phase at the end of which the working gas is at a temperature $T_{14} > T_{81}$ and a pressure $p_4 > p_3$. In the vicinity of TDC, the combustion is started by the combustion means 6 (FIG. 4).

As a whole, and independently from the just described process, the important is the adiabatic increase of the pressure and temperature of the working gas in the working chamber between its exit from the heat exchanger 23 and the combustion, thereby to cause the temperature $T_{14}$ and the pressure $p_4$ just before combustion to be higher, respectively, than the temperature $T_{43}$ ($=T_{81}$) and the pressure $p_3$ of the pre-compressed working gas exiting the heat exchanger 23.

This additional compression in the working chamber 1 has the double effect of raising the level and amplifying the temperature raise performed by the heat exchanger 23. If the heat exchanger 23 raises the intake gas temperature by 200 K, for example from $T_{33}=400$ K to $T_{43}=600$ K, and if the adiabatic compression doubles the temperature, it appears that thanks to the heat exchanger the combustion starts at a temperature of 1200 K instead of 800 K, thus increased by 400 K which is twice the temperature raise performed by the heat exchanger 23.

In this example, the invention thus allows that a heat exchange over 200 K amplitude, at an average temperature of 500 K, induces a useful temperature raise of 400 K at an average temperature of 1000 K.

Furthermore, the heat exchanger according to the invention operates at a low pressure whereas the temperature raise obtained at the end of the compression in the cylinder takes place under a much higher pressure, namely $2^{3.5}=11.3$ times higher in the example of a multiplication of the temperature by 2 during compression.

The invention thus highly revalorizes the calories recovered at a relatively low temperature at the outlet of the positive displacement mechanism, usually deemed to be downgraded and very difficult to exploit, especially at part load. Furthermore, according to the invention such calories are exploited by use of a heat exchanger which is relatively simple because operating at relatively low temperature and pressure, over a relatively reduced thermal amplitude.

Thanks to the very substantial raise of the combustion start temperature $T_{14}$, the theoretical yield of the engine is strongly increased.

The engine yield is also increased thanks to the temperature decrease to which the gas discharged by the positive displacement mechanism is subjected by the heat exchanger 23.

The combustion occurring in the vicinity of TDC (FIG. 4) causes an increase of temperature and pressure in the working gas.

Then, (FIG. 5), both valves 4a, 7a remaining closed, the working gas expands adiabatically, thus with a decreasing temperature, while the piston 8 travels towards BDC.

In the vicinity of BDC, the pressure $p_2$ in the working gas is preferably just enough to supply the turbine 21 of the turbocharger 19 with the energy required for performing the desired pre-compression. In other words, the thermodynamic cycle is such that the gas exits the turbine 21 substantially at the reference pressure $p_1$, but at a temperature $T_{81}$. which is still high enough, as desired for the hot inlet of the heat-yielding path 26 of the heat exchanger 23.

Still in the vicinity of BDC, the discharge valve 7a opens, so that while the piston 8 rises back from BDC up to TDC (FIG. 6), the working gas is expelled into the discharge duct 22 towards the turbine 21 of the turbocharger 19. The temperature $T_{72}$ of the gas upstream of the turbine 21 is relatively high, even if the engine operates under a very low load. This relatively high temperature is due to the general raise of the temperatures of the cycle due to the action of the heat exchanger 23 upon the temperature $T_{43}$ of the working gas when entering the working chamber 1.

According to a feature of the invention, a system 28 (FIG. 1) for depollution of the discharged working gas intended to return to the atmosphere is inserted in the discharged working gas path 22 upstream of the heat exchanger 23, and more specifically, preferably between the positive displacement mechanism 3 and the turbine 21 of the turbocharger 19. The depollution system 28 thus works at the temperature $T_{72}$ which is relatively high even if the engine operates under a very low load. There is thus remedied a drawback of the conventional engines, i. e. a bad operation of the depollution system under very low load due to an excessively low exhaust temperature.

Theoretically the discharged gas exits the exchanger 23 at the reference pressure $p_1$, typically the atmosphere pressure. An energy dissipation and acoustic absorption systems is generally unnecessary in the exhaust 25 of the engine.

Figure 7:
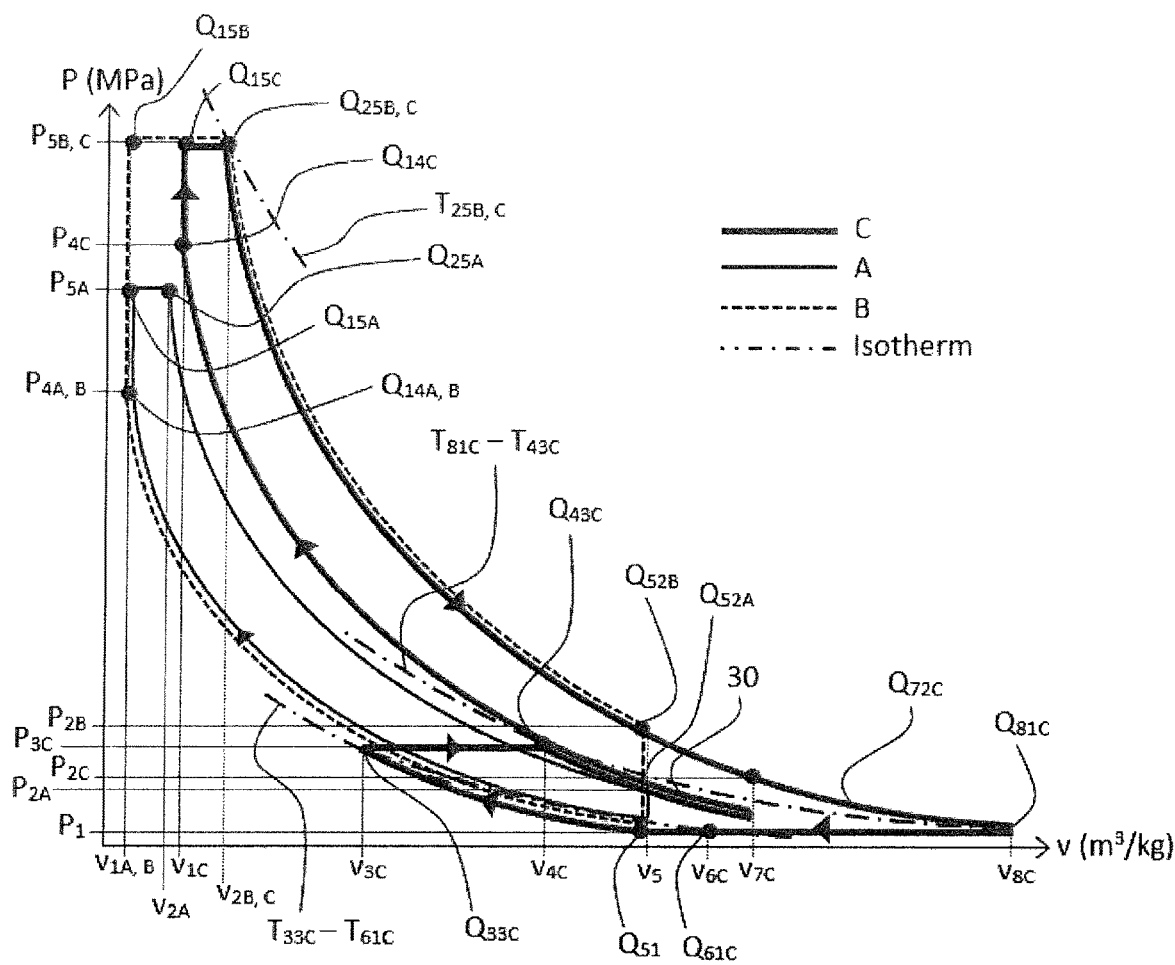
FIG. 7 is a (p, v) diagram (pressure (p) as a function of specific volume (v)) showing the cycle C undergone by the working gas in the engine of FIGS. 1-6, at part load, as compared to the cycles A and B of a conventional engine at part load and at full load respectively.

FIG. 7 is a comparative diagram showing an operation case as well as the effects and possibilities of an example of a thermal engine according to the invention, corresponding to FIGS. 1-6 with compression ignition under part load, compared with a conventional diesel engine with atmospheric intake operating under the same part load and also compared with the same conventional diesel engine operating under full load. The ordinates of the diagram show the working gas pressure (for example in MPa) as a function of its specific volume (for example in $m^3/kg$) shown in abscissae.

In this diagram, and unless a contrary indication, in the following diagrams, there is designated by:

$v_1$: specific volume at the end of compression in the working chamber
$v_2$: specific volume at the end of combustion
$v_3$: specific volume at the end of pre-compression
$v_4$: specific volume at the entry into the working chamber 1
$v_5$: specific volume at the beginning of pre-compression
$v_6$: specific volume of the discharged gas exiting the heat exchanger 23
$v_7$: specific volume of the discharged gas exiting the working chamber 1
$v_8$: specific volume of the discharged gas entering the heat exchanger 23
$p_1$: reference pressure, at the beginning of pre-compression, generally atmospheric pressure
$p_2$: pressure at the end of depressurization in the working chamber 1
$p_3$: pressure at the end of pre-compression
$p_4$: pressure at the end of compression in the working chamber 1
$p_5$: peak pressure of the cycle (in the isobaric part of combustion in the case of the "mixte" cycle which is normally used as a theoretical approximation for a diesel engine)

Additionally, a letter designates the cycle wherein the parameter takes the value being considered. For example, $p_{4A}$ designates the pressure of end of compression in the working chamber 1 for cycle A.

The identified points (states of the working gas) are called $Q_{xy}$ designating the point where the specific volume is $v_x$ and the pressure is $p_y$. For example, $Q_{43}$ for the point where the specific volume is $v_4$ and the pressure is $p_3$. More specifically when the identified points do not pertain to all the cycles represented on a same diagram, the name of the point is followed by one or more letters identifying the cycle(s) to which the point pertains. For example $Q_{xyA,B}$ for a point $Q_{xy}$ pertaining to both cycles A and B.

The temperature at a point $Q_{xy}$ is called $T_{xy}$, a designation possibly followed by one or more letters pointing out the related cycles. For example $T_{xyA,C}$ for the temperature at a point $Q_{xyA,C}$ common to both cycles A and C.

The isothermal lines (hyperboles of a (p, v) diagram, along which the temperature is constant) are represented by dah-dotted lines and are called like the temperature prevailing at one point located on this isothermal line. Example: isothermal line $T_{xyA,C}$. When two points of a cycle are located on a same isothermal line, the latter is designated by the two temperatures. Example: isothermal line $T_{xy}$-$T_{ztA}$ for the isothermal line crossing points $Q_{xy}$ and $Q_{zt}$ of cycle A.

The cycle A in continuous normal (non-fat) line is the one of a conventional atmospheric diesel operating under part-load. It comprises in the following order:
an adiabatic compression from $Q_{51}$ to $Q_{14A}$
a constant volume $v_{1A}$ combustion from $Q_{14A}$ to $Q_{15A}$
a constant pressure $p_{5A}$ combustion from $Q_{15A}$ to $Q_{25A}$
an adiabatic expansion from $Q_{25A}$ to $Q_{52A}$
a constant volume $v_5$ cooling down and depressurization from $Q_{52A}$ to $Q_{51}$.

As is known, the last one of these five phases is concretely implemented by replacing the burnt gas with fresh air. In a four-stroke engine, the above cited fifth phase is obtained by the exhaust stroke which expels the burnt gas from the working chamber and the intake stroke during which fresh air enters the working chamber.

It will be considered herein after that the positive displacement mechanism of the engine according to the invention obeys a four-stroke cycle, even though the invention is not limited to that implementation mode.

If the following hypotheses are made:
$V_5 = 20\ v_{1A}$ (corresponding to a volume ratio of 20:1 in the positive displacement mechanism)
$P_1$=atmospheric pressure=0.1 MPa
$T_{51}$=atmospheric temperature=290 K
r=universal constant of the perfect gases for 1 kg air=288 J/kg·K
there is obtained: $v_5$=r.T51/$p_1$=0.8552 m3/kg At the end of adiabatic compression at point $Q_{14A}$, the conditions are as follows (if the adiabatic coefficient is $\gamma$=1.4):

$$v_{1A}=v_5/20=0.04276\ m3/kg$$

$$p_{4A}=p_1 \cdot 20^{1.4}=6.629\ MPa$$

$$T_{14A}=p_{4A} \cdot v_{1A}/r=984\ K$$

For the part-load combustion, there is taken the example of a temperature increase of 700K, among which 180K at a constant volume (isochoric heating) and 520 K at a constant pressure (isobaric heating)

The following thus occurs at point $Q_{15A}$:

$$T_{15A}=T_{14A}+180=984+180=1164\ K$$

$$p_{5A}=p_{4A} \cdot (T_{15A}/T_{14a})=6.629 \times 1164/984=7.842\ Mpa$$

And at the end-of-combustion point $Q_{25A}$:

$$T_{25A}=T_{15A}+520=1684\ K$$

$$v_{2A}=v_{1A} \cdot (T_{25A}/T_{15A})=0.04276 \times 1684/1164)=0.06186\ m^3/kg$$

The volume ratio of adiabatic expansion from $Q_{25A}$ to $Q_{72A}$ is then:

$$v_{5A}/v_{2A}=0.8552/0.06186=13.82:1$$

The pressure $p_{2A}$ and the temperature $T_{52A}$ at the end of adiabatic expansion are accordingly:

$$p_{2A}=p_{5A}/(13.82^\gamma)=7.842/(13.82^{1.4})=0.1983\ MPa$$

$$T_{52A}=T_{51A} \cdot (p_{2A}/p_1)=290 \times 0.1983/0.1=575\ K$$

If there is considered that the calorific capacity of the working gas (considered for simplification purposes to be air with a constant mass along the whole cycle) at a constant pressure is 1,0003/kg·K, the combustion energy per kg air is:

$$Q_H=Cp \cdot [((T_{15A}-T_{14A})/\gamma)+(T_{25A}-T_{15A})]=10^3 \cdot [(180/1.4)+520]=648\ kJ$$

Corresponding to about 15 g gas-oil per kg air.
Energy restituted to the cold source per kg air:

$$Q_B=Cp \cdot (T_{52A}-T_{51})/\gamma=10^3\ (575-290)/1.4=203\ kJ$$

Theoretical yield of the engine:

$$E_t=(Q_H-Q_B)/Q_H=(648-203)/648=0.687\ corresponding\ to\ 68.7\%$$

The operation of the conventional atmospheric diesel engine under full load will now be considered (cycle B in dotted lines in FIG. 7). The adiabatic compression $Q_{51}$ to $q_{14B}$ is unchanged. The caloric input of the combustion is now 1900 K which are distributed as 490 K at a constant volume and 1410 K at a constant pressure.

The values at point $Q_{15B}$ corresponding to the end of the constant volume combustion are $$T_{15B}=T_{14B}+490=984+490=1474\ K$$

$$p_{5B}=p_{4B} \cdot (T_{15B}/T_{14B})=6.629 \times 1474/984=9.9300\ Mpa$$

And at the end of combustion point $Q_{25B}$:

$$T_{25B}=T_{15B}+1410=1474+1410=2884 \text{ K}$$

$$v_{2B}=v_{1B}\cdot(T_{25B}/T_{15B})=0.04276\times(2884/1474)=0.08366 \text{ m3/kg}$$

Adiabatic expansion volume ratio from $Q_{25B}$ to $Q_{52B}$:

$$v_{5B}/v_{2B}=0.8552/0.08366=10.184:1$$

Pressure $p_{2B}$ and temperature $T_{52B}$ at the end of adiabatic expansion in the positive displacement mechanism:

$$p_{2B}=p_{5B}/(10.184^\gamma)=9.9300/(10.184^{1.4})=0.3853 \text{ MPa}$$

$$T52B=T_{51}\cdot(p_{2B}/p1)=290\times(0.3853/0.1)=1118 \text{ K}$$

Combustion energy per kg air:

$$Q_H=Cp\cdot[((T_{15B}-T_{14B})/\gamma)+(T_{25B}-T_{15B})]=10^3\cdot[(490/1.4)+1410]=1760 \text{ kJ}$$

Corresponding to about 40 g gas-oil per kg air.
Energy restituted to the cold source:

$$Q_B=Cp\cdot(T_{52B}-T_{51})/\gamma=10^3 \ (1118-290)/1.4=591 \text{ kJ}$$

Theoretical yield of the engine:

$$E_t=(Q_H-Q_B)/Q_H=(1760-591)/1760=0.664 \text{ corresponding to } 66.4\%$$

In the two conventional cycles just studied, the yield does not depend a lot on the load. This can be explained in light of the second principle of thermodynamics: the average combustion temperature and the average temperature of the gas during its cooling are substantially in the same ratio in both cases.

The cycle C according to the invention, shown with a continuous fat line in FIG. 7, will now be considered, in the example of a cycle with ignition by compression. This example is selected so that the cycle C has the same peak stress point $Q_{25C}$ of the positive displacement mechanism (regarding temperature and pressure) as that $Q_{25B}$ of the cycle B (conventional diesel under full load). This aims at showing how the invention allows to improve the yield without creating new problems for the implementation of the positive displacement mechanism. Accordingly, $v_{2C}=v_{2B}$, $p_{5C}=p_{5B}$, and $T_{25C}=T_{25B}$.

From the foregoing description of FIG. 1-6, there will be recognized in the cycle C the following phases in their order of succession starting from point Q51 (atmospheric conditions) where air is drawn from the atmosphere:
  pre-compression from $Q_{51}$ to $Q_{33C}$ up to a pressure $p_{3C}$ called "first pressure", in the turbocharger compressor 18;
  isobaric heating at pressure $p_{3C}$ from $Q_{33C}$ to $Q_{43C}$ in the heat-receiving path of the heat exchanger 23;
  additional compression from $Q_{43C}$ to $Q_{14C}$ in the working chamber 1;
  isochoric heating by combustion from $Q_{14C}$ to $Q_{15C}$ in the working chamber 1;
  isobaric heating by combustion from $Q_{15C}$ to $Q_{25C}$ in the working chamber 1;
  adiabatic expansion from $Q_{25C}$ to $Q_{72C}$ in the working chamber 1;
  adiabatic post-expansion from $Q_{72C}$ to $Q_{81C}$ in the turbocharger turbine;
  isobaric cooling down from $Q_{81C}$ to $Q_{61C}$ in the heat-yielding path of the heat exchanger at a second pressure which is less than the first pressure ($p_{3C}$), this second pressure being here the atmospheric pressure $p_1$;
  cooling down from $Q_{61C}$ to $Q_{51}$ by an heat exchange with the cold source, practically by gas exchange with the cold source, i. e. the atmosphere.

Figure 7A:
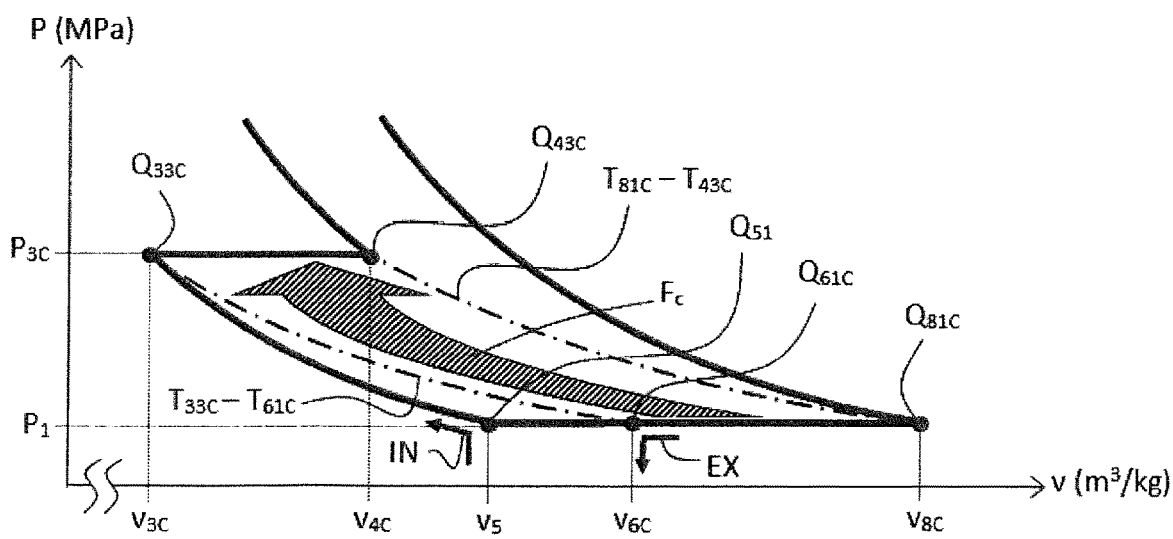
FIG. 7A is an enlarged detail view of the bottom of cycle C of FIG. 7.

FIG. 7A more clearly shows the bottom of cycle C, with an arrow $F_C$ symbolizing the heat transfer occurring in the heat exchanger 23 (FIG. 1), similar to a thermal flow channeled between the two isotherms $T_{33C}$-$T_{61C}$ and $T_{81C}$-$T_{43C}$ (FIG. 7A).

The part load is supposed to be the same as in cycle A (conventional diesel at part load), namely a temperature raise by 700 K, among which 180 K at a constant volume and 520 K at a constant pressure.

$$T_{15C}=T_{25C}-520=2880-520=2360 \text{ K}$$

$$T_{14C}=T_{15C}-180 \text{ K}=2180 \text{ K}$$

$$v_{1C}=v_{2C}\cdot(T_{15C}/T_{25B})=0.08366\times(2360/2880)=0.06855 \text{ m3/kg}$$

$$p_{4C}=p_{5C}\cdot(T_{14C}/T_{15C})=9.9300\times2180/2360=9.173 \text{ Mpa}$$

The temperature $T_{43C}$ at the beginning of compression in the positive displacement mechanism is substantially the same as the temperature $T_{81}$ at the end of expansion, namely:

$$\begin{aligned}T_{43C}&=T_{81}\\&=T_{25}\cdot\left[(p_1/p_5)^{((\gamma-1)/\gamma)}\right]\\&=2880\times\left[(0.1/9.9300)^{(0.4/1.4)}\right]\\&=774\ K\end{aligned}$$

The pressure $p_{3C}$ and the specific volume $v_{4C}$ at the beginning of compression in the positive displacement mechanism must accordingly amount to:

$$\begin{aligned}p_{3C}&=p_{4C}\cdot\left[(T_{43C}/T_{14C})^{(\gamma/(\gamma-1))}\right]\\&=9.173\cdot\left[(774/2180)^{(1.4/0.4)}\right]\\&=0.245\ \text{MPa}\end{aligned}$$

$$v_{4C}=(r\cdot T_{43C})/p_{3C}=288\times774/245\ 000=0.910\ \text{m}^3/\text{kg}$$

The temperature $T_{33C}$ at the end of pre-compression and at the inlet of the heat-receiving path of the heat exchanger 23 is accordingly:

$$\begin{aligned}T_{33C}&=T_{51}\cdot\left[(p_{3C}/p_1)^{((\gamma-1)/\gamma)}\right]\\&=290\times\left[(0.245/0.1)^{(0.4/1.4)}\right]=375\ \text{K}\end{aligned}$$

This is also the temperature $T_{61C}$ at which the exhaust gas is released to the atmosphere at the outlet of the engine. If it is considered that the heat capacity $C_p$ of the working gas at constant pressure is 1 kJ/kg·K, and knowing that the heat capacity $C_v$ of the working gas at a constant volume is equal to $C_p/\gamma$, there is found that the heat quantity supplied to the hot source by combustion is equal to $Q_H$=648 kJ/kg (voluntarily chosen equal to that of cycle A to render the comparison easier), and the heat quantity $Q_B$ restituted to the cold source is equal to $(T_{61C}-T_{51})\cdot C_p$=85 kJ/kg.

The theoretical yield of the engine according to the invention is thus, in this embodiment and load level:

$(Q_H-Q_B)/Q_H=(648-85)/648=0.869$ corresponding to 86.9%

By comparison with cycle A the improvement amounts to:

$(86.9-68.7)/68.7=0.265$ corresponding to 26.5%.

A given quantity of fuel delivers 26.5% additional mechanical energy.

The energy involved in an adiabatic volume variation is proportional to the temperature variation observed during the volume variation. Consequently, the pre-compression from $p_1$ to $p_{3C}$ causing a temperature raise of 85 K requires from the burnt gases a post-expansion from $p_{2C}$ to $p_1$ corresponding to a temperature decrease of 85 K. The burnt gases must accordingly exit the working chamber at a temperature of $T_{72C}=T_{81C}+85$ K$=774+85=859$ K, and accordingly at a pressure of $p_{2C}=P_1\cdot[(T_{72C}/T_{81C})^{(\gamma/(\gamma-1))}]=$ 0.144 MPa The volume ratio of the adiabatic depressurization from $Q_{25C}$ to $Q_{72C}$ in the positive displacement mechanism amounts then to:

$(p_{2C}/p_{7C})^{(1/\gamma)}=(9.93/0.144)^{(1/1.4)}=20.57:1$

The volume ratio of the positive displacement mechanism is higher than the depressurization ratio because it must accommodate not only the adiabatic depressurization following the combustion, but also the expansion during the isobaric combustion from $Q_{15C}$ to $Q_{25C}$. This theoretical volume ratio is equal to:

$$v_{7C}/v_{1C} = (v_{7C}/v_{2C})\cdot(v_{2C}/v_{1C})$$
$$= 20.57 \times (0.08366/0.06855) = 25.10:1$$

To be complete, FIG. 7 shows with reference numeral 30 the working gas state variation during the back and forth movement of the piston from $v_{4C}$ to $v_{7C}$ and from $v_{7C}$ to $v_{4C}$ where the effective compression begins in the working chamber 1. These two superposed curve segments will no longer be illustrated herein below, they have no effect on the work and the theoretical yield of the cycle, but have the advantage of reducing the average temperature of the cycle, and thus reducing the cooling needed by the engine in a practical embodiment.

For a given mass of working gas per cycle, the engine displacement is proportional to $v_{7C}$ in the cycle C and to $v_5$ in the cycle A, this corresponding to an increase by a ratio of:

$v_{7C}/v_5=[(r\cdot T_{72C})/p_{2C}]/v_5=(288\times 859)/(144\,000\times 0.852)=2.016$ But since the yield is increased by 26.5%, hence multiplied by 1.265, the displacement increase for a given mechanical power amounts to:

$2.016/1.265=1.594$ namely about +60%

As a comparison, if in cycle A the displacement was sufficiently increased completely to depressurize the burnt gases beyond $p_{2A}=0.1983$ Mpa down to $p_1=0.1$ MPa, instead of releasing them at the exhaust at pressure $p_{2A}$, the displacement would be increased by about 63% and the temperature at exhaust would be 473 K, whereby the energy restituted to the cold source would be $(473-290)\cdot C_p=183$ kJ and the yield would be $(648-183)/648=0.717$ corresponding to 71.7%, hence an hardly appreciable improvement with respect to the 68.7% of cycle A, and very far from the improvement provided by cycle C and more generally by the invention, in spite of the similarly increased displacement.

Coming back now to the invention, the displacement increase, which could be considered as a drawback, is in fact one of its advantages, because for a given displacement the part load which is $700/1900=0.368$ in the example of the cycle C practically becomes $0.368/1.594=0.232$ for the user of an engine operating according to the invention at part load but operating conventionally (e. g.) at full load. It is however known that the improvement of the yield under very low loads is a concern specifically nowadays. Various solutions will be discussed later for implementing various load levels of an engine according to the invention, while being capable of a peak power comparable or even identical to that of a conventional engine for a given displacement.

For implementing various part power levels in a certain range, it is possible according to the invention to use a substantially invariable cycle, for example cycle C of FIG. 7, and to vary the transmission ratio between the engine and the load to be driven. In other words, since the engine according to the invention provides a very high yield when the energy per cycle is low, there can be an interest in performing a higher number of low-energy cycles, whereas in a conventional engine a low number of high-energy cycles is often preferred.

By acting on the transmission ratio rather than on the energy per cycle for modifying the power which is produced, stable temperature values are kept at both ends of the heat exchanger 23, hence all along the latter, and more generally in the whole engine. This promotes a good operation of the engine.

However, other arrangements will be discussed later, allowing operation of an engine according to the invention in various load ranges while stabilizing the heat exchanger operation.

For the performance of cycle C, the control means adjust the fuel quantity of the isobaric and isochoric injections respectively, and possibly the point 27 at which the intake valve 4a closes, it being noted however that, surprisingly, some embodiments are feasible where the point 27 is in an invariable ratio with the extreme volumes (at TDC and BDC) of the working chamber 1 for generally at least a great part of the operation points or even all of them.

Though the engine according to the invention has been presented by comparison with a conventional atmospheric engine, it will be understood that, in a similar manner, the yield allowed by an engine according to the invention greatly exceeds the yields allowed by conventional turbocharged engines, even when equipped with an intercooler. It is indeed known that such arrangements rather tend to downgrade the theoretical yield of the engine, their purpose being mainly to enhance the weight/power ratio.

Figure 8:
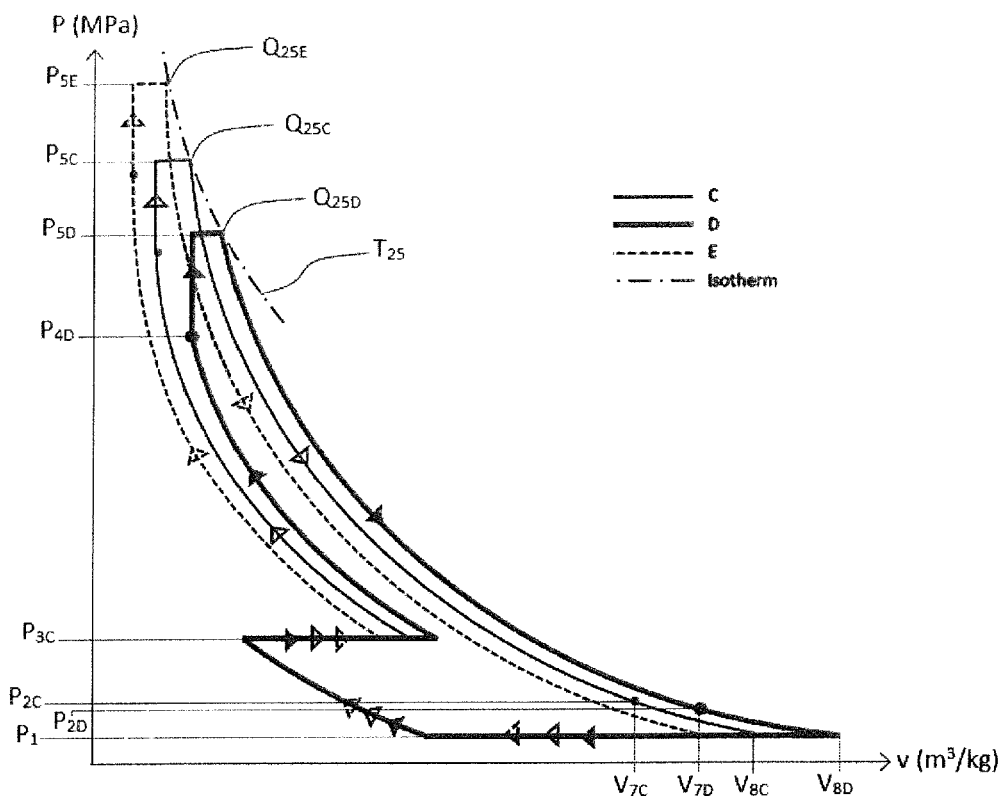
FIG. 8 shows the cycle C of FIG. 7 and two possible evolutions D and E of this cycle, the peak temperature reached during the cycle being the same in the three cases.

More particularly, as shown in FIG. 8, it is i. a. possible to contemplate a reduction of the volume ratio of the engine according to the invention, down to a value close to that of conventional diesel engines around 20:1, while substantially keeping the high yield which has been calculated herein above. Such a cycle is attributed reference D, as compared to cycle C, also seen in FIG. 8.

The hottest point $Q_{25D}$ of cycle D is displaced towards the low pressures along the isotherm $T_{25}$ crossing the hottest point $Q_{25C}$ of cycle C. The peak pressure being thereby lowered, the depressurization volume ratio which is required in the cylinder is lower. The points of cycle D may be calculated according to the same method as discussed above with respect to cycle C.

In cycle D, the average temperature $T_m$ in the working chamber during a cycle corresponding to $\theta_{cycle}=720°$ of rotation angle of the power shaft, is higher than in cycle C. The high temperature of the heat exchanger 23 is also higher.

To reduce the average temperature in the cylinder, reduce the high temperature of the heat exchanger and consequently reduce the heat power taken off by the cooling system of the engine, cycle E or cycle F can be relied upon.

In cycle E (FIG. 8), point $Q_{25E}$, the hottest point of the cycle, is shifted towards the high pressures along the isotherm $T_{25}$, by comparison with point $Q_{25C}$ For a better clarity of FIG. 8, cycle E is illustrated only where it differs from cycle C.

In this cycle, for a same temperature $T_{25}$ of the hottest point, the peak pressure $p_{5E}$ is higher than in cycle C, a higher volume ratio may be adopted in the positive displacement mechanism, the temperature at the outlet of the cylinder will be lower, as well as, consequently, the average temperature in the cylinder and the high temperature of the heat exchanger.

The pressure $p_3$ in the heat exchanger 23 is theoretically the same for cycles C, D and E, for which the load is the same and the peak temperature $T_{25}$ is the same.

Figure 9:
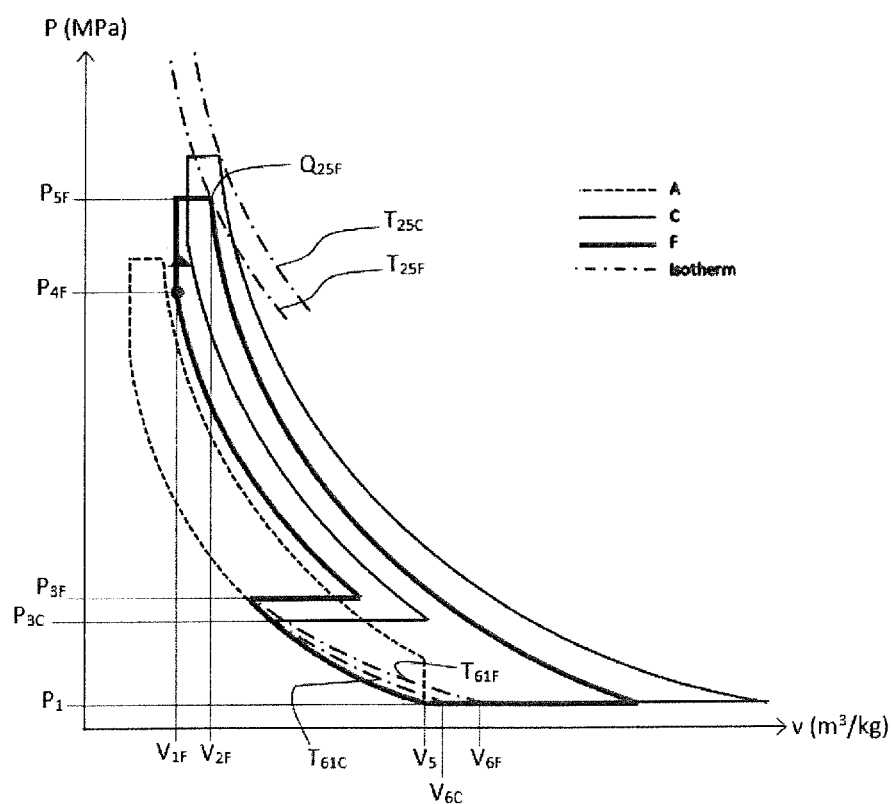
FIG. 9 shows, by comparison with the cycles A and C of FIG. 7, another evolution F of cycle C, with a lower peak temperature than in cycle C.

In cycle F, illustrated in FIG. 9 as compared with cycle C, the hottest point $Q_{25F}$ of the cycle is chosen with a temperature $T_{25F}$ lower than the temperature $T_{25C}$ of the hottest point $Q_{25C}$ of cycle C. The peak pressure can be chosen either below that of cycle C (as illustrated), or equal to, or even greater than that of cycle C, by displacing the hottest point along isotherm $T_{25F}$ in a similar manner to that discussed with reference to FIG. 8 with regard to cycles D and E. The theoretical yield of cycle F is less than the theoretical yield of cycle C because the highest temperature is lower.

It appears from FIG. 9 that with a decreased peak temperature ($T_{25F}<T_{25C}$), the pressure in the heat exchanger 23 is increased ($p_{3F}>p_{3C}$). This confirms the decrease of the theoretical yield: with $p_{3F}$ higher than $p_{3C}$ the exhaust temperature $T_{61F}$ equal to the temperature of end of pre-compression is also higher than the corresponding temperature $T_{61C}$ of cycle C for a same heat quantity supplied by the combustion. Furthermore, if the pre-compression is performed by turbocharging, the losses of the turbocharger(s) are increased. Advantageous embodiments are described herein below using an "autonomous" compressor and minimizing the drawback of the actual losses due to pre-compression.

By contrast, the peak temperature being lowered ($T_{25F}<T_{25C}$), every temperature in the cylinder is significantly lowered. Hence, the average temperature is significantly lowered, so that the heat to be taken out by the cooling system is less. This promotes a better actual yield of the engine.

Whereas a peak temperature of $T_{25C}=2880$ K was contemplated in the example of FIG. 7, a peak temperature of about $T_{25F}=2000$ K can be contemplated with a still correct theoretical yield, and an actual yield which will be closer to the theoretical yield. Furthermore, with the reduced peak temperature, the production of NOx during combustion is reduced.

The reduction of the cooling need favorably impacts the consumption of some accessories such as the water pump, the cooling fan. When the engine equips a vehicle, the the vehicle drag is also reduced. Furthermore, the high temperature of the heat exchanger is also lowered, as well as the thermal amplitude of the heat exchanger (difference between its high and its low temperature), this rendering the heat exchanger easier to manufacture, and reducing its cost, weight and space requirement.

Accordingly, the invention allows, but does not require to raise the temperature level in the working chamber. Part of the enhancement of the theoretical yield offered by the invention is indeed caused by the decrease of the average temperature of the calories restituted to the cold source.

Figure 10:
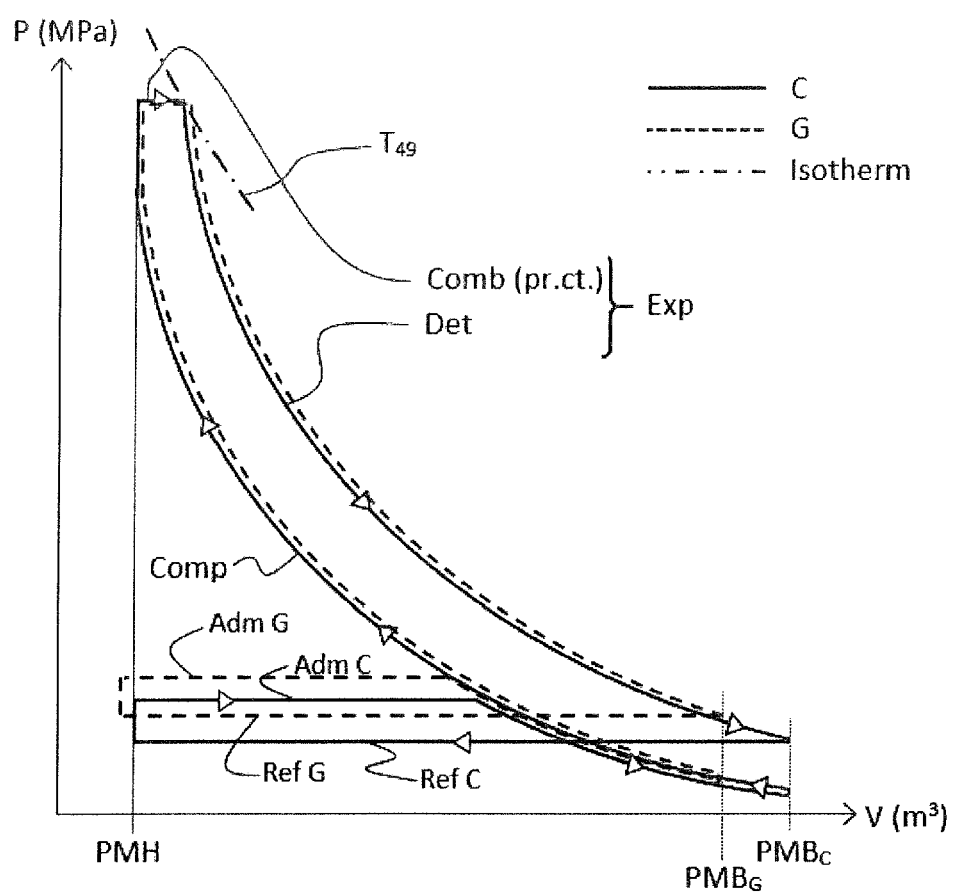
FIG. 10 shows cycle C according to the invention in a diagram (p, V) (pressure (p) in the working chamber as a function of volume (V) of the working chamber), as well as a cycle G in which the volume ratio of the positive displacement mechanism is lower.

The continuous line in FIG. 10 represents the pressure p in the working chamber as a function of the actual volume V of the working chamber (and no longer the specific volume v as was the case in cycle C of the preceding drawing figures.

The intake stroke AdmC, compression stroke CompC, expansion stroke Exp and discharge stroke RefC are represented. The expansion stroke Exp includes the constant pressure combustion Comb(pr.ct.) and the expansion-depressurization Det.

It appears that contrary to certain conventional engines, the discharge pressure is lower than the intake pressure, so that as a whole these two strokes yield mechanical energy to the power shaft. This is due to the fact that the gas discharged by the positive displacement mechanism according to the invention is preferably fully depressurized but for the pressure strictly necessary to energize the turbocharger and to propel the gas on the way to the atmosphere. Since the burnt gas is furthermore hotter than in a conventional engine, its greater volume flow rate allows energization of the turbocharger with a lower pressure.

In the engine according to the invention, the advance of opening of the discharge valve can be nil or very little, or anyway much smaller than in a conventional engine. As a matter of fact, there is no or only hardly excess pressure to release at the end of expansion for avoiding a detrimental counter-pressure on the piston during the discharge stroke RefC. There can be, however, an interest in providing an advanced opening of the discharge valve thereby to initiate the discharge movement of the gas before the beginning of upward stroke of the piston from its BDC.

The dotted lines in FIG. 10 show cycle G as compared to cycle C. Cycle G is another variation of the cycle according to the invention, in which it is accepted to lose the end of the expansion of the gas thereby to reduce the volume ratio and the displacement of the positive displacement mechanism for a given power, with the drawback of slightly increasing the average temperature in the working chamber, since the temperature at discharge is higher, as well as the high temperature of the heat exchanger. In this variation, by contrast with the foregoing ones, part of the energy of the burnt gases is dissipated in the exhaust, like in a conventional engine but in smaller proportions. The BDC of cycle G is identified with its lower volume $PMB_G$ than that $PMB_C$ of cycle C, the volume at TDC being identical for both cycles.

The different variations of the cycle C (arbitrarily) taken as a reference cycle can be combined together. Practically, the cycle is optimized in view of an optimal compromise between actual yield in view of the application (e. g. road vehicles) for which the engine is intended, engine cost, space requirement of the engine, engine weight, engine cartography optimization and homogenization, targeting of optimized operation points, etc.

Figure 11:
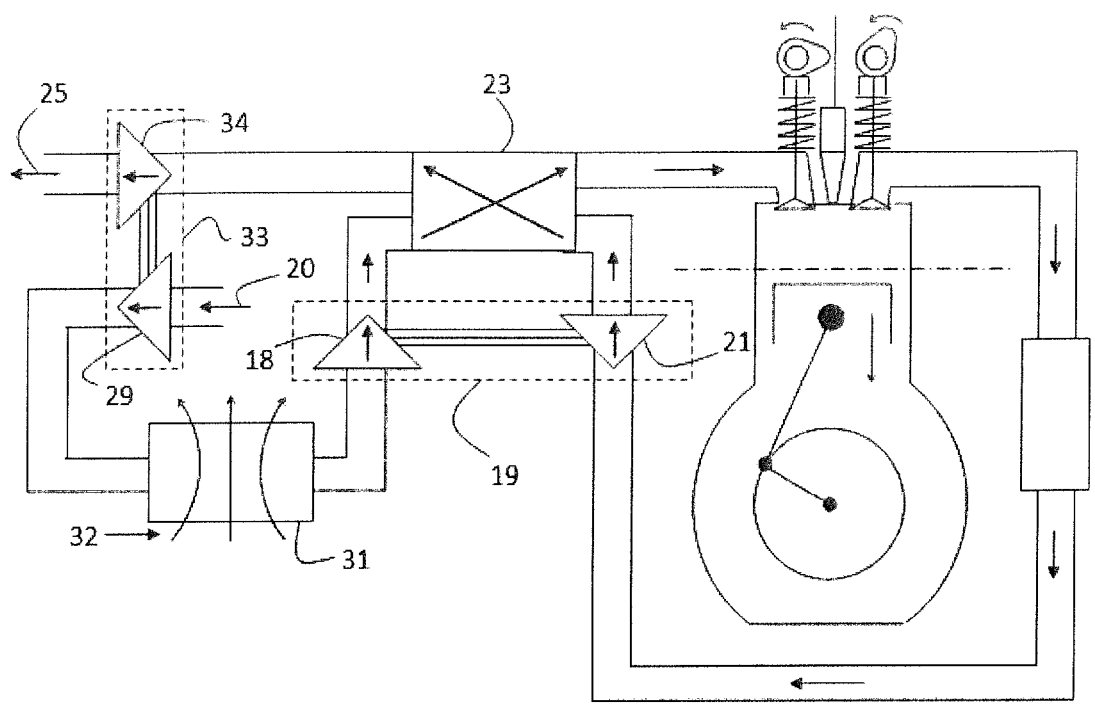
FIG. 11 is a sketch showing the basic concept of a second embodiment of the engine according to the invention.

Referring now to FIG. 11, a second embodiment of the invention will now be described, but only as to its differences with respect to the embodiment of FIG. 1.

Upstream of the compressor 18 of the turbocharger 19, the intake gas travels through an inlet compressor 29 followed by an intercooler 31. The outlet of the intercooler 31 is connected to the inlet of the compressor 18. The gas adiabatically compressed and hence heated in the inlet compressor 29 is then brought back substantially to the atmospheric temperature in the intercooler 31 while yielding excess heat to a cooling air flow 32, generally atmospheric air, flowing through the intercooler 31.

The inlet compressor 29 is part of an inlet turbocharger 33 also comprising a turbine 34 through which the discharged working gas travels after having exited the heat exchanger 23.

Figure 12:
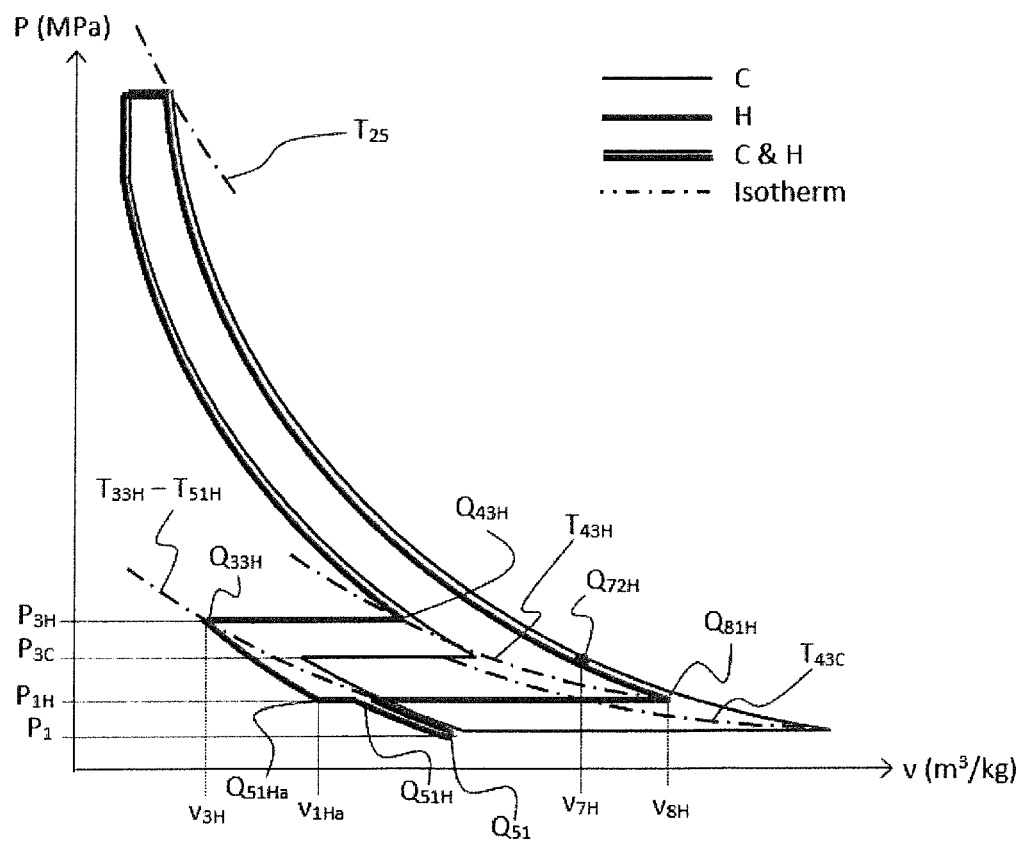
FIG. 12 shows a cycle H according to the invention, capable of being implemented in the engine of FIG. 11, by comparison with cycle C of FIG. 7.

According to this embodiment, of which a possible cycle H is represented as an example in a (p, v) diagram in FIG. 12 in a comparison with cycle C, the upper part of the cycle can as shown remain unchanged, but the expansion is shorter in the positive displacement mechanism so that the working gas exits the working chamber at a higher pressure and a higher temperature than in cycle C. This significantly reduces the volume ratio and the displacement of the positive displacement mechanism, hence its weight and space requirement, in a manner similar to a conventional turbocharged engine but without the increased losses at the exhaust of the latter. Another interest could consist for example in increasing the peak pressure in the working chamber while increasing neither the peak temperature $T_{25}$ nor the volume ratio of the positive displacement mechanism with respect to cycle C, thereby to reduce the high temperature $T_{43H}$ of the heat exchanger and the average temperature in the working chamber as explained with reference to FIG. 8.

FIG. 12 shows the following points:

$Q_{72H}$ where the working gas exits the positive displacement mechanism;

$Q_{81H}$ where the working gas exits the turbine 21 and enters the heat exchanger 23;

$Q_{51H}$ where the burnt gas exits the heat exchanger 23 and enters the turbine 34 of the inlet turbocharger 33;

$Q_{51}$ (corresponding to the ambient conditions) where the burnt gas exits the turbine 34, and where the fresh gas enters the inlet compressor 29 so that the compression curve in the inlet compressor 29 and the expansion curve in the turbine 34 are superimposed upon each other, as shown.

Theoretically, $p_{3H}/p_{1H}=p_{1H}/p_1$ causes the discharged gas exiting the exchanger 23 to be at a temperature $T_{33H}=T_{51H}$ such that its expansion down to pressure p1 in the turbine 34 brings the gas back to the temperature $T_{51}$.

Practically, it is acceptable if the expansion ends at a temperature above $T_{51}$, or else a ratio $p_{1H}/p_1 > p_{3H}/p_{1H}$ will be necessary.

The point $Q_{51}$ accordingly corresponds to the conditions in which the fresh gas enters the engine, namely in the compressor 29.

The following points are additionally seen in FIG. 12:

$Q_{51Ha}$ where the partially pre-compressed gas exits the intercooler 31 with a reduced specific volume $v_{1Ha}$ and a maintained pressure $p_{1H}$, for entering the compressor 18 of the turbocharger 19;

$Q_{33H}$ where the pre-compressed gas exits the compressor 19 to enter the heat exchanger 23;

$Q_{43H}$ where the pre-compressed gas exits the heat exchanger 23 to enter the working chamber 1 of the positive displacement mechanism.

In this example of operation of the embodiment of FIG. 11, heat is restituted to the cold source nowhere else than in the intercooler 32. The theoretical yield is substantially the same as calculated for cycle C.

Generally speaking, all variations (cycles D-G) considered for cycle C are applicable to the embodiment of FIG. 11.

Figure 13:
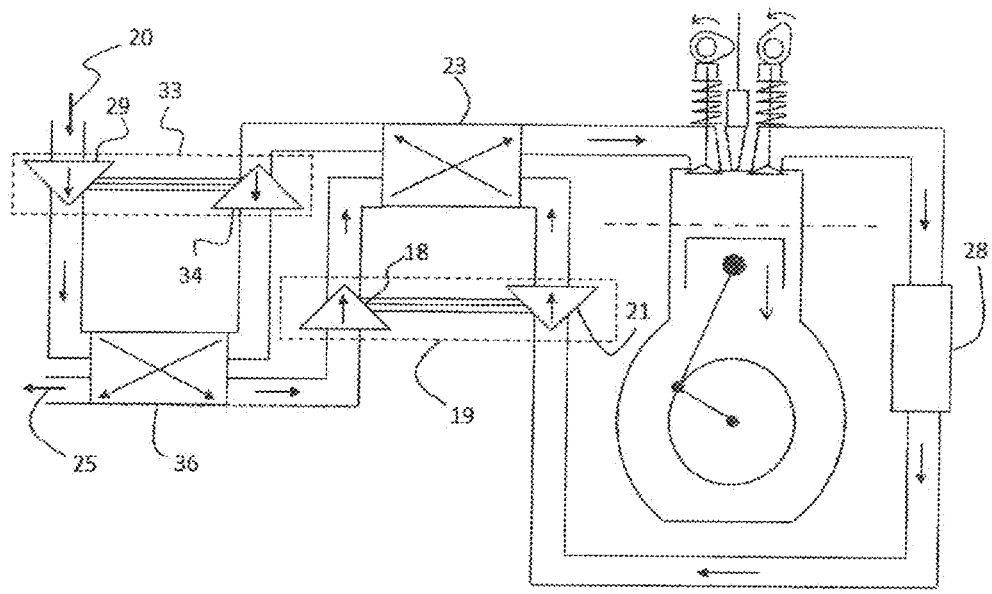
FIG. 13 is a sketch showing the basic concept of a third embodiment of the engine according to the invention.

The embodiment of FIG. 13 derives from that of FIG. 11, except that the intercooler 31 is replaced with a counter-flow heat exchanger 36 between the discharged working gas exiting the turbine 34 at ambient temperature, and the partly pre-compressed working gas heated by its compression in the inlet compressor 29.

The partly pre-compressed working gas is accordingly cooled down by the fully depressurized discharged working gas. Hence, the outer air flow 32 of FIG. 11 is no longer needed, the generation of which often has drawbacks such as aerodynamic losses in the case of a vehicle, need of a fan especially for stationary implementations (such as electricity generation units) or almost stationary ones (such as civil engineering or agricultural machines), etc.

The theoretical thermodynamic cycle of the engine according to FIG. 13 may in principal be the same as that H of FIG. 12, and can be modified in the same way following the suggestions of cycles D-G.

The embodiment of FIG. 14 will be described only for its differences with respect to that of FIGS. 1-6.

Conventional engines are often equipped with a so-called EGR (for "Exhaust Gas Recycling") valve through which a variable fraction of the burnt gas discharged by the positive displacement mechanism is sent back to the intake of the engine. In a conventional engine however, the direct recycling of the very hot burnt gas into the intake gas tends to significantly heat up the latter, by contrast with what is desired in that type of engine.

Figure 14:
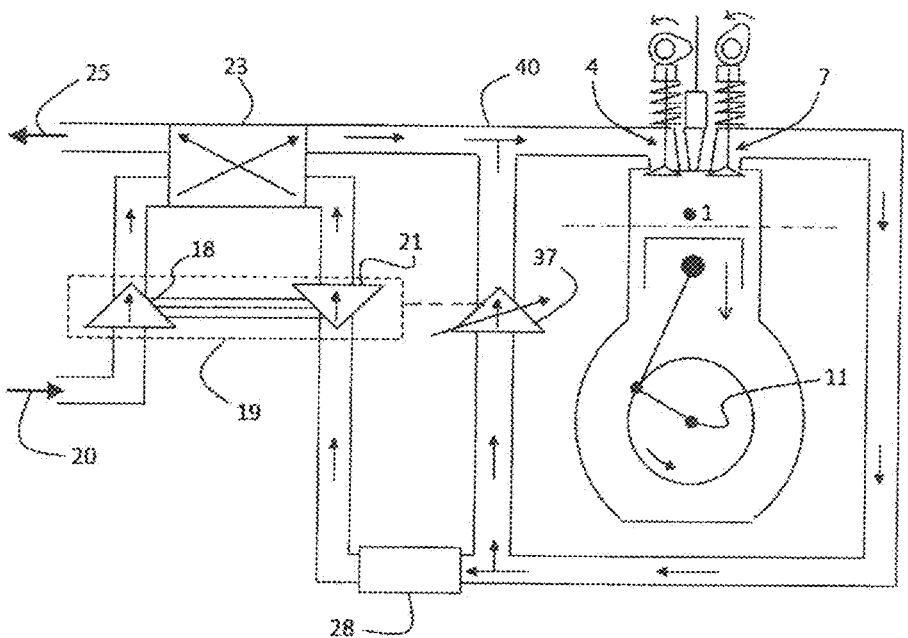
FIG. 14 is a sketch showing the basic concept of a fourth embodiment of the engine according to the invention.

The embodiment of FIG. 14 solves this problem.

A variable flow rate EGR compressor 37 is mounted between the discharge 7 and the intake 4 of the working chamber 1. The EGR compressor 37 is fed with working gas between the discharge 7 of the working chamber 1 and the depollution system 28, and discharges that working gas, called "recirculation gas" or "EGR gas", at a mixture location 40, downstream of the heat exchanger 23, where the EGR gas gets mixed with the pre-compressed gas which has been heated up in the heat exchanger 23.

The heat exchanger 23 and the turbocharger 19 can accordingly be of a smaller size, because they only handle part of the gas flow rate received by the working chamber 1.

For each operation point of the engine, the engine cartography defines the EGR rate (proportion of EGR gas in the working gas admitted in the working chamber 1). In accordance therewith, the control means adjust the flow rate of the compressor 37.

In the embodiment of FIG. 14, the discharged gas exiting the EGR compressor is hotter than the pre-compressed gas exiting the heat exchanger 23. The pre-compressed gas and EGR gas mixture entering the working chamber 1 is accordingly hotter than in cycle C. This is taken into account in the concrete tuning of the engine, for example by an increase of the pressure $p_3$ in the heat exchanger 23.

The compressor 37 may be driven by being coupled to the power shaft 11 of the positive displacement mechanism, or may be driven by its own motor, for example an electric motor, or may be driven by being coupled to the shaft of the turbocharger 19.

In an embodiment not specifically illustrated, the EGR function can also be implemented in a so-called "internal" form, by an early closure of the discharge valve 7a thereby to trap part of the burnt gas in the working chamber 1 of the positive displacement mechanism 3. In such a case, the intake valve is opened lately thereby previously to expand the trapped burnt gas. This very simple embodiment of an EGR function furthermore has the advantage that both valves are closed or almost closed at TDC, this solving the problem of the risk of interference between valves and piston at TDC when the volume ratio of the positive displacement mechanism is high or very high. The delayed intake valve opening is no drawback as part of the gas, namely those trapped in the chamber, is already there, and as on the other hand, according to the invention, the intake occurs over part only of the piston stroke. This EGR function, even simpler than that of FIG. 14, allows to dispense with the EGR compressor 37 but needs valves having adjustable closure (discharge) and opening (intake) points if the EGR is desired to be adjustable.

A "compound" EGR can also be realized, that is to say partly external and partly internal. In this case the internal EGR may advantageously be non-adjustable. The EGR rate adjustment being only performed by way of the external EGR, here by adjusting the flow rate of the compressor 37.

The application of the invention to an engine operating at full load according to cycle L will now be described with reference to FIG. 15.

Compared to cycle B (atmospheric diesel operating at full load) of FIG. 7 (also reproduced in thin lines in FIG. 15), a peak temperature $T_{25L}$=3200 K is chosen, greater than $T_{25B}$, at an unchanged peak pressure $p_{5L}$, this resulting in a maximum stress point $Q_{25L}$.

With similar calculations as those discussed earlier with reference to FIG. 7, on the basis of the same combustion heat input as in cycle B, the points $Q_{15L}$, $Q_{14L}$, and hence the adiabatic compression curve ending at $Q_{14L}$ are determined.

A calculation also teaches that the expansion curve ends at a temperature $T_{81L}$=844 K, and that the above-cited compression curve crosses the temperature $T_{81L}$ at a point $Q_{43L}$ corresponding to a pressure $p_{3L}$=1.698 MPa.

At this pressure, the gas having been adiabatically pre-compressed from the atmospheric temperature 290 K reaches a temperature $T_{33L}$=651 K.

The heat exchanger 23 according to the invention will thus receive intake gas at 651 K and heat it up to 844 K, while the discharged gas depressurized down to 0.1 MPa (atmospheric pressure) will be cooled down from 844 K to $T_{61L}$=651 K. At this temperature the discharged gas is rejected to atmosphere. The energy restituted to the cold source is hence Cp·($T_{61L}$−$T_{51}$)=1 kJ/kg·Kx(651−290)=361 kJ per kg air.

The combustion energy is, as in cycle B, 1691 kJ per kg air.

The theoretical efficiency of the cycle is thus:

(1691−361)/1691=0.787 corresponding to 78.7%

This corresponds to more than 10 percentage points saved by comparison with cycle B, and an increase of the produced mechanical energy by more than 15%, for a given fuel quantity.

The pre-compression before entry into the heat exchanger 23 uses an energy corresponding to an adiabatic cooling of 361 K which can be supplied by the turbocharger 19 if the burnt gas exits the positive displacement mechanism at point $Q_{72L}$ at temperature $T_{72L}$=844+361=1205 K, corresponding, along the expansion curve, to a pressure $p_{2L}$=0.348 MPa and a specific volume $v_{7L}$=0.9972 m3/kg.

The volume ratio of the positive displacement mechanism is accordingly:

$v_{7L}/v_{1L}$=0.9972/0.0483=20.65:1

It appears that this volume ratio is very close to that of cycle C corresponding to a very partial load. This shows the ability of the invention to be implemented with a positive displacement mechanism having a fixed volume ratio.

In an embodiment, for each load level a maximum stress point $Q_{25L}$ is selected so that the mechanical energy still available in the working gas at point $Q_{72L}$ (at the outlet of the positive displacement mechanism) corresponds to the energy needed for the pre-compression, the volume ratio of the positive displacement mechanism being invariable.

According to an embodiment, a maximum stress point $Q_{25}$ can be chosen so that the temperature $T_{81}$ at the end of expansion will be lower than in the above example. Hence, the pressure $p_3$ necessary at point $Q_{43}$ of the beginning of the additional compression is lowered, as explained with reference to FIG. 8. This makes the pre-compression easier.

In another embodiment, $Q_{25}$ can be selected to correspond to a higher pressure and a higher temperature but on the same adiabatic expansion curve, crossing point $Q_{81B}$, as point $Q_{25B}$. this results in a similar result of decrease of the pre-compression pressure.

Especially when high, as in the foregoing example up to 1.698 Mpa, the pre-compression can be produced by several successive pre-compression stages, e. g. two or three stages. In the present case, three stages could be considered, each providing a pressure ratio of $(p_{3L}/p_1)^{1/3}$=2.57/1.

The pre-compression yield can be enhanced by inserting an intercooler between compression stages. In the above example, an intercooler is arranged between the first and the second stage, and another intercooler is arranged between the second and the third stage. The cycle with the intercoolers is then modified according to the dotted line L' of FIG. 15. The third pre-compression stage heats the intake gas from 290 K to 380 K, which is the temperature of the cold side of the heat exchanger 23. The cooling steps in the intercoolers can be seen as horizontal segments at the pressure levels $p_{L'a}$, $p_{L'b}$ in FIG. 15.

The energy restituted to the cold source is now no more than 90 kJ in each intercooler and 90 kJ at exhaust, making a total of 270 kJ instead of 361 kJ in cycle L. The theoretical yield becomes:

(1691−270)/1691=0.840 corresponding to 84%.

The enhancement amounts accordingly to more than five percentage points by comparison with cycle L having no intercoolers.

The volume ratio of the engine increases somewhat since the positive displacement mechanism discharges the working gas at a point $Q_{72L'}$ at a temperature of 844+270=1114 K instead of 1205 K in cycle L. This corresponds to a specific volume increased by a factor:

$(1205/1114)^{(1/(\gamma-1))}$=1.21

And accordingly to a volume ratio of:

20.65×1.21=25.13/1

This volume ratio is almost identical to that of cycle C.

The embodiment of FIG. 16, which will be described only as to its differences with respect to that of FIG. 1, comprises two improvements, each of which could be implemented in an embodiment which would not comprise the other of the two improvements.

According to a first improvement, thermal adjustment means or a thermal adjustment and gas distributor system 38, 39 allow the pre-compressed working gas selectively to by-pass the heat exchanger 23.

At a high or full load, the pre-compressed working gas by-passes the heat exchanger 23. The engine then operates as a conventional supercharged engine, e. g. a conventional supercharged diesel. Accordingly, the maximum stresses, especially the maximum thermal stresses, undergone by the positive displacement mechanism may not exceed the usual values. The maximum power and maximum torque are the same as those of a similar conventional engine having a similar volume ratio.

The cycle according to the invention, namely with a heat transfer from the gas exiting the positive displacement mechanism in favor of the pre-compressed working gas as described with reference to FIGS. 7-10, is implemented only at part load.

To allow the operation to be different at low and high load respectively, the working gas path between the outlet of the compressor 18 and the inlet into the positive displacement mechanism comprises two parallel branches. A first branch, so-called "heating branch", includes the heat-receiving path 24 of the heat exchanger 23, as in FIG. 1. A second branch 39, so-called "by-pass branch", by-passes the heat exchanger 23. Both branches join at a junction point 41 located between the outlet of the heat-receiving path 24 of the heat exchanger 23 and the intake valve 4a. The second branch 39 is non-heated. This means that the gas travels there-through without receiving heat. In the represented embodiment the branch 39 is a mere duct which can dissipate heat outwardly. In other embodiments the duct can be heat-insulated to limit or prevent heat diffusion outwardly. In a third variation, the duct, by contrast, is equipped with a heat dissipater (not shown), e. g. cooling fins onto its external periphery. In a fourth variation, the duct includes an intercooler (not shown).

The thermal adjustment means 38, 39 furthermore comprise distribution means 38 which direct the pre-compressed working gas into one or the other of the branches, or also, in a preferred embodiment, which distribute the working gas between the two branches, in a still more preferred embodiment, in a variable proportion. In the represented example, the distribution means 38 is a three-way valve arranged at the common inlet of the two branches.

In a low-load position, the three way valve 38 causes all the pre-compressed gas to travel from the compressor 18 into the heat-receiving path 24 of the heat exchanger 23. In a high-load position, the valve 38 causes all the pre-compressed gas to travel through the non-heated duct 39. The gas exits the duct 39 at a substantially unchanged temperature, i. e. the discharge temperature of the compressor 18, or a lowered temperature, depending on the variations in the implementation of the non-heated branch 39.

In the preferred embodiment, the three-way valve 38 is furthermore capable of an intermediate-load position in which part only of the pre-compressed working gas travels through the heat exchanger 23 while the other part travels through the non-heated duct 39. In this case the positive displacement mechanism receives a pre-compressed working gas which is at an intermediate temperature, below the temperature of the discharged gas entering the heat exchanger 23, because the intake gas is a mixture formed at the junction point 41 with the gas having been heated in the heat exchanger 23 and the gas not having been heated or even having been cooled down due to having travelled through the non-heated branch 39.

In a still more preferred manner, in the intermediate-load position, the valve 38 is adjustable thereby to vary the proportion of pre-compressed working gas which travels through the heat exchanger 23 and the rest proportion which travels through the non-heated branch 39.

Advantageously, the positioning of the three-way valve is controlled by a control unit 43, which practically can be the electronic card of the engine, as a function of the cartography of the engine, more particularly its load level and/or as a function of parameters detected by sensors, such as for example one or more temperature sensors, such as the sensor 52 at the inlet of the positive displacement mechanism 3, or the sensor 42 at the outlet of the positive displacement mechanism. For example, the control could always cause the outlet temperature of the positive displacement mechanism, detected by the sensor 42, to tend to come back to a set temperature selected as a function of the peak temperature desired in the positive displacement mechanism for the current operating point while simultaneously taking into account a new targeted operation point, if any, and transition laws between the current point and the target point.

Figure 16:
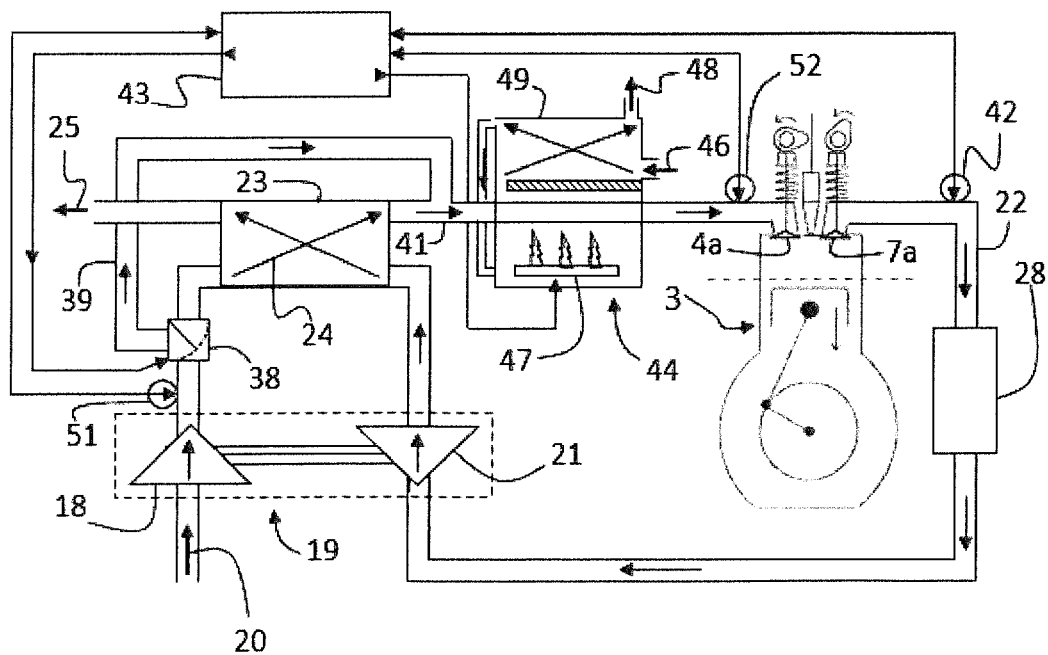
FIG. 16 is a sketch showing the basic concept of a fifth embodiment of the engine according to the invention.

The two-branch intake path according to FIG. 16 provides a relatively simple engine the yield of which is optimized whatever the load level within the limits of a peak temperature allowed as a general rule or for each operation point.

According to a variation, the three-way valve could be mounted at the junction point 41, thereby selectively to connect the intake orifice 4 of the positive displacement mechanism 3 with one or the other of the two branches or, when an intermediate-load condition is provided, simultaneously with the two branches, in a given proportion, preferably variable. In such a case, the outlet of the compressor 18 is in permanent communication with the path 24 of the heat exchanger and with the non-heated branch 39.

Fully implementing the invention only for low or moderate loads allows to dispense with the use of high pre-compression pressures, hence with the use of powerful pre-compression means as well as, downstream of the pre-compression means, an intake circuit (heat exchanger, pipes, valve springs etc.) capable of withstanding such pressures.

Preferably, as represented, the discharged working gas travels through the heat exchanger 23 even when the pre-compressed working gas partly or entirely by-passes the heat exchanger 23. This makes the discharge path simpler. Furthermore, the heat exchanger 23 is, in this way, maintained at the correct temperature and ready to heat up the pre-compressed working gas as soon as the latter resumes travelling through the heat exchanger 23 due for example to a new operation point corresponding to a lower load level.

According to the second improvement of the embodiment represented in FIG. 16, means 43, 44, 46 are provided to speed up the priming of the cycle according to the invention during a cold start phase of the engine.

According to the discussion with reference to FIG. 7, the working gas discharged by the positive displacement mechanism must be hot enough thereby to sufficiently heat up the pre-compressed working gas in the heat exchanger 23. The discharged working gas, however, is hot enough only if the pre-compressed working gas has been heated up before travelling through the intake orifice 4, which is not immediately the case during cold start of the engine. It could be necessary under certain circumstances to wait a rather long time or to use a high load operation phase for "naturally" producing hot working gas adapted to prime the heating up of the pre-compressed working gas in the heat exchanger according to the invention.

The second improvement according to the embodiment of FIG. 16 obviates this drawback. A heater 44 is arranged in the intake duct between the outlet of the heat-receiving path 24 of the heat-exchanger 23 and the intake orifice 4 of the positive displacement mechanism 3. The heater 44 may be electric or preferably comprise a burner using the same fuel, typically gas-oil, as the engine proper. An embodiment of a burner heater is schematically illustrated. The burner comprises an air inlet 46 feeding a fire place 47 producing smoke 48 which flows in contact with the working gas intake duct, then escapes after having traveled through a heat exchanger 49 where the smoke cool down while heating up the air received in the air inlet 46 before reaching the fire place 47. The burner 44 is controlled by the control unit 43 as a function of the temperature at the inlet and/or at the outlet of the positive displacement mechanism, as detected by the sensor 52 and/or 42. The unit 43 activates the burner 44, and preferably adjusts the power of the burner 44, when the measured temperature is too low with respect to the target operation point of the engine, in view especially of the current or expected load level.

During cold start, not only the burner 44 allows quickly to reach the conditions corresponding to the thermodynamic cycle according to the invention, but it furthermore promotes the quick temperature rise of the engine and particularly of the positive displacement mechanism.

During warm engine operation, the burner can be temporarily activated by the control unit 43 when the engine has to shift from one operation point to another for which a higher temperature is desirable for the gas entering the working chamber of the positive displacement mechanism 3.

At each transition for which the burner 44 is active, its energy consumption is much smaller than the supplemental energy which would have been necessary for the transition without the burner 44. The energy used by the burner thus has a "yield" above 1.

Preferably, for the control of the burner 44, the control unit 43 takes into account the response time of the engine, especially the response time of the turbocharger 19. A pressure sensor 51 mounted at the outlet of the compressor 18 allows to optimize the cycle at each instant as a function of the actual pressure at the outlet of the compressor 18. During the transition phases, this actual pressure is different from the pressure which would be optimal in view of the instantaneous load of the engine.

Although described at this place in the description, taking into account the actual pressure is advantageous for the control of all embodiments described herein. For a new given load of the engine, the control unit 43 controls in real time the evolution of the thermodynamic cycle towards its optimal point. An example of the control of the transitions is described later with reference to FIG. 24.

When both improvements of FIG. 16 are implemented together, the temperature rise of the engine, as well as the transitions which need to increase as quickly as possible the temperature of the gases taken in by the positive displacement mechanism 3, are managed by first an increased and if needed total opening of the valve 38 towards the heat exchanger 23.

The embodiment of FIG. 17 will be described only as to its differences with respect to that of FIG. 1.

The turbocharger 19 is replaced with two turbochargers 19A and 19B, having respective compressors 18A and 18B which are connected in series in the working gas path, via an intercooler 53. The intake gas which has been adiabatically compressed and accordingly heated in the compressor 18A, is brought back to a temperature close to ambient temperature by the intercooler 53 before entering the compressor 18B. Both turbines 21A and 21B are mounted directly in series in the discharged working gas path.

In the illustrated embodiment, the high pressure turbine 21A drives the low pressure compressor 18A and the low pressure turbine 21B dives the high pressure compressor 18B. It would also be possible to couple together the low pressure turbine and the low pressure compressor, and couple together the high pressure turbine and the high pressure compressor. It would be also possible to provide a single turbine driving both compressors.

The compression in the high pressure compressor 18B requires less energy without this resulting in a change of the combustion temperature in the positive displacement mechanism. The yield of the engine is enhanced with respect to the embodiment of FIG. 1, for a given peak temperature $T_{25}$ of the cycle.

In another cartography of the engine however, this embodiment converges with the discussion with reference to FIG. 9. For a given load, even a low one, corresponding for example to that of the reference cycle A of FIG. 7, the pressure at the outlet of the second compressor 18B may if desired be such that the point $Q_{43}$, corresponding to that pressure and to the temperature Tai at the end of expansion, lies on the compression curve of this cycle A. In other words, the invention is implemented without increasing the peak temperature $T_{25}$ with respect to a conventional cycle. The theoretical yield of such a cycle is lower than that of cycle C but the actual yield is less impacted by the cooling need. Furthermore the NOx production is less. For a practical optimization, another peak temperature can also be chosen, e. g. a peak temperature intermediate those of cycles A and C, a temperature below that of cycle A or above that of cycle C.

Figure 18:
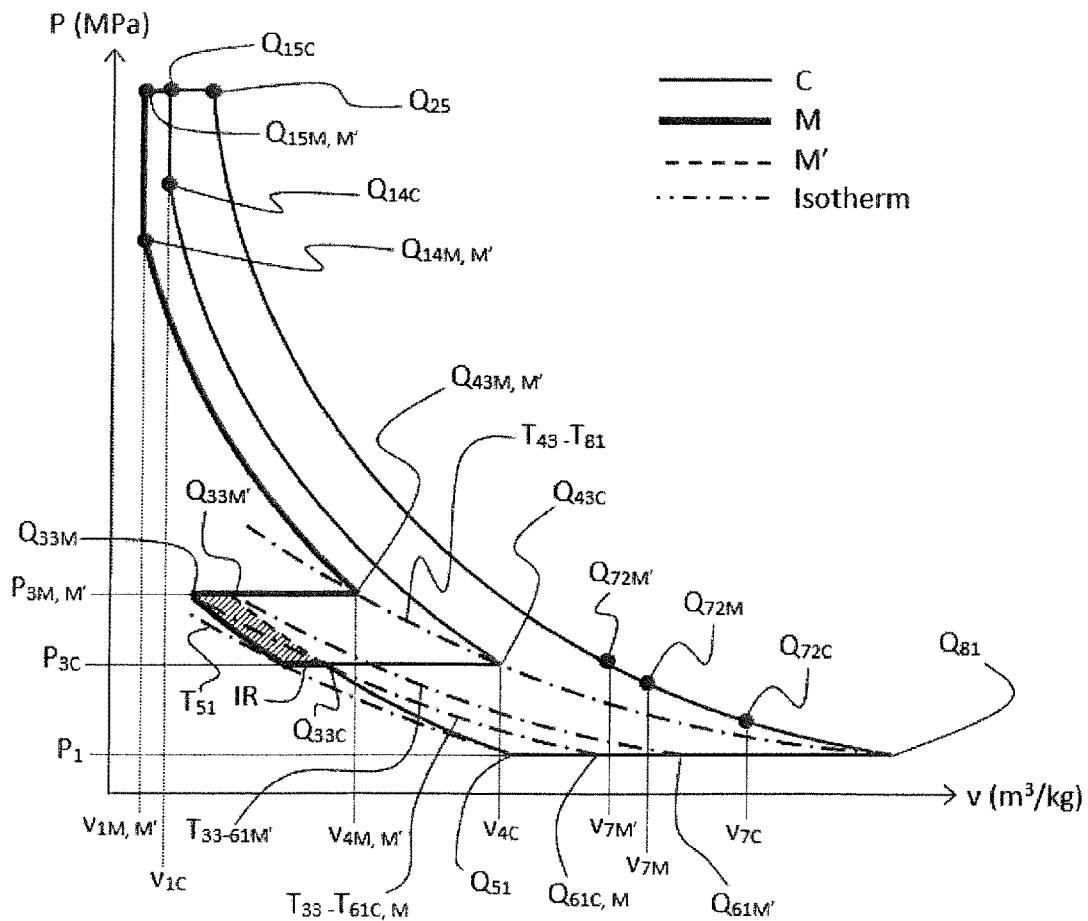
FIG. 18 shows by comparison with cycle C of FIG. 7 a cycle M capable of implementation in the engine of FIG. 17, as well as a cycle M' corresponding to the case wherein the intercooler would be replaced by a mere duct.

The diagram of FIG. 18 shows the implementation of the invention for a higher engine load than in FIG. 7.

The diagram C in thin lines, and the points pertaining to this diagram, are the same as in FIG. 7, for a load which is approximately ⅓ of the maximum load.

Diagram M corresponds to a medium load in which the fuel heats up the working gas by 1400 K, hence twice more the value of diagram C.

Diagram M appears in thick lines where different from diagram C. A variant M' appears in dotted lines where different from diagram M.

For explanatory purposes, the peak stress point $Q_{25}$ is chosen identical for the diagrams C, M, and M'. The adiabatic expansion curve is accordingly the same for the three diagrams. It ends at the same point $Q_{81}$ and on the same isotherm $T_{81}$ because in the three cases the working gas is allowed to recover the reference pressure $p_1$ typically equal to the atmospheric pressure. The temperature $T_{43}$ at the outlet of the heat exchanger 23 is accordingly also the same in the three diagrams (isotherm $T_{43}$-$T_{81}$).

The point $Q_{14M,M'}$ of the end of additional compression in diagrams M and M' lies at a lower specific volume and at a lower pressure than the point of end of compression $Q_{14C}$ of diagram C.

The curve representing the adiabatic compression in the positive displacement mechanism, ending at point $Q_{14M,M'}$, extends distinctly beneath that of diagram C. Consequently, the compression curve intersects isotherm $T_{43}$-$T_{81}$ at a point $Q_{43M,M'}$ corresponding to a higher pressure $p_{3M,M'}$ than pressure $p_{3C}$ at point $Q_{43C}$ of diagram C.

Thus, in the example where the peak stress point $Q_{25}$ is desired to remain substantially constant, a load increase leads to increase the pressure $p_3$ at the end of pre-compression, i. e. in the heat-receiving path of the heat exchanger 23.

For this reason the diagrams M and M' distinguish from diagram C by an increase of the pressure ratio in the pre-compression system of the engine. In the case where the pre-compression is at least in part obtained by turbocharging, this increase of the pre-compression pressure is at least in part automatically fulfilled. It indeed appears that the specific volume $v_1$ during the isochoric combustion is smaller when the load is greater ($v_{1M,M'}<v_{1C}$). The volume ratio of the positive displacement mechanism being assumingly constant, the specific volume at the discharge of the positive displacement mechanism is also smaller ($v_{7M}<v_{7C}$), hence higher on the adiabatic expansion curve which is common to both cycles. The turbocharger receives thus more energy for pre-compressing the working gas in cycles M and M' than in cycle C.

However, depending on the characteristics of a real turbocharger which may have a limited useful range in terms of power, it may be advisable for cycles M and M' to cause intervention of a second compressor (for example of a second turbocharger) in series with the compressor 18 of the turbocharger 19 of FIG. 1.

In diagram M', which will be first described, the pre-compression ends at a point $Q_{33M'}$ lying on the isotherm $T_{33}$-$T_{61M'}$, corresponding to a higher temperature than the isotherm $T_{33}$-$T_{61C}$ of diagram C. This means that the discharged working gas exits the heat exchanger 23 at a relatively high temperature $T_{61M'}$ (though much lower than at the exhaust of a comparable conventional engine), this revealing some downgrading of the theoretical yield of the engine.

The cycle M remedies this: as already described with reference to FIG. 17, an intercooling IR (implemented by the intercooler 53 of FIG. 17) inserted between the two compressors cools the working gas down to the isotherm 51 between the exit of the first stage of pre-compression and the inlet into the second stage of pre-compression. Assuming that the second stage of pre-compression has substantially the same compression ratio as the single stage of pre-compression of diagram C, the point $Q_{33M}$ of the end of pre-compression of diagram M lies on the same isotherm $T_{33}$-$T_{61C,M}$ as the point $Q_{33C}$ of the end of pre-compression of diagram C. The discharged working gas exits the heat exchanger 23 at the same temperature as in diagram C, this evidencing an enhanced yield. The intercooling IR admittedly rejects additional heat, but from the low temperature $T_{33C,M}$ downwards.

In the diagram of FIG. 18, the yield enhancement of cycle M over cycle M' appears through the (hatched) additional surface area by which cycle M exceeds cycle M'. Concretely, for a same combustion energy, the additional mechanical energy is collected on the power shaft by extending the expansion in the positive displacement mechanism down to point $Q_{72M}$ in diagram M instead of point $Q_{72M'}$ in diagram M', since cycle M needs less energy for the pre-compression stage than cycle M'.

The diagrams A and B (FIG. 7) of a conventional diesel at very different load levels have quasi-identical theoretical yields because the average temperature of the heat restituted to the cold source is in a quasi-constant ratio with the average temperature of the heat supplied from the hot source. By contrast, the invention allows a separate optimization on the hot and the cold source. A comparative study of diagrams M and M' shows that the yield can be optimized at the cold source for exactly the same process at the hot source. This is one of the advantages of the invention. Similarly, admitting higher temperatures at the hot source allows to optimize the yield at the hot source by an increase of the average temperature at the hot source without increasing the average temperature at the cold source. The invention realizes a temperature decoupling between the hot source and the cold source. This is what we called herein above the "thermal telescope", which allows to space apart the hot and cold parts of the cycle from each other, in terms of temperature.

As a whole, the theoretical yield of diagram M is slightly less than that of diagram C because the combustion heating begins at point $Q_{14M}$ at a lower temperature. This could be remedied by accepting a peak stress point $Q_{25}$ which would at a higher temperature and/or pressure.

Practically, optimizations are to be done and may lead to a levelling of the theoretical yields of the cycles effectively implemented, in favor of more advantageous actual yields. In this meaning, the peak stress point $Q_{25}$ can be lowered for the very low loads (without necessarily coming back to the very low values of the conventional engines) thereby to reduce the cooling need of the engine, which is of a particular weight for the actual yield at very low load, and reduce the NOx production at low load.

Choosing a peak stress point $Q_{25}$ which increases with the load also increases, generally, the energy available in the gas discharged by the positive displacement mechanism, this increasing the power available for pre-compression by turbocharging, as is desired according to the invention thereby to increase the yield when the load is higher.

Concretely speaking, for a machine intended to operate under varying loads, a compromise, relatively low volume ratio will be selected for the positive displacement mechanism, allowing a slight overshoot of energy to remain in the discharged working gas, and the adjustment can be operated by a means such as a (not shown) by-pass allowing a metered part of the burnt gas to by-pass the turbine of the turbocharger or of one of the turbochargers. This arrangement, though possibly useful, is not absolutely necessary and has a marginal effect, by contrast with a conventional supercharged engine which in its principle generates in the discharged working gas a strong energy excess which must be lost in the exhaust thanks to a high by-pass percentage at the turbocharger. According to the invention, it is also possible to vary the opening point of the discharge valve 7a (FIG. 1), thereby to delay opening so that the discharge effectively begins after BDC, when a smaller effective volume ratio is desired in the positive displacement mechanism. In this case the volume ratio of the positive displacement mechanism 3 is selected to be close to the greatest value among the optimal values corresponding to the various contemplated operation points. It is also possible, as described with reference to FIGS. 26 and 27, to perform at least part of the pre-compression in an "autonomous" compressor allowing finely to adjust or regulate the pressure of end of pre-compression independently from the energy available at the discharge of the positive displacement mechanism.

Figure 19:
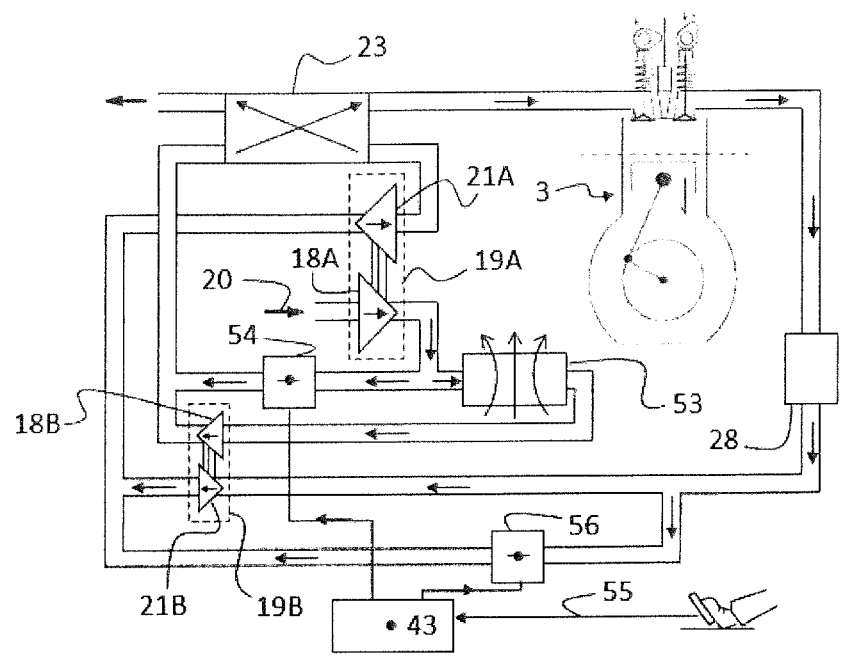
FIG. 19 is a sketch showing the basic concept of a seventh embodiment of the engine according to the invention.

The embodiment of FIG. 19 will be described only as to its differences over that of FIG. 17, while using as far as possible the same references as in FIG. 17.

In this embodiment, which is capable of implementing i. a. diagram M of FIG. 18, the turbocharger 19 of FIG. 1 is replaced with two turbochargers 19A and 19B. In the embodiment as shown, the turbocharger 19A is a low pressure turbocharger ("lp") and the turbocharger 19B is a high pressure turbocharger ("hp").

Both compressors 18A and 18B are mounted in series, in this order, on the intake gas path, and both turbines 21B and 21A are mounted in series, in this order, on the discharge gas path. The intercooler 53, inserted between the two compressors 18A and 18B, allows to perform the intercooling IR of FIG. 18. (For implementation of diagram M' not including the intercooling IR, the intercooler 53 would be replaced by a mere duct).

A valve 54 allows to cause the intake gas exiting the lp compressor 18A to travel either through the intercooler 53, the compressor 18B then the heat exchanger 23 when the load is a mid-load according to the diagram of FIG. 18, or directly from the exit of the lp compressor 18A to the heat exchanger 23 when the load is low.

A valve 56 allows to cause the discharged working gas coming from the positive displacement mechanism 3 either to flow through the hp turbine 21B, then through the lp turbine 21A and the heat exchanger 23 when the load is a mid-load, or through the lp turbine 21A then the heat exchanger 23 after having by-passed the hp turbine 21B when the load is low.

The valves 54 and 56 are controlled by the control unit 43 receiving on its inlet port 55 a signal indicating the engine load, or more generally a signal built up as a function of the cartography of the engine.

Figure 20:
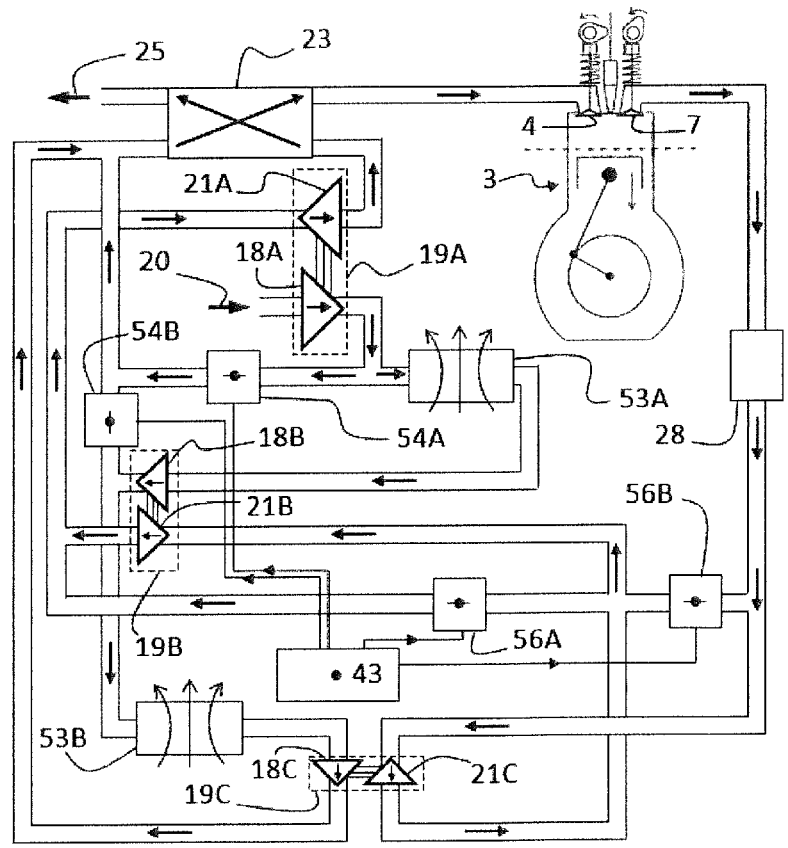
FIG. 20 is a sketch showing the basic concept of a eighth embodiment of the engine according to the invention.

In addition to activate or deactivate the hp turbine 21B in a binary manner, the valve 56 can be used in intermediate positions thereby to allow part of the discharged gas to by-pass the turbine 21B when it is desirable, as discussed with reference to FIG. 18, to regulate the energy globally available to drive compressors 18A and 18B. In this case, the valve 54 is closed thereby to cause all the intake gas to travel through the hp compressor 18B. When the valve 56 is in an intermediate position, the respective flow rates through the hp turbine 21B and through the valve 56 distribute themselves so that the head loss be the same in both paths. Consequently, the opening degree of the valve 56 defines the power of the turbine 21B for a given flow rate, and thus defines the energy available for the compressor 18B to complete the pre-compression of the working gas. The example of FIG. 20 will be described only as to its differences over that of FIG. 19. The embodiment of FIG. 20 is capable of producing a wide range of pre-compression pressures, especially "low" values for the low load levels, "high" values for the mid-level loads, and "very high" values for the high level loads.

In addition to lp and hp turbochargers, there is now provided a very high pressure ("vhp") turbocharger 19C. The three compressors, bp 18A, hp 18B and vhp 18C are mounted in series in this order, on the intake gas path upstream of the heat-receiving path of the heat exchanger 23. Preferably, an intercooler 53A is inserted between the compressors 18A and 18B, and/or an intercooler 53B is inserted between the compressors 18B and 18C. The three turbines vhp 21C, hp 21B and lp 21A are mounted in series, in this order, on the discharged working gas path, upstream of the heat-yielding path of the heat exchanger 23.

Figure 15:
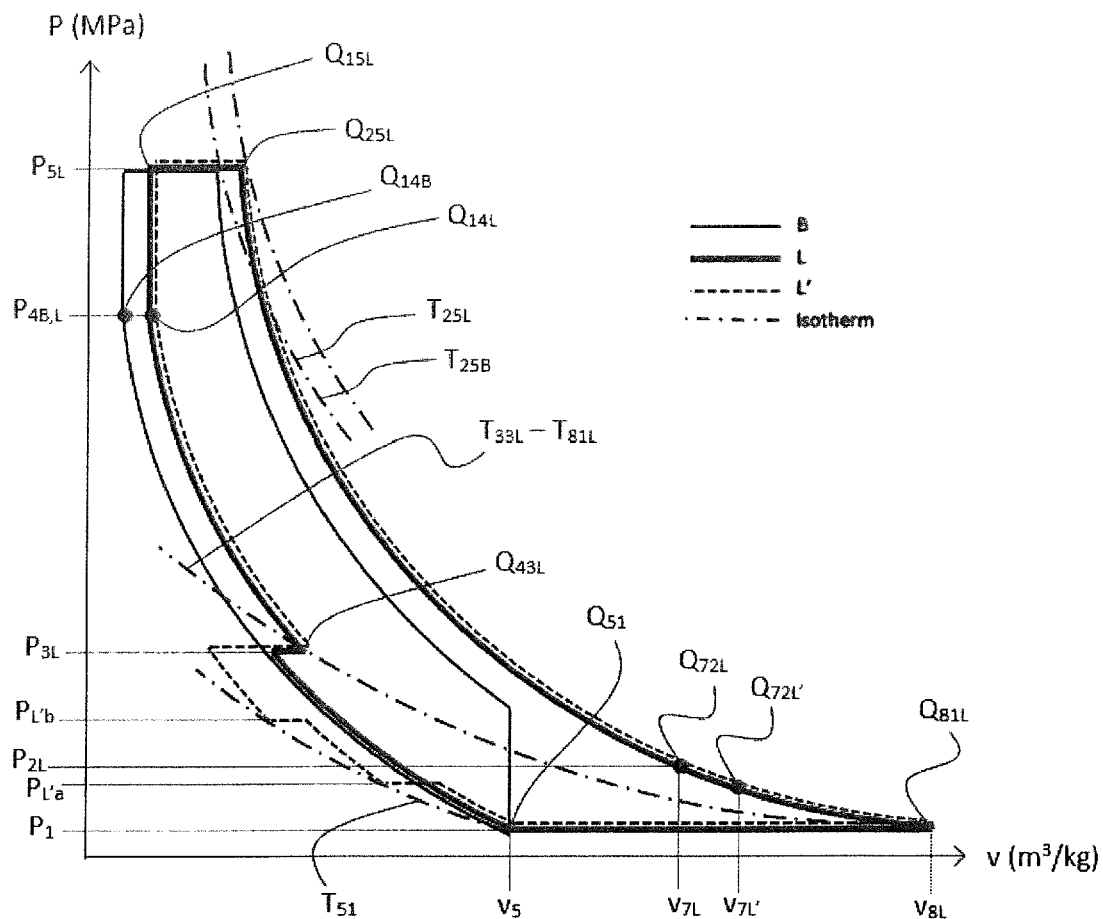
FIG. 15 shows, for the operation at full load, two cycles L and L' according to the invention by comparison with cycle B of FIG. 7.

This arrangement is active for an operation under high or full load, e. g. according to cycle L' of FIG. 15.

For an intermediate load, corresponding for example tp cycle M of FIG. 18, only the lp and hp turbochargers 19A and 19B are active. A valve 54B is in this case open to allow the intake gas flow arriving from compressor 18B directly to go to the heat exchanger 23 while by-passing the intercooler 53B and the vhp compressor 18C. A valve 56B is in this case open to the allow the flow of working gas discharged by the positive displacement mechanism 3 to go to the turbine 21B then to the turbine 21A and to the heat exchanger 23 after having by-passed the vhp turbine 21C.

For a low load, corresponding for example to that of cycle C of FIGS. 7 and 18, not only the valves 54B and 56B are open, but also the valves 54A and 56A which allow the intake gas to by-pass the intercooler 53A, the hp compressor 18B, the intercooler 53B and the vhp compressor 18C, and to the discharged gas to by-pass the vhp turbine 21C and the hp turbine 21B.

The valves 54A, 54B, 56A, 56B are controlled by the control unit 43 as a function i. a. of the engine load, and more generally of the engine cartography. When the valves 54A and 56A are closed for activation of the hp turbocharger 19B, and the valve 54B is closed to cause the working gas to travel through the vhp compressor 18C, the valve 56B can nevertheless exhibit a slight opening adjustable by the control unit 43 thereby to regulate the energy available for driving the vhp compressor 18C and regulate, in this way, the pre-compression pressure. When the vhp turbocharger is deactivated (valves 54B and 56B open) and valve 54A is closed to cause the working gas to travel through the hp compressor 18B, the valve 56A can nevertheless exhibit a slight opening adjustable by the control unit 43 thereby to regulate the energy available for driving the hp compressor 18B and regulate, in this way, the pre-compression pressure $p_3$.

Figure 21:
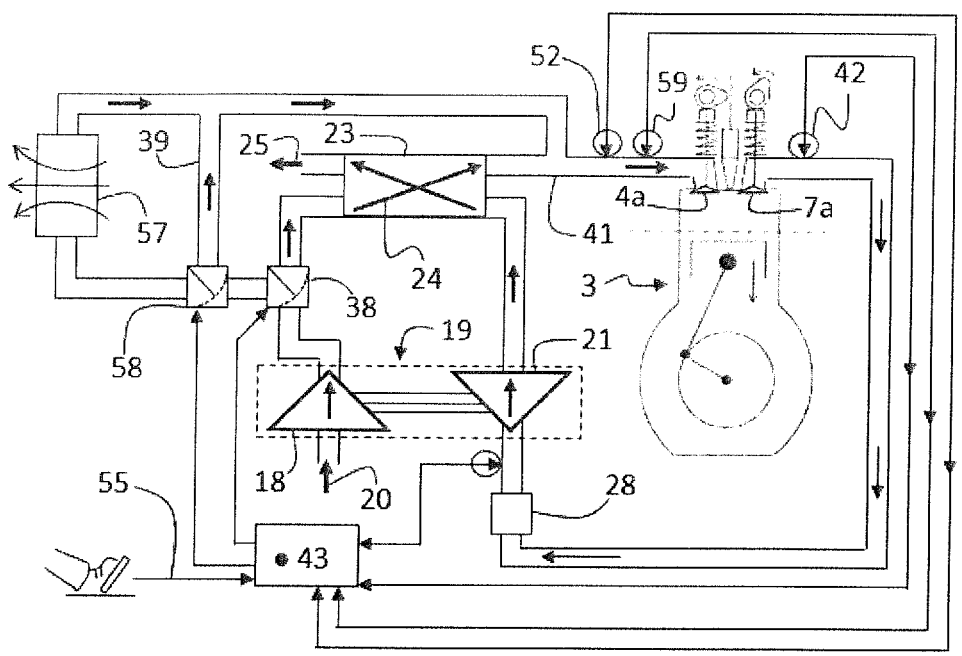
FIG. 21 is a sketch showing the basic concept of a ninth embodiment of the engine according to the invention.
Figure 22:
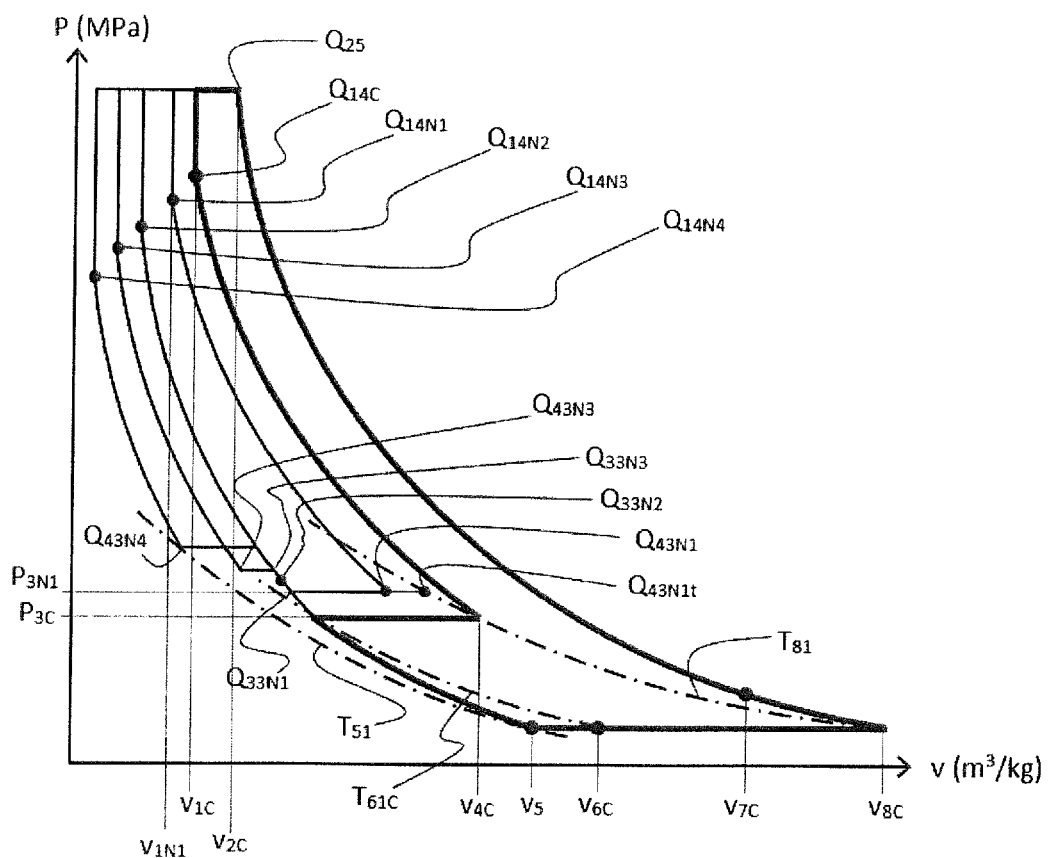
FIG. 22 shows cycles N1, N2, N3 capable of implementation in the engine of FIG. 21, by comparison with cycle C of FIG. 7.

The embodiment of FIG. 21, which will be described only as to its differences over that of FIG. 16, is an example of an engine according to the invention which is at the same time relatively simple, provides the excellent yield performances of a cycle such as C of FIG. 7 under a low load thanks to the heat exchanger 23, and the power per mass unit of a conventional engine equipped with a turbocharger and an intercooler under full or high load with an enhanced yield thanks to a higher volume ratio. Furthermore, the engine of FIG. 21 provides an enhanced yield at intermediate load by causing the intake gas neither to travel through the heat exchanger 23 nor through the intercooler 57. This embodiment will be described while referring to the exemplary diagram of FIG. 22, which may be implemented in the embodiment of FIG. 21. It should however be understood that the diagram of FIG. 22 is not intrinsically connected to the embodiment of FIG. 21.

In the example of FIG. 21, the pre-compressed working gas path comprises thermal adjustment means comprising three branches arranged in parallel, namely i) a heating branch including the heat-receiving path of the heat exchanger 23, ii) a non-heated branch 39 like in FIG. 16, and iii) a cooled down branch including the intercooler 57. Typically, the branch 39 is a substantially adiabatic branch, i. e. neither heated nor actively cooled down, or as less cooled as possible, for example heat-insulated or not. The three-way valve directs the pre-compressed working gas either in the heating branch or in one or the other of the adiabatic and cooled down branches respectively.

In an embodiment, the substantially adiabatic branch 39 comprises a second three-way valve 58. When the valve 38 closes access to the heat exchanger 23, the valve 58 allows to cause the pre-compressed gas either to travel through the intercooler 57 or on the contrary to by-pass both the intercooler 57 and the heat exchanger 23 and directly to go to the positive displacement mechanism through the substantially adiabatic branch 39.

The control unit 43 controls both valves 38 and 58 either in a binary fashion, or preferably in a progressive fashion.

The regulation method is preferably as follows:

When the load level pertains to a lower range, the whole intake gas flow travels through the heat exchanger 23, the cycle being typically the cycle C described with reference to FIG. 7 and reproduced with thick lines in FIG. 22, or else, if desired, a cycle having a lower peak temperature $T_{25}$ obtained by increasing the pre-compression ratio and diminishing the effective additional compression ratio in the positive displacement mechanism 3;

When the engine load level pertains to a lower intermediate range, located between the lower range and the mid-range, it is desirable, as explained herein above with reference to foregoing examples, that the curve representing the additional compression in the working chamber finishes at an end-of-compression point such as $Q_{14N1}$ corresponding to a specific volume $v_{1N1}$ lower than in cycle C, thereby to avoid that the peak stress point $Q_{25}$ (end of combustion point) correspond to excessive temperature and pressure values. In the example of FIG. 22 the peak stress point $Q_{25}$ is the same for all load levels. The control unit 43 controls travel of a metered part of the intake gas flow through the substantially adiabatic branch 39. The other part of the intake gas flow rate travels through the heat exchanger 23. Access to the intercooler 57 remains closed by the valve 58. The working gas experiences cycle N1 which is shown with thin lines only where it differs from cycle C. The pre-compression is a bit more intense than in cycle C up to a point $Q_{33N1}$ where $v_{3N1} < v_{3C}$ and $p_{3N1} > p_{3C}$. This is automatically obtained thanks to the additional energy of the working gas reaching turbine 21 as discussed with reference to FIG. 18. If the entirety of the working gas was caused to travel through the heat exchanger 23, the cycle would cross the point $Q_{43N1t}$ located on the right of the adiabatic compression curve which is desired as appropriate to reach the desired point $Q_{14N1}$ of end of additional compression. Thanks to the metered mixture of gas heated in the heat exchanger 23 and of gas not heated in the heat exchanger 23, the intake gas reaching the junction point 41 is at point $Q_{43N1}$ lying on the desired additional compression curve. The point $Q_{43N1}$ corresponds to a temperature between that $T_{81}$ of the outlet of the exchanger 23 and that $T_{33N1}$ of the end of pre-compression in the compressor 18. The theoretical yield of the cycle N1 is a bit less good than if a bit more pre-compression had been performed up to a level such as $p_{3M,M'}$ of FIG. 18 where the desired adiabatic compression curve intersects the isotherm $T_{81}$. But the theoretical yield deficit is acceptable with a view to the savings obtained on other topics, in terms of equipment (less pressure in the intake track of the engine) and of the reduced losses in the turbocharger.

The mid-range of the load levels is located between the low intermediate range and a high intermediate range. The mid-range is generally very narrow and possibly limited to one particular load level, corresponding to the uppermost load level of the low intermediate range and to the lowermost load level of the high intermediate range which will be described later. In the mid-range the point corresponding to the end of the adiabatic compression lies in $Q_{14N2}$ on the same additional compression curve as the pre-compression. In this case the valve 38 closes access to the heat exchanger 23 for the intake gas and fully opens access into the substantially adiabatic branch 39, the valve 58 keeping the position fully opening direct access into the substantially adiabatic branch 39 and closing access to the intercooler 57. The point $Q_{33N2}$ corresponding to the end of pre-compression also corresponds to the beginning of additional compression in the working chamber. In the mid-range the cycle is similar to that of a conventional turbocharged non-intercooled engine.

In the higher intermediate range, the cycle N3 is implemented. The valve 38 is in the position directing the whole intake gas flow towards the valve 58. The latter opens thereby to distribute the working gas flow into a first fraction travelling through the substantially adiabatic branch 39 and a second fraction travelling through the intercooler 57 to be cooled down to substantially the reference temperature $T_{51}$. The gas reaching the junction point 41 and from there the intake valve 4a is a mixture of both fractions, represented by the point $Q_{43N3}$, at a temperature intermediate between the temperature $T_{33N3}$ at point $Q_{33N3}$ of end of pre-compression and the reference temperature $T_{51}$.

The load level can also lie in an upper range extending from the top of the high intermediate range up to the full load. The upper range may be very narrow and possibly limited to a single load level, namely the full load. In the upper range the cycle N4 is implemented. The valves 38 and 58 are positioned so that the whole pre-compressed gas flow travels through the intercooler 57. The point $Q_{43N4}$ corresponding to the beginning of the additional compression lies accordingly on the isotherm $T_{51}$ of the reference temperature. The theoretical cycle is similar to that of a conventional turbocharged intercooled engine.

The embodiment of FIG. 21 accordingly allows the realization of an engine having a highly enhanced yield at part load and peak values of torque and power which are close to those of a conventional engine having a commensurate displacement under high load.

Whatever the implemented cycle C, N1,N2,N3,N4, it is preferred that the burnt gas travel through the heat exchanger 23 thereby to permanently keep the hot side of the heat exchanger 23 substantially at the temperature $T_{81}$ of the end of post-expansion. This temperature does not vary a lot, or even does not vary at all when, as shown in FIG. 22, the adiabatic expansion curve is the same for all the operation points. This renders the realization simpler and avoids thermal shocks at the hot side of the heat exchanger, and enables the engine to quickly shift from one operation point to another one corresponding to a very different load level, without a thermal transition delay at the hot outlet of the heat exchanger 23.

The temperature at the cold side of the heat exchanger varies between $T_{33C}$ when the cycle C is implemented and $T_{81}$ when no intake gas anymore travels through the heat exchanger as the cycles N3 and N4 are implemented (this applying when the operating point of the engine is stabilized).

The engine which has just been described is particularly easy to regulate, under steady load or under changing load. The change from one load level to another occurs by appropriately positioning the valves 38 and 58, adjusting the injected fuel amount and adjusting the gas mass taken in into the working chamber at each cycle, e. g. by adjusting the closure point of the intake valve (line 27 in FIGS. 2-6). The line 27 must be positioned so that the volume of the working chamber 1 when the piston is in the position corresponding to line 27 be k times the minimum volume of the chamber, with $k = v_4/v_1$, e. g. $k_{N1} = v_{4N1}/v_{1N1}$ for cycle N1.

The same point $Q_{25}$ has been chosen for all the cycles of FIG. 22 only for illustration and explanation purposes. This point can vary. If it always remains on the same adiabatic expansion curve, the point $Q_{81}$ of the end of the post-expansion does not vary. If the point $Q_{25}$ varies so that the expansion curve varies, the temperature $T_{81}$ varies. This causes the temperature of the hot side of the heat exchanger to vary, which is always equal to $T_{81}$. This can then be taken into account in the engine regulation, and especially in the adjustment of the valves 38 and 58 by the control unit 43 thereby to always optimize the gas temperature $T_{43}$ at the intake of the positive displacement mechanism.

Practically, as is well-known, a clearly identified peak stress point such as $Q_{25}$ does not exist, the actual cycle being rounded, especially in its top region, and the precise control mode of the engine by the control unit 43 ("engine cartography") is the result of a fine tuning of each engine design as a function of numerous parameters (load level, rpm, ambient temperature, ambient pressure, cooling liquid temperature, selection of an engine operating mode by the user, etc.). Accordingly, the above discussed rules are only a teaching from which the one skilled in the art will understand the engine according to the invention and will be able to perform the concrete tuning of each particular engine model while using his know-how and the existing tuning tools.

When the load diminishes, the steps which have just been described are performed in the reverse direction, as a function of the load level received on the input port 55 of the control unit 43 and/or of the temperature detected by the sensor 42 as decreasing below a low threshold. A temperature sensor 52 and a pressure sensor 59 mounted at the inlet of the positive displacement mechanism 3 allow to correct the adjustment of the valves 38 and 58 with a view to give to the temperature of the gas entering the positive displacement mechanism 3 a value as close as possible to a target value defined as a function of the operation parameters of the engine, especially the load as discussed above. As a function of the actual temperature and pressure at the inlet of the positive displacement mechanism and of the target load applied at the input port 55, the control unit 43 corrects the position of the point 27 (FIGS. 2-6) defining the actual gas volume taken in by the positive displacement mechanism 3 at each cycle, with a view to cause the actual cycle of the engine to coincide as closely as possible with the target operation point. The sensors and the adjustment of the point 27 also allow to control the transitions between operation points, especially when the load varies.

The burner 44 of FIG. 16 could of course be inserted in the embodiment of FIG. 21 at the outlet of the path 24 of the heat exchanger 23.

Figure 17:
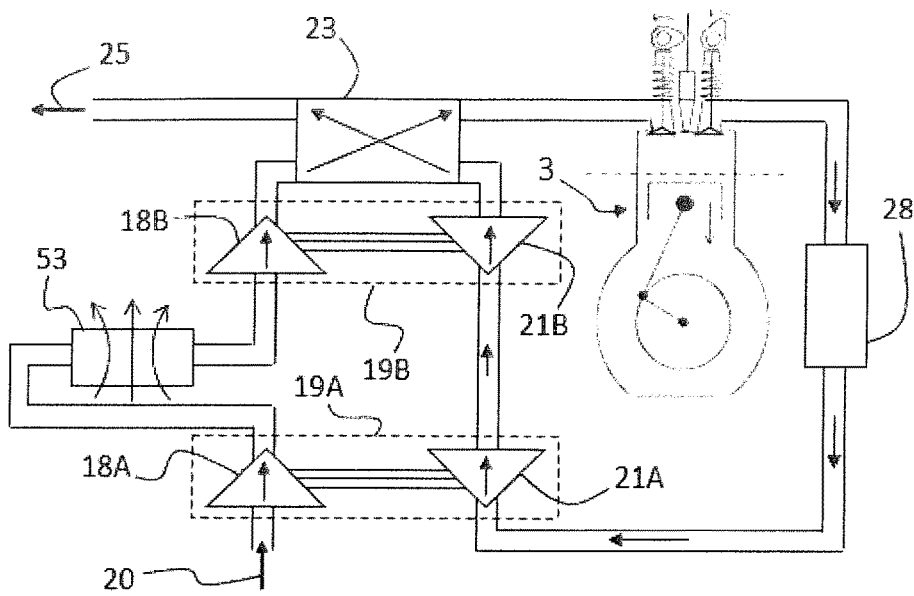
FIG. 17 is a sketch showing the basic concept of a sixth embodiment of the engine according to the invention, with two pre-compression stages separated by an intercooler.
Figure 26:
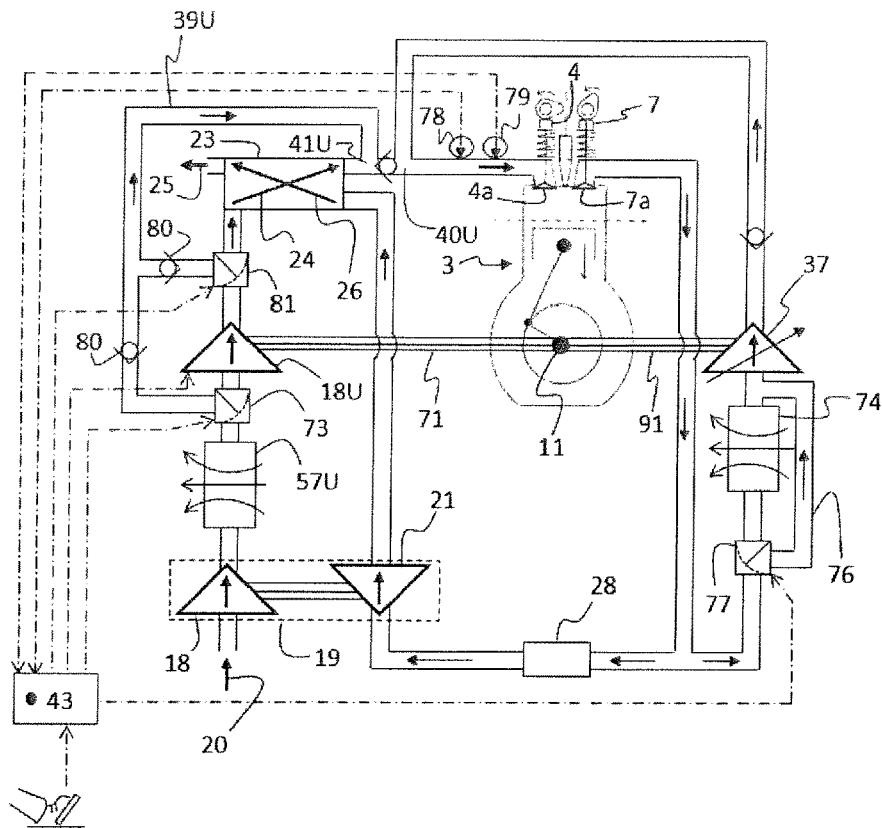
FIG. 26 is a sketch showing the basic concept of another embodiment of the engine according to the invention, provided with an autonomous compressor.
Figure 27:
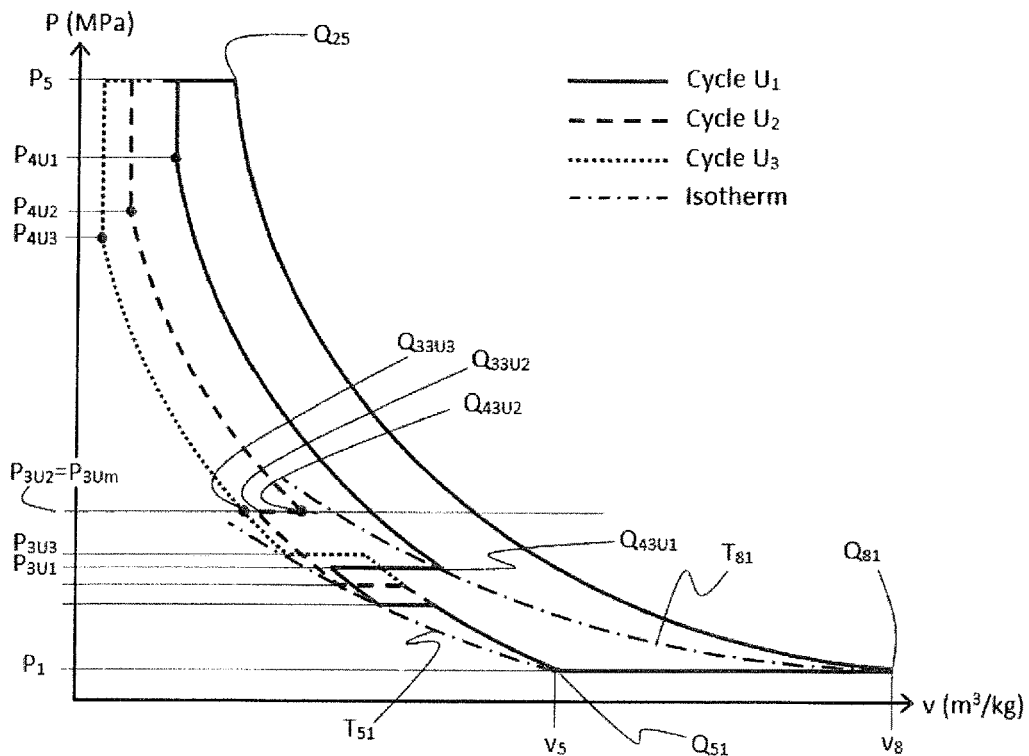
FIG. 27 is a diagram of the cycles (p, v) of cycles U1, U2, and U3 capable of implementation in the engine of FIG. 26.

The compressor 18 can be replaced with a cascade of two compressors, for example the compressors of the two turbochargers 19A and 19B of FIG. 17, or a compressor 18 followed by an autonomous compressor 18U of the type of that used in the embodiment of FIGS. 26 and 27.

Another improvement of the engine according to the invention will now be described with reference to FIG. 23.

The pressure can be relatively high on the rear face of the intake valve 4a. This pressure pushes the valve 4a in the opening direction. At certain stages of the operation of the engine where the valve 4a must remain closed while the pressure in the working chamber 1 is low, especially during discharge, it may be difficult for the valve spring 66 to maintain the valve 4a in its closed position. To remedy this problem, the stem 67 of the valve 4a has been formed with a shoulder 68 which increases the diameter of the stem 67 in the area where the stem 67 leak-tightly slides in its guide 69, by comparison with the diameter of the stem 67 in the area where the stem 67 crosses the intake gas path.

The pressure in the intake pipe results in a thrust onto the shoulder 68 in the closure direction, i. e. in the direction contrary to the detrimental thrust tending to open the valve 4a.

Figure 23:
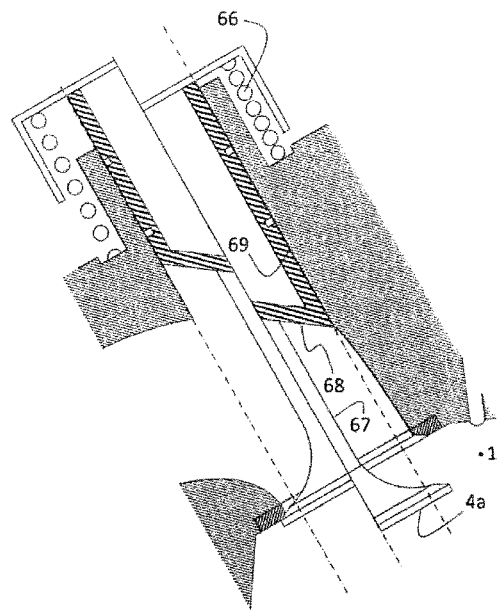
FIG. 23 shows a detail sectional view of an intake valve for an engine according to the invention.

FIG. 23 shows a concrete example of the realization of such a valve. The shoulder 68 is profiled thereby to match the pipe profile when the valve is open (right part of the illustration of the valve). The thick part of the stem is internally hollowed or tubular to make the valve lighter in spite of the thickness of its stem 67.

Figure 24:
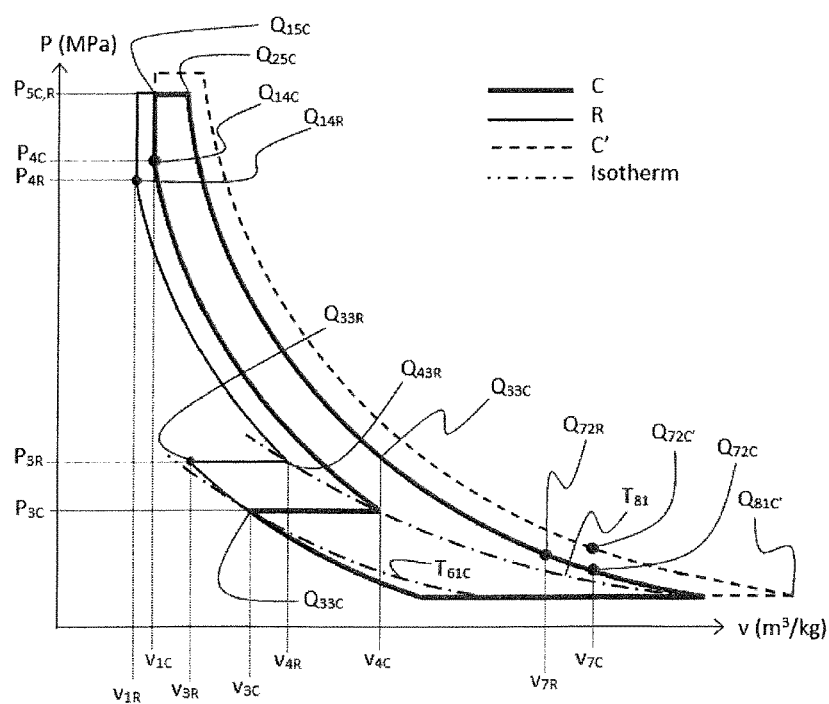
FIG. 24 shows by comparison with cycle C of FIG. 7 a cycle R corresponding to a higher load level, and a transient cycle C' implemented during the transition between cycles C and R.

With reference to FIG. 24, a control process of the transitions in an engine according to the invention, for example according to FIG. 1, will now be described, taking as an example a starting situation which is that of diagram C typically corresponding to a load being about one third of the full load.

It is assumed that the torque expected from the engine increases, in other words that the load increases.

According to the invention a new optimal cycle for the new operating point is that illustrated by the diagram R in FIG. 24, assuming that the peak stress point $Q_{25C}$ of the positive displacement mechanism is desired to be kept unchanged. The cycle R is identical to cycle C except where represented with thin lines. The additional compression curve $Q_{43R}$-$Q_{14R}$ of cycle R extends below the additional compression curve $Q_{43C}$-$Q_{14C}$ of cycle C, and consequently intersects the isotherm $T_{81}$ (temperature of the pre-compressed gas exiting the heat exchanger 23) at a point $Q_{43R}$ where the pressure $p_{3R}$ is higher than in diagram C. Obtaining cycle R thus needs that the turbocharger 19 receives more energy on its turbine 21. For this reason the point $Q_{72R}$ where the burnt gas exits the positive displacement mechanism to enter the turbine 21 is located higher along the expansion curve $Q_{25C}$-$Q_{81C}$ which is unchanged.

On the other hand, the point $Q_{43R}$ of the beginning of additional compression corresponds to a specific volume $v_{4R}$ lower than that $v_{4C}$ of cycle C.

The specific volume $v_{1R}$ at the end of the additional compression is lower than the corresponding specific volume $v_{1C}$ of cycle C. The expansion volume ratios in the positive displacement mechanism, $v_{7R}/v_{1R}$ and $v_{7C}/v_{1C}$, of both cycles are close to each other and can concretely be identical, and more particularly defined by the geometry of the positive displacement mechanism.

Ideally the transition from cycle C to cycle R is performed by means of two adjustments:
Adjustment of the fuel amount
Adjustment of the amount of working gas introduced into the working chamber, for example by adjusting the point 27 (FIGS. 2-6) of closure of the intake valve 4a. Concretely speaking the adjustment of the working gas amount can conveniently be understood as an adjustment of the working gas volume introduced into the positive displacement mechanism at each cycle, this volume measured in the conditions prevailing behind the intake valve 4a just before opening thereof.

To perform the transition from cycle R to cycle C, a possibility consists in increasing the fuel quantity so that cycle C becomes cycle C' (in dotted lines) providing more energy for the post-expansion in the turbine of the turbocharger. Consequently, the pressure $p_3$ increases and becomes closer to pressure $p_{3R}$. Then the adjustment of the introduced working gas amount is corrected in the direction shifting the additional compression curve towards the left of FIG. 24. This process (fuel amount increase, adjustment of the gas amount) is then repeated as many times as needed until pressure $p_{3R}$ is reached at the end of pre-compression.

Practically this process is smoothed as follows: the fuel amount is increased at a certain flow rate variation speed which is determined as a function of the desired quickness for the transition between cycles C and R, and the introduced gas amount is varied at a corresponding speed thereby to cause the point of beginning of additional compression of each transition cycle to be correctly positioned on the adiabatic compression curve ending at the correct point $Q_{14}$ (between $Q_{14C}$ and $Q_{14R}$) depending on the supplied fuel amount.

Examples of implementation of the invention in a controlled ignition engine, e. g. an engine using gasoline, will now be described with reference to FIG. 25.

By contrast with a spontaneous ignition engine, or diesel engine, adjusting the fuel amount is not enough to vary the engine load. It is also necessary to vary the air quantity thereby to keep the at least approximate stoichiometry of the air-fuel mixture for enabling the ignition (so-called "deflagrating" in this case) to occur. Furthermore, the temperature of the air-fuel mixture must imperatively have remained below the self-ignition point at the time of ignition. It is accordingly impossible to heat up at will the air or other combustive mixture (such as air+EGR gas) during compression and especially between pre-compression and additional compression.

The adjustment of the load of the conventional controlled ignition engine is performed by means of a joint adjustment of the pressure in the working chamber at BDC, thereby to adjust the combustive gas mass, and of the fuel mass added to the combustive gas. The addition of fuel to the combustive gas occurs in the intake of the engine for the carburetor or indirect injection engines, and in the working chamber during compression for the direct injection engines.

Figure 25:
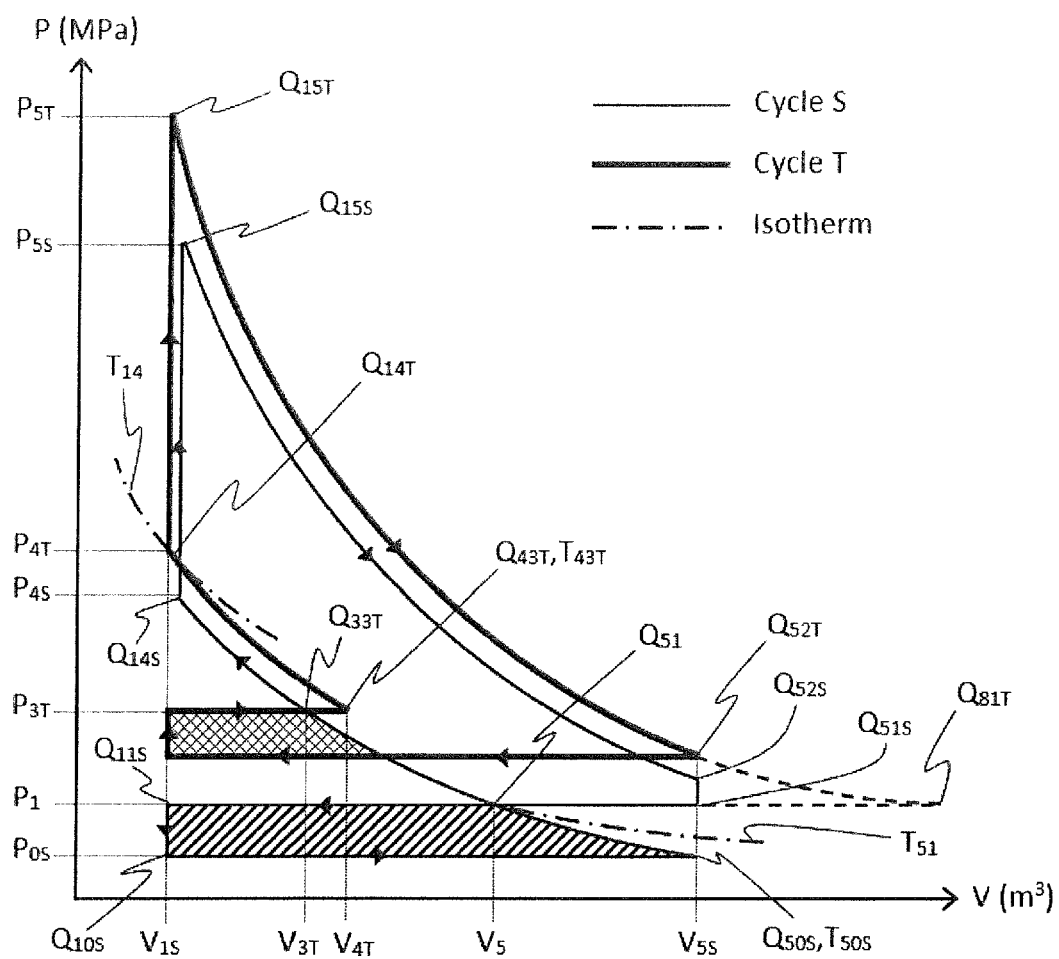
FIG. 25 is a diagram (p, V) of the pressure (p) of the gas in the working chamber as a function of the volume (V) of the working chamber in the case of an engine with controlled ignition, performing a cycle T according to the invention, by comparison with a cycle S of a known engine.

In the diagram of FIG. 25, the pressure is this time represented as a function of the actual volume V of the working chamber, and no longer as a function of the specific volume of the gas. The cycle S illustrates a part load operation example of a conventional, controlled ignition engine. The compression in the working chamber begins at a point $Q_{50S}$ where the pressure $p_{0S}$ is below the reference pressure $p_1$ (atmospheric pressure) and the temperature $T_{50S}$ is below the atmospheric temperature $T_{51}$. The compression ends at a point $Q_{14S}$ where the temperature $T_{14S}$ is significantly below the temperature $T_{14}$ chosen as a limit thereby to avoid self-ignition (otherwise this temperature would be exceeded when the engine operates under a higher load).

The combustion assumed to be entirely isochoric (according to the usual schematization of the controlled ignition cycles) ends at point $Q_{15S}$, then the expansion ends at point $Q_{52S}$ at the same volume $v_{5S}$, and at a pressure $p_{2S}$ exceeding the reference pressure $p_1$.

At point $Q_{52S}$ the working gas is released into the exhaust and the pressure falls down to p1, the piston expels the gas up to point $Q_{11S}$ at TDC, then the piston sucks the entering gas from point $Q_{10S}$ down to point $Q_{50S}$ corresponding to the beginning of the compression and the cycle begins again. Accordingly, not only the residual energy of the working gas at the end of the expansion is lost but the cycle furthermore includes a negative work portion (recognizable from the fact that this portion is run by point Q counterclockwise), made apparent by a simple hatching in FIG. 25.

Cycle T illustrates two improvements provided by the invention.

According to a first improvement, at an intermediate stage of compression where the pressure is $p_{3T}$, the gas is heated up at constant pressure from point $Q_{33T}$ to point $Q_{43T}$ so that the second part of the compression ends at point $Q_{14T}$ on the isotherm $T_{14}$ of the limit temperature for the end of compression, at the same volume $v_{1T}$ as the volume $v_{1S}$ of cycle S, and thus at a higher pressure $p_{4T}$ than the pressure $p_{4S}$ of cycle S. The end-of-combustion point accordingly lies at a higher pressure $p_{5T}$ than the end-of-combustion pressure $p_{5S}$ of cycle S.

The whole expansion $Q_{15T}$-$Q_{52T}$ in the working chamber also occurs under a higher pressure for a given volume value. As a whole, FIG. 25 makes clear that the whole main part of the cycle has been enlarged by the first modification proposed according to the invention. The heating between points $Q_{33T}$ and $Q_{43T}$ is preferably obtained by the heat available at the discharge of the engine, by means of a heat exchanger such as 23 of the foregoing examples. It will be possible accurately to regulate the temperature $T_{43T}$ at point $Q_{43T}$ by any means, preferably by heating in the heat exchanger such as 23 a metered fraction only of the pre-compressed air available at point $Q_{33T}$, then by mixing the pre-heated fraction and the non-pre-heated fraction, as described with reference to FIG. 21 for the low intermediate range of the load levels.

In an embodiment, the fuel is added to the working gas only at point $Q_{43T}$, or between point $Q_{43T}$ of the end of heating and the point of initiation of the combustion, which is generally in advance of the point $Q_{14T}$ of end of compression thereby to take into account the ignition delay. Introduction of the fuel in the working chamber instead of before avoids every risk of self-ignition of the working gas in the heat exchanger such as 23 in case of a trouble which would induce an over-heating in the heat exchanger.

Preferably, as from a load level not represented in FIG. 25, the working gas is no longer pre-heated during compression because on account of the temperature at the beginning of compression, the temperature at the end of compression is foreseen to be close to the limit temperature $T_{14}$. Typically, such load level is an intermediate load level. At the full load level, the working gas preferably travels through an intercooler. In an upper intermediate load level range, located between the intermediate load level and the top level, the working gas entering the positive displacement mechanism at pressure $p_3$ is a metered mixture of intercooled working gas and of working gas which neither experienced heating nor intercooling.

According to a second improvement provided by the invention over cycle S of the controlled ignition engine, the residual energy of the gas at the end of its expansion in the positive displacement mechanism is used to pre-compress the working gas beyond the theoretical pressure for the beginning of compression in the positive displacement mechanism at BDC taking into account the engine load. In other words, as described with reference to FIGS. 1-7, a relatively strongly pre-compressed working gas is taken in by the working chamber, but over part only of the volume increase stroke where intake occurs, i. e. from TDC down to point 27 with reference to FIG. 7.

Preferably the entirety of the pressure energy still available in the working gas at point $Q_{52T}$ of the end of adiabatic expansion in the working chamber is used for pre-compressing as much as possible the gas before its entry into the working chamber. Since the working gas exiting the working chamber at point $Q_{52T}$ is much hotter than the working gas to be pre-compressed, the available energy allows to pre-compress the working gas at a pressure $p_{3T}$ much higher than the pressure $p_{2T}$ of the end of expansion in the working chamber.

Accordingly the negative part of cycle S (shown with a simple hatching in FIG. 25) is replaced in cycle T with a part delivering a positive work (run by point Q in the clockwise direction), shown with a crossed hatching.

If as in cycle T the gas is heated up at an intermediate stage of its compression (between points $Q_{33T}$ and $Q_{43T}$), the pre-compression is performed from point $Q_{51}$ (atmospheric conditions) up to point $Q_{33T}$.

For the concrete implementation of a cycle where the working gas volume to be taken in by the working chamber, as measured upstream of the intake valve just before opening thereof, is small, an opening control of the intake valve 4a over a short range is advantageously used, with opening at TDC and closure when the volume of the working chamber is equal to $v_{4T}$. A variable control of the closure point enables to adjust the gas amount taken in as a function of the engine operation point.

In an embodiment, the controlled ignition engine according to the invention needs no gas throttle to restrict the working gas mass flow rate through the intake path. The gas mass taken in at each cycle is adjusted through adjustment of the closure point of the intake valve 4a.

Generally speaking, the improved controlled ignition engine according to the invention may comply with FIG. 21. However, in some embodiments, when the engine is warm, the valve 38 never completely closes access to the branch 39 and/or to the intercooler 57, thereby to avoid excessive heating up of the intake gas. The valve 38 closes the access only for cold start.

For a full load, an embodiment of the engine according to the invention can operate as a turbocharged intercooled engine with an increased power per liter of displacement by comparison with a conventional engine thanks to the yield increase provided by the high pressure intake (higher than the pressure at the end of expansion in the working chamber).

It is also possible to contemplate a controlled ignition engine according to the invention in which above a certain load level the cycle is similar to that of a conventional turbocharged engine. This only needs that part only of the energy available at discharge is used to energize the pre-compression compressor. This advantageously obviates the need of designing the intake path (intercooler, valve 4a, turbocharger, pipes) in view of the relatively high pressures which are generated in case the very high intake pressure according to the invention is implemented under high or full load.

Intermediate embodiments are possible, where the intake pressure under high or full load is limited while being greater than the pressure at the beginning of compression in the working chamber, e. g. equal to or greater than the pressure at the end of expansion in the working chamber (in a similar spirit as in the example of FIG. 22).

The selection among the different embodiments is operated by adjusting at 100% or less than 100% the discharge energy fraction which is used for pre-compressing the intake gas. This adjustment can be operated by means of an adjustable by-pass allowing part of the discharge gas to by-pass the turbocharger turbine. Such a by-pass exists on the conventional turbochargers.

In another embodiment, the controlled ignition engine uses a cascade of at least two turbochargers as shown with reference to FIG. 17 or 20, preferably with an intercooler 53 (FIGS. 17 and 19), 53A, 53B (FIG. 20) between successive compressors. Such intercoolers again increase the intake pressure which can be generated for a given energy at discharge. Furthermore, if an intake heating is operated after the pre-compression, the temperature at the end of heating can be higher in correspondence with the higher pressure, while the additional compression in the working chamber will have a smaller pressure ratio thereby not to exceed the limit temperature $T_{14}$.

If it is desired to limit the pre-compression pressure for certain load levels, e. g. the higher load levels, or else make the pre-compression more efficient e. g. for a low load level, means are provided, such as valves 54A, 54B, 56A, 56B illustrated in FIG. 20, selectively to deactivate part of the turbochargers in the case of such a load level.

The embodiment of FIG. 26 will only be described as to its differences over that of FIG. 1 while keeping as much as possible the same reference signs as in FIG. 1, or reference signs followed by the letter "U" for those components which are only partly similar to those of FIG. 1 or which have operational analogies with components of other, previously described embodiments.

In the foregoing examples, perfect turbochargers have been considered, which efficiently transfer to the intake the free enthalpy being theoretically available at the exhaust. As is well-known however, the yield of a turbocharger is around 50% or less. The losses result in additional heat at the outlet of the turbine (the working gas temperature less decreases in the turbine than if the expansion was isentropic), and by an excess of heat and a pressure deficit at the compressor outlet (the temperature is higher and the pressure is lower at the compressor outlet than if the compression was isentropic).

Thanks to the invention, and contrary to conventional turbocharged engines, the excess heat at the turbine outlet is not lost since the heat exchanger 23 very advantageously injects again the heat in the thermodynamic cycle. However, the mechanical energy deficit which is due to the imperfect yield of the turbocharger impacts the actual pressure at the intake of an engine according to the invention. In other words, the actual pressure is significantly lower than the theoretical pressure for a given available energy in the gas discharged by the positive displacement mechanism.

The embodiment of FIG. 26 remedies this drawback by providing at least two pre-compression stages, with at least one stage provided by the compressor 18 of the turbocharger 19 and at least one stage provided by a compressor 18U using another energy than that of the working gas discharged by the positive displacement mechanism. Such a compressor will be called herein after "autonomous compressor".

In the illustrated example, the autonomous compressor 18U is directly, or indirectly by way of a belt (not shown) or of a CVT (continuously variable transmission) (not shown), coupled to the power shaft 11 of the positive displacement mechanism 3.

Alternatively, the autonomous compressor 18U could also be driven by an electromotor energized by a generator and/or a battery, e. g. the generator and/or the battery of the vehicle when the engine is mounted in a vehicle. For a stationary engine or a ship engine the electromotor driving the autonomous compressor can be energized by an energy network, e. g. an electric network. For a civil works machine or an agricultural machine i. a., the autonomous compressor can be driven by a hydraulic motor energized by the hydraulic pump of the machine. These are only examples, it being noted that the thermodynamic cycles discussed herein consider the autonomous compressor energy consumption as provided by the cycle itself. In other words, there is no attempt herein to artificially enhance the cycle yield by injecting extrinsic energy therein.

The autonomous compressor 18U is of any appropriate type, such as for example a turbomachine, a vane compressor, a Roots compressor, a twin scroll compressor, a piston compressor, a screw compressor etc.

Preferably the engine according to the invention equipped with an autonomous compressor comprises a means for adjusting the power of the autonomous compressor as a function of at least one parameter relating to operation of the engine. The adjustment means can be a means for adjusting the drive power applied to the compressor, e. g. the power of the electromotor driving the compressor. The adjustment means may be a means of adjusting the rotary speed of the autonomous compressor shaft, e. g. by means of a variable ratio transmission between the shaft 11 of the positive displacement mechanism 3 and the (not shown) shaft of the autonomous compressor. The adjustment means may be a means of adjusting the volume ratio or the pressure ratio of the autonomous compressor.

The power adjustment is generally operated thereby to realize, at each instant at the intake 4 of the positive displacement mechanism, an intake pressure which be so close as possible to a target pressure defined as a function of the current operation point, while taking care that the compressor 18 of the turbocharger 19 uses as completely as possible the energy of the gas discharged by the positive displacement mechanism.

In an advantageous embodiment, the autonomous compressor 18U imposes the renewed (i. e. non-EGR, if an EGR is provided)) intake gas flow rate as a function of the operation point. At the operation point in question, the turbocharger 19 is able to supply a certain pressure rise of the renewed gas by a maximum depressurization of the burnt gas in the turbine 21. The control unit adjusts the power of the autonomous compressor 18U such that the latter imparts to the intake gas travelling there-through the additional pressure needed to realize the operation point defined by the cartography of the engine according to the invention.

The theoretical yield of an engine according to the invention provided with an autonomous compressor 18U coupled to the power shaft 11 of the positive displacement mechanism 3 is the same as that of an engine according to the invention wherein the same pre-compression is entirely performed by one or more turbochargers. But the actual yield of the engine provided with an autonomous compressor may be higher because the power needed for driving the autonomous compressor is generated by an additional positive displacement expansion in the working chamber with a better yield than in the turbine of a turbocharger.

Furthermore, the autonomous compressor 18U, with its adjustment ability without losing working gas energy (contrary to turbochargers), allows an efficient control of the operation point.

A cascade of two autonomous compressors may be provided. In such a case, it may be enough if only one of them has a controllable power.

It is possible that an engine according to the invention performs the whole pre-compression by means of one or more autonomous compressors while fully exploiting the mechanical energy of the gas in the working chamber. This solution is not preferred because it requires a great working chamber volume at BDC, hence a large displacement with respect to the engine power, in addition to a high cost in terms of autonomous compressors.

In the illustrated example, the compressor 18 of the turbocharger 19 is the first pre-compression stage, while the autonomous compressor 18U constitutes the second pre-compression stage. This allows to use a commercially available turbocharger, or a turbocharger close to those commercially available in terms of volume flow rate ranges and pressure ranges, and to use an autonomous compressor 18U of a smaller size because compressing gas already compressed one time. Furthermore, in this embodiment, the autonomous compressor power is reduced because, as will be discussed later, the autonomous compressor is partly or entirely deactivated for the high load levels.

As discussed herein above, the actual temperature of the gas exiting the turbine 21 of the turbocharger 19 is higher than the theoretical temperature at the end of a corresponding isentropic expansion. In an engine according to the invention this may lead to correspondingly increase the gas pressure at the intake 4 of the positive displacement mechanism. The autonomous compressor 18U allows to do this without relying upon an increase of the power of the turbocharger which would result in a further excess heat at the outlet of the turbine. On the contrary, part of the pre-compression being performed by the autonomous compressor, this phenomenon of increased temperature at the hot side of the heat exchanger 23 due to the poor yield of the turbocharger turbines is less pregnant.

By contrast, there may be an interest in more pre-compressing the intake of the engine beyond what the turbocharger is capable of, thereby to take into account the above-cited pressure deficit at the outlet of the compressor 18 of the turbocharger 19, and also to raise more than according to the theoretical calculation the pressure level at the intake of the positive displacement mechanism, in correspondence with the temperature excess at the hot outlet of the heat exchanger 23, resulting from the smaller temperature decrease of the discharged working gas through the turbine.

On the other hand, there has been discussed with reference to FIG. 9 that it could be advantageous to choose a moderate peak temperature in the working chamber, and that this could lead to raise the pressure at the end of pre-compression. The autonomous compressor 18U allows this with a better yield as well as a better control, than if the whole pre-compression was performed by turbocharging.

In the embodiment of FIG. 26, the autonomous compressor 18U is mounted between the compressor 18 of the turbocharger 19 and the cold inlet of the heat exchanger 23.

In one embodiment the autonomous compressor 18U has a compression ratio and a flow rate which are variable and controlled by the engine control unit thereby simultaneously to optimize i) the use of the whole power available in the discharged working gas arriving at the turbocharger 19, ii) the pressure at the outlet of the autonomous compressor 18U, and iii) the pressure at the inlet of the positive displacement mechanism, all this as a function of the operation parameters of the engine such that load, actual temperature at the hot outlet of the heat exchanger 23, actual pressure at the inlet of the autonomous compressor 18U, etc. The compression ratio is adjustable either directly if the compressor is a positive displacement compressor with a variable compression ratio, either indirectly through adjustment of its speed or flow rate.

With this latter type of adjustment of the compression ratio of the autonomous compressor 18U, the intake pressure of the positive displacement mechanism increases if the flow rate of the autonomous compressor exceeds, even slightly, the renewed (i. e. non-EGR, if an EGR is provided) gas flow rate travelling through the intake of the positive displacement mechanism.

Each engine operation point results in a value of the mechanical energy available in the gas discharged by the positive displacement mechanism, in turn resulting in a certain value of the pressure at the outlet of the compressor 18, and hence at the inlet of the autonomous compressor 18U. The pressure and temperature at the inlet of the autonomous compressor 18U are measurable by sensors (not shown) enabling the control unit 43 to determine the volume flow rate that the intake of the autonomous compressor 18U must convey thereby to realize the mass flow rate of renewed gas corresponding to the current operation point. The control unit adjusts the speed of the autonomous compressor 18U thereby to realize the determined volume flow rate. Around this value, the control unit 43, informed by a pressure sensor 78 responsive to the pressure of the working gas arriving at the inlet of the positive displacement mechanism 3, precisely regulates the flow rate of the autonomous compressor 18U thereby to stabilize the pressure at the intake 4 of the positive displacement mechanism so close as possible to the theoretical pressure corresponding to the current operation point.

For the adjustment of the speed of the autonomous compressor 18U, a speed variation system (not shown), controllable by the control unit 43, can be mounted in the mechanical connection 71 between the compressor 18U and the positive displacement mechanism 3.

An intercooler 57U is inserted between the outlet of the compressor 18 and the inlet of the autonomous compressor 18U.

The heat-receiving path 24 of the heat exchanger 23 is mounted between the outlet of the autonomous compressor 18U upstream, and the intake 4 of the positive displacement mechanism downstream.

The heat-yielding path 26 of the heat exchanger 23 is mounted between the outlet of the turbine 21 of the turbocharger 19 upstream and the engine exhaust 25 downstream.

In the illustrated embodiment a three-way valve 81, controlled by the control unit, is mounted between the outlet of the autonomous compressor 18U and the cold inlet of the heat exchanger 23. The valve 81 directs the working gas exiting the autonomous compressor 18U either towards the heat-receiving path 24 of the heat exchanger 23, or towards a non-heated, preferably adiabatic branch 39U which by-passes the heat-exchanger 23 up to a junction point 41U with the hot outlet of the heat exchanger 23. Preferably the valve 81 is capable of intermediate positions defined by the control unit 43 as a function of the current operation point. In those intermediate positions the working gas exiting the junction point 41U towards the positive displacement mechanism 3 is a metered mixture of working gas having traveled through the heat exchanger 23 and of less hot working gas having traveled through the adiabatic branch 39U. The temperature of such mixture is intermediate between that of the outlet of the compressor 18U and the higher one of the hot outlet of the heat exchanger 23. A temperature sensor 79 positioned between the junction point 41U and the intake 4 of the positive displacement mechanism 3 informs the control unit 43 upon the actual temperature at the inlet of the positive displacement mechanism 3. The control unit 43 adjusts the valve 81 in the sense of bringing back that actual temperature towards an optimal value corresponding to the current operating point.

In the improved version which is represented, a three-way valve 73 controlled in a binary fashion by the control unit 43 allows the gas leaving the intercooler 57U either to enter the compressor 18U as disclosed up to now, or selectively to by-pass the autonomous compressor 18U thereby directly to reach the adiabatic branch 39U and therefrom the junction point 41U.

Check valves 80 prevent counter-flow travel of the working gas in the different branches of the working gas path.

A possible method of using the engine of FIG. 26, considered up to now as not comprising an EGR device, will now be described while also referring to FIG. 27.

In this example the peak stress point $Q_{25}$ is the same for all operation points. This makes understanding easier but does not correspond to a requirement, as already explained with reference to preceding embodiments.

In a lower range of the load levels, cycle U1 is implemented. The whole working gas travels through the compressors 18 and 18U, then through the heat exchanger 23 to reach junction point 41U ($Q_{43U1}$) at a temperature $T_{81}$ equal to the temperature at the outlet of the turbine 21. The cycle is for example identical to cycle C of FIG. 7 except that the split pre-compression with intermediate intercooling enhances the already high yield of cycle C, while the actual yield is enhanced by the pre-compression in part performed by the autonomous compressor 18U.

For reasons explained above the pre-compression pressure $p_{3U1}$ increases with the load level. For a certain load level (not shown) corresponding to the top of the lower range and the beginning of an intermediate range, the pressure $p_{3U}$ reaches the value $P_{3Um}$ which is required not to be exceeded thereby to limit the implementation complexity and cost.

In the intermediate range (cycle U2 in FIG. 27, shown in interrupted lines but only where it differs from cycle U1), the whole working gas travels through the compressor 18, the intercooler 57U and the autonomous compressor 18U. The control unit 43 regulates the power of the autonomous compressor 18U thereby to stabilize its outlet pressure at the $P_{3Um}$ level. Furthermore, the control unit 43 adjusts the valve 81 in an intermediate position. Consequently, part of the pre-compressed working gas travels through the heat exchanger 23 and another part of the pre-compressed working gas travels through the adiabatic branch 39U. There is thus obtained at the junction point 41U a mixture which is at the pressure $P_{3Um}$ and at a temperature $T_{43U2}$ (point $Q_{43U2}$) intermediate between the temperature $T_{33U2}$ (point $Q_{33U2}$) of the outlet of the autonomous compressor 18U and the temperature $T_{81}$ of the outlet of the exchanger 23.

The more the load level increases within the intermediate range, the more the point $Q_{43U2}$ becomes closer to the point $Q_{33U2}$, while at the same time the latter moves towards the left of FIG. 27 because the compression ratio of the autonomous compressor 18U diminishes as that of compressor 18 increases due to the increasing energy available at the discharge.

At a certain load level corresponding to the top of the intermediate range and to the bottom of the upper range, the point $Q_{43U2}$ becomes the same as the point $Q_{33U2}$ forming a common point $Q_{33U3}$, in other words the valve 81 closes access into the heat exchanger 23 and the whole working gas travels through the adiabatic branch 39U.

This situation is illustrated as the cycle U3, shown in dotted lines where it differs from cycle U2. This corresponds to the upper range of the load levels.

It appears from FIG. 27 that in the upper range the theoretical cycle makes no difference about whether the pre-compression continues after the outlet of the intercooler 57U up to pressure $p_{3Um}$, or whether the working gas directly travels from intercooler 57U into the positive displacement mechanism 3 while by-passing the autonomous compressor 18U.

For this reason, according to an improvement, the autonomous compressor 18U is then deactivated. In case the valve 73 and the connection between the latter and the adiabatic branch 39U have been provided, the deactivation consists in causing the whole working gas to by-pass the autonomous compressor 18U thanks to an appropriate control applied by the control unit 43 onto the valve 73. The engine then operates according to a cycle close to that of a conventional turbocharged intercooled engine.

The deactivation of the autonomous compressor 18U at the transition between the intermediate range and the upper range, and/or its reactivation for the reverse transition, can occur progressively: as soon as the working gas no longer travels through the heat exchanger 23, the theoretical cycle is the same if the autonomous compressor 18U performs part of the compression downstream of the intercooler or if on the contrary the whole compression downstream of the intercooler takes place within the working chamber 1. For the progressive transition to occur correctly, it is enough if the closure point 27 of the intake valve 4a is jointly adjusted with the variation of the specific volume of the working gas arriving at the intake 4 so that the intended gas mass be taken in at each cycle into the positive displacement mechanism in view of the current operation point.

It will be noted that in the advantageous embodiment of FIG. 26, the intercooler 57U together operates for enhancing the pre-compression efficiency for the lower and intermediate load levels and for intercooling in an almost conventional fashion the working gas for the high load levels.

In the upper part (cycle not shown) of the intermediate range, the point $Q_{43U/2}$ may be located on the left of the extension of the adiabatic compression curve starting at point $Q_{51}$ (reference pressure and specific volume). In this case the pre-compressed working gas is globally intercooled by comparison with what would have been an adiabatic compression starting from point $Q_{51}$. The complete intercooling in the intercooler 57U followed by the partial heating after travel through the autonomous compressor 18U allow to enhance the yield, by comparison with what would have been a mere mitigate cooling as described with reference to FIGS. 21, 22 thanks to the intermediate positions of the valve 58.

It will be appreciated that the operation just described with reference to FIG. 27 is not intrinsically limited to the use of an autonomous compressor 18U, but could be transposed to an embodiment provided with two turbochargers. It will also be appreciated that the use of an autonomous compressor within the scope of the invention is neither limited to the structure according to FIG. 26 nor to the cycles of FIG. 27, an autonomous compressor being appropriate for replacing e. g. one of the compressors of the embodiments of FIGS. 13, 17, 19, 20, or also the compressor 18 of FIG. 11, or perform part of the pre-compression in the embodiments of FIGS. 1, 14, 16, 21.

In the example shown in FIG. 26, a recirculation path has also been provided for part of the discharged working gas. The recirculation path travels through an EGR compressor 37 as in FIG. 14. It has been represented here as driven by a mechanical connection 91 with the power shaft 11 of the positive displacement mechanism 3. There is provided in the recirculation path upstream of the recirculation compressor 37, a recirculation radiator 74 that cools the recirculation gas at least for the highest load levels. This reduces the power absorbed by the compressor 37 and avoids that the working gas arriving at the adiabatic branch 39U be detrimentally heated up by the recirculation gas.

For the lower load levels in which the whole entering working gas travels through the heat exchanger 23, the recirculation gas by-passes the recirculation radiator 74 thanks to a by-pass 76 depending on a valve 77 controlled by the control unit 43, thereby to cause the recirculation gas to be as hot as possible when reaching the location where the gas mixes up with the working gas arriving from the hot outlet of the heat exchanger 23. This avoids dissipation, in the radiator 74, of heat which is exploitable in the cycle according to the invention. The recirculation gas, not expanded (hence not cooled down to temperature $T_{81}$) in the turbine 21, then heated by the compression in the compressor 37, is at a temperature above $T_{81}$. Consequently the mixture obtained at the location 40U where the mixture occurs between the recirculation gas and the pre-compressed gas arriving from the junction point 41U is at a temperature above $T_{81}$. This can be taken into account in the engine control by choosing for each load level a higher pre-compression pressure than that which would be optimal without a recirculation.

Another solution consists in providing the valve 77 with the capability of intermediate positions for only partly cooling down the recirculation gas thereby to cause the recirculation gas to reach the mixture location 40U at a desired temperature, e. g. the same as that at the outlet of the junction point 41U.

The embodiments of FIGS. 26 and 27 are compatible with various types of ignition modes.

The diagrams of FIG. 27 rather refer to an ignition mode by compression (diesel type). If the ignition is of the controlled type (typically by ignition plug), the valves 73 and 81, and 77 if the recirculation is implemented, are adjusted thereby to cause enough working gas to travel through the adiabatic branch 39U so that the temperature near the end of the additional compression does not exceed the limit temperature not to be exceeded to avoid self-ignition.

In view of the various examples described herein, it will be understood that in the internal combustion engine according to the invention the intake stroke of the positive displacement mechanism also forms a power stroke of a two-stroke heat machine, i.e. having a compression stroke, namely the pre-compression according to the invention and an expansion stroke formed by the expansion stroke including the intake phase in the positive displacement mechanism. Between these two strokes of the heat machine, the working gas is heated up in the heat exchanger 23 by the discharge of the positive displacement mechanism, this allowing the expansion stroke (intake of the combustion engine) to produce more energy than absorbed by the pre-compression.

Of course the invention is not limited to the described and illustrated examples.

REFERENCE SIGNS LISTING

1—Working chamber
2—Engine block
3—Positive displacement mechanism
4—Intake, intake orifice
4a—Intake valve
4b—Cam
6—Combustion means
7—Discharge, discharge orifice
7a—Discharge valve
7b—Cam
8—Movable member, piston
9—Piston working face
11—Power shaft
12—Motion transformer
13—Cylinder
14—Crankshaft 16—Connecting rod
17—Crank pin
18, 18A, 18B, 18C—Compressor
18U—Autonomous compressor
19, 19A, 19B, 19C—Turbocharger
20—Air inlet
21, 21A, 21B, 21C—Turbine
22—Discharge duct
23—Heat exchanger
24—Heat-receiving path
25—Exhaust
26—Heat-yielding path
27—Intermediate position of the piston
28—Depollution system
29—Inlet compressor
30—Piston reciprocation below position 27
31—Intercooler
32—Cooling air flow
33—Inlet turbocharger
34—Turbine
36—Counter-flow heat exchanger
37—EGR compressor
38—Three-way valve
39, 39U—Adiabatic, non-heated branch
40, 40U—Mixture location
41, 41U—Junction point
42—Temperature sensor
43—Control unit
44—Pre-heating burner
46—Air inlet
47—Fire place
48—Smoke outlet
49—Exchanger
51—Pressure sensor
52—Temperature sensor
53, 53A, 53B—Intercooler
54, 54A, 54B—Valve
55—Control unit 43 inlet port
56, 56A, 56B—Valve
57, 57U—Intercooler
58—Second three-way valve
59—Sensor
66—Valve spring
67—Valve stem
68—Shoulder
69—Valve guide
71—Mechanical connection
73—Three-way valve
74—Recirculation radiator
76—By-pass
77—Three-way valve
78—Pressure sensor
79—Temperature sensor
80—Check-valves
81—Three-way valve
91—Mechanical connection

The invention claimed is:

1. An internal combustion engine comprising:
a power shaft;
a compressor system for effecting pre-compression and volume reduction of a working gas, thereby to obtain a pre-compressed working gas at a first pressure;
an engine block positive displacement mechanism having a working chamber partly defined by a piston coupled to the power shaft, and in which the pre-compressed working gas is successively subjected to:
 a heating by combustion near a top dead center of the piston at which the volume of the working chamber is minimal;
 at least an initial part of an expansion-depressurization, while the piston moves towards a bottom dead center;
 a discharge;
at least one fuel introduction device;
a heat exchanger which, during warm engine operation at a load level pertaining to a part-load range in which the engine produces driving torque on the power shaft, withdraw heat from the working gas, having been discharged from and travelling downstream of the discharge of the positive displacement mechanism at a second pressure lower than the first pressure, and yielding said heat to the pre-compressed working gas, thereby to cause a temperature of the pre-compressed working gas to be higher at the outlet of the heat exchanger than at an outlet of the compressor system;
a at least one depollution system; and
a control unit;
wherein:
 the pre-compressed working gas, heated in the heat exchanger at a first temperature at a hot outlet of the heat exchanger, is subjected, at least in part in the working chamber, to an additional compression with reduction of a specific volume of said working gas and increase of the temperature of the working gas above the first temperature before the heating by combustion,
 at least except in said at least one depollution system, the working gas is in essentially adiabatic conditions between the discharge of the positive displacement mechanism and a hot inlet of the heat exchanger; and
 said engine further comprises a thermal adjustment and gas distributor system being connected to said control unit for:
  moderating the temperature of the pre-compressed working gas reaching the positive displacement mechanism by comparison with the temperature of the discharged working gas discharged from the engine block positive displacement mechanism available upstream of the heat exchanger, when the load level exceeds a first threshold within said part-load range; and
  cooling down the working gas sent to the positive displacement mechanism, relatively to the temperature of the end of pre-compression, when the load level exceeds a second threshold higher than said first threshold.

2. The engine according to claim 1, wherein the compressor system comprises two stages separated by an intercooler, and wherein when the load level is in an upper range of the load levels, located above said second threshold, the thermal adjustment and gas distributor system allows the pre-compressed working gas selectively to go to intake of the engine block positive displacement mechanism in a same thermodynamic condition as while being discharged from the intercooler through a by-pass branch by-passing the heat exchanger.

3. The engine according to claim 1, wherein the compressor system comprises two stages separated by an intercooler; and wherein in an intermediate range of the load levels, located above said first threshold, the working gas being discharged from the intercooler travels through an upper stage of the two stages, and then for one part through the heat exchanger and for another part through a by-pass branch by-passing the heat exchanger.

4. The engine according to claim 3, wherein at a transition from the intermediate range to a load level higher than the intermediate range, said upper stage of the compression system is progressively de-activated, and conversely at the transition from a load level higher than the intermediate range to a load level within the intermediate range, the upper pre-compression stage is progressively activated.

5. The engine according to claim 1, wherein the thermal adjustment and gas distributor system includes, at least one by-pass branch for the working gas bypassing the heat exchanger; and a distributor system configured for causing at least part of the pre-compressed working gas to be distributed through the at least one by-pass branch.

6. The engine according to claim 5, wherein the distributor system is configured for being operable at an intermediate position to cause the pre-compressed working gas simultaneously to be distributed in two parallel branches thereby to obtain at a junction of the two branches a pre-compressed working gas having a temperature intermediate respective temperatures of the working gas in the parallel two branches.

7. The engine according to claim 1, wherein the heat exchanger receives an entirety of the pre-compressed working gas when the load level is in a lower range of the part-load range.

8. The engine according to claim 1, wherein during a warm condition of the engine at a load being below the first threshold, the working gas having been discharged from the positive displacement mechanism exits the heat exchanger at a temperature exceeding by some tens of Kelvin the temperature at which the pre-compressed working gas is distributed to the heat exchanger.

9. The engine according to claim 1, wherein during a warm condition of the engine at a load being below the first threshold, a whole quantity of working gas having been discharged by the engine block positive displacement mechanism, and a whole quantity of the pre-compressed working gas are to exchange heat in the heat exchanger.

10. The engine according to claim 1, wherein, in a condition of warm engine at part-load, the pre-compressed working gas is in essentially adiabatic conditions from the hot outlet of the heat exchanger and up to a beginning of a combustion phase, except for a mixture of the pre-compressed working gas with recirculation working gas including working gas trapped in the working chamber from a preceding cycle.

11. The engine according to claim 1, further comprising at least one recirculation path, for recirculating a part of the working gas discharged from the engine block positive displacement mechanism, said recirculation path extending from a derivation location located between the discharge of the engine block positive displacement mechanism and the hot inlet of the heat exchanger, up to a mixture location located between the hot outlet of the heat exchanger and the intake of the engine block positive displacement mechanism.

12. The engine according to claim 11, further including a recirculation compressor and a flow rate adjustment valve being positioned in the recirculation path.

13. The engine according to claim 11, further comprising means for reducing the temperature of the working gas in the recirculation path, being active at least for a high load level.

14. The engine according to claim 11, further including a recirculation compressor of a type allowing adjustment of a flow rate therethrough, positioned in the recirculation path.

15. The engine according to claim 1, wherein an internal recirculation of the working gas is trapped in the working chamber when a discharge phase is terminated before the piston reaches the top dead center.

16. The engine according to claim 1, wherein an effective volume ratio of a compression between the hot outlet of the heat exchanger and the top dead center in the engine block positive displacement mechanism is smaller than a volume ratio of an expansion in the engine block positive displacement mechanism starting from the top dead center.

17. The engine according to claim 1, wherein the engine block positive displacement mechanism is of the four stroke type comprising a volume increase stroke during which the working gas at the first pressure enters the working chamber and then expands in the working chamber until reaching at an end of said volume increase stroke a third pressure smaller than the first pressure.

18. The engine according to claim 17, wherein a point of closure, with respect to the top dead center and the bottom dead center, of an intake orifice for intake of the working gas into the engine block positive displacement mechanism is controlled in real time as a function of at least one operational parameter of the engine.

19. The engine according to claim 1, wherein the closure point, with respect to the top dead center and the bottom dead center, of an intake orifice of the positive displacement mechanism is invariable.

20. The engine according to claim 1, wherein the heat exchanger is configured so that the working gas discharged by the engine block positive displacement mechanism and the pre-compressed working gas flow in opposed directions in the heat exchanger.

21. The engine according to claim 1, wherein an engine cartography for different load levels is such that, in warm engine operation, the temperature of the hot inlet of the heat exchanger varies by equal to or less than 100 K, whatever the load level of the engine, at least in a usual range of load levels.

22. The engine according to claim 21, wherein the engine cartography defines expansion curves in a diagram of the working gas pressure as a function of a specific volume of the working gas for different load levels, and wherein said expansion curves are superposed at least in a portion corresponding to low pressures of the working gas.

23. The engine according to claim 1, wherein the heating is operated by homogenous combustion of a pre-constituted mixture of air, fuel and recirculation gas.

24. The engine according to claim 1, wherein at least in a range of load levels the pre-compression pressure increases as the load increases.

25. The engine according to claim 24, wherein the pre-compression pressure increases only up to a limit value and then remains below or equal or slightly above the limit value when the load exceeds the level for which the limit value has been reached.

26. The engine according to claim 1, wherein the compressor system comprises a compressor of a turbocharger; and a turbine of said turbocharger is disposed in a path for the working gas being discharged from the engine block positive displacement mechanism at upstream of the heat exchanger.

27. The engine according to claim 1, wherein the compressor system comprises at least two pre-compression stages, and a valve for selectively deactivating at least one of said pre-compression stages by the control unit.

28. The engine according to claim 1, wherein the compressor unit and the control unit are constructed and arranged to allow a control of a pressure of the pre-compressed working gas a function of a current operating condition of the engine.

29. The engine according to claim 1, further comprising an intercooler for cooling down the working gas during said pre-compression.

30. The engine according to claim 1, wherein the compression system comprises an autonomous compressor driven independently from the discharged gas.

31. The engine according to claim 30, wherein the autonomous compressor is mounted in series with a compressor of a turbocharger.

32. The engine according to claim 1, wherein during a warm condition of the engine at a load being below the first threshold, a fraction of a whole quantity of working gas having been discharged from the engine block positive displacement mechanism is diverted into a recirculation path, and a remaining fraction of the whole quantity of the working gas having been discharged from the engine block positive displacement mechanism and a whole quantity of the pre-compressed working gas are to exchange heat in the heat exchanger.

\* \* \* \* \*